US010996538B2

(12) United States Patent
Popovic et al.

(10) Patent No.: US 10,996,538 B2
(45) Date of Patent: May 4, 2021

(54) OPTICAL MODULATOR FROM STANDARD FABRICATION PROCESSING

(71) Applicants: Massachusetts Institute of Technology, Cambridge, MA (US); University of Colorado, Denver, CO (US)

(72) Inventors: Milos A. Popovic, Boulder, CO (US); Jeffrey Michael Shainline, Lafayette, CO (US); Jason Scott Orcutt, Somerville, MA (US); Vladimir Marko Stojanovic, Berkeley, CA (US)

(73) Assignees: Massachusetts Institute of Technology, Cambridge, MA (US); University of Colorado, Denver, CO (US)

(*) Notice: Subject to any disclaimer, the term of this patent is extended or adjusted under 35 U.S.C. 154(b) by 0 days.

(21) Appl. No.: 14/897,466

(22) PCT Filed: Jun. 12, 2014

(86) PCT No.: PCT/US2014/042177
§ 371 (c)(1),
(2) Date: Dec. 10, 2015

(87) PCT Pub. No.: WO2014/201286
PCT Pub. Date: Dec. 18, 2014

(65) Prior Publication Data
US 2016/0139487 A1    May 19, 2016

Related U.S. Application Data

(60) Provisional application No. 61/834,362, filed on Jun. 12, 2013.

(51) Int. Cl.
*G02F 1/225* (2006.01)
*G02F 1/025* (2006.01)
(Continued)

(52) U.S. Cl.
CPC ......... *G02F 1/2257* (2013.01); *G02B 6/2938* (2013.01); *G02B 6/29338* (2013.01);
(Continued)

(58) Field of Classification Search
CPC ................ G02F 1/2257; G02F 1/025; G02F 2001/3509; G02F 2201/17; G02F 2203/05;
(Continued)

(56) References Cited

U.S. PATENT DOCUMENTS 3,593,191 A   7/1971   Henker
4,096,512 A   6/1978   Polinsky
(Continued)

FOREIGN PATENT DOCUMENTS

JP   2001-526000 A   12/2001
JP   2004-252311 A    9/2004
(Continued)

OTHER PUBLICATIONS

Berger et al., Waveguide electro-optic modulator using population depletion in a Schottky diode, Superlattices and Microstructures, vol. 20, No. 1, 1996, pp. 131-135.*
(Continued)

*Primary Examiner* — Peter Radkowski
(74) *Attorney, Agent, or Firm* — Smith Baluch LLP

(57) ABSTRACT

An optical modulator is disclosed that includes an optical resonator structure. The optical resonator structure includes at least one non-linear portion, the at least one non-linear portion comprising at least one radial junction region. The at least one radial junction region is formed between at least first and second materials, respectively, having different electronic conductivity characteristics. A principal axis of the at least one radial junction region is oriented along a radius of curvature of the at least one non-linear portion. The
(Continued)

optical modulator includes an optical waveguide that is coupled to the at least one non-linear portion of the optical resonator structure.

32 Claims, 47 Drawing Sheets

(51) Int. Cl.
*G02B 6/293* (2006.01)
*G02F 1/35* (2006.01)

(52) U.S. Cl.
CPC ........ *G02B 6/29395* (2013.01); *G02F 1/025* (2013.01); *G02F 2001/3509* (2013.01); *G02F 2201/17* (2013.01); *G02F 2203/05* (2013.01); *G02F 2203/07* (2013.01); *G02F 2203/15* (2013.01)

(58) Field of Classification Search
CPC ............ G02F 2203/07; G02B 6/29338; G02B 6/2938; G02B 6/29395
See application file for complete search history.

(56) References Cited

U.S. PATENT DOCUMENTS

| | | | |
|---|---|---|---|
| 4,933,021 A | 6/1990 | Swanson | |
| 5,107,319 A | 4/1992 | Lauterbach et al. | |
| 5,525,828 A | 6/1996 | Bassous et al. | |
| 5,658,811 A | 8/1997 | Kimura et al. | |
| 5,790,583 A * | 8/1998 | Ho | B82Y 20/00 372/108 |
| 5,793,913 A | 8/1998 | Kovacic | |
| 5,825,799 A * | 10/1998 | Ho | B82Y 20/00 372/108 |
| 5,917,967 A | 6/1999 | Dubey et al. | |
| 6,665,476 B2 * | 12/2003 | Braun | G02B 6/12002 385/14 |
| 6,759,675 B2 | 7/2004 | Csutak et al. | |
| 6,819,837 B2 * | 11/2004 | Li | G02B 6/12007 372/20 |
| 6,858,912 B2 | 2/2005 | Marshall et al. | |
| 6,873,021 B1 | 3/2005 | Mitros et al. | |
| 6,947,632 B2 * | 9/2005 | Fischer | G02B 6/12007 385/16 |
| 7,050,212 B2 * | 5/2006 | Matsko | H01S 3/0627 359/239 |
| 7,075,165 B2 | 7/2006 | Leon et al. | |
| 7,151,881 B2 | 12/2006 | West et al. | |
| 7,343,067 B2 * | 3/2008 | Barwicz | G01C 19/66 372/92 |
| 7,397,101 B1 | 7/2008 | Masini et al. | |
| 7,400,796 B1 * | 7/2008 | Kossakovski | G02B 6/29341 385/123 |
| 7,400,797 B2 | 7/2008 | Bhagavatula et al. | |
| 7,420,207 B2 | 9/2008 | Kim et al. | |
| 7,449,712 B2 | 11/2008 | Cha | |
| 7,539,418 B1 | 5/2009 | Krishnamoorthy et al. | |
| 7,583,874 B2 * | 9/2009 | Rakich | B82Y 20/00 359/346 |
| 7,616,850 B1 * | 11/2009 | Watts | G02B 6/29335 385/2 |
| 7,639,104 B1 | 12/2009 | Quevy et al. | |
| 7,667,200 B1 * | 2/2010 | Watts | G01J 5/08 250/338.1 |
| 7,672,558 B2 | 3/2010 | Keyser | |
| 7,751,655 B2 | 7/2010 | Fattal et al. | |
| 7,760,980 B2 | 7/2010 | West et al. | |
| 7,820,970 B1 * | 10/2010 | Shaw | G01J 5/08 250/338.1 |
| 7,826,688 B1 | 11/2010 | Sadagopan et al. | |
| 7,853,108 B2 * | 12/2010 | Popovic | B82Y 20/00 385/126 |
| 7,894,696 B2 * | 2/2011 | Baehr-Jones | B82Y 20/00 385/1 |
| 7,941,014 B1 * | 5/2011 | Watts | B82Y 20/00 385/2 |
| 7,983,517 B1 * | 7/2011 | Watts | G02B 6/29335 385/32 |
| 8,017,419 B2 * | 9/2011 | Yang | H01S 3/0632 372/94 |
| 8,068,706 B2 * | 11/2011 | Popovic | B82Y 20/00 385/131 |
| 8,326,098 B2 * | 12/2012 | Mandorlo | H01S 5/1075 372/67 |
| 8,472,489 B2 * | 6/2013 | Wada | H01S 5/1071 372/45.01 |
| 8,519,806 B2 | 8/2013 | Casset et al. | |
| 9,176,241 B2 | 11/2015 | Frach | |
| 9,978,890 B1 | 5/2018 | Bayn et al. | |
| 10,374,118 B2 | 8/2019 | Alloatti et al. | |
| 2002/0039470 A1 * | 4/2002 | Braun | G02B 6/12002 385/50 |
| 2002/0109153 A1 | 8/2002 | Ker et al. | |
| 2002/0154878 A1 | 10/2002 | Akwani et al. | |
| 2003/0104765 A1 | 6/2003 | Maeda et al. | |
| 2003/0123780 A1 * | 7/2003 | Fischer | G02B 6/12007 385/15 |
| 2003/0136440 A1 | 7/2003 | Machida et al. | |
| 2003/0183892 A1 | 10/2003 | Morse | |
| 2003/0223695 A1 * | 12/2003 | Li | G02B 6/12007 385/39 |
| 2004/0100675 A1 * | 5/2004 | Matsko | H01S 3/0627 359/245 |
| 2004/0146431 A1 | 7/2004 | Scherer et al. | |
| 2004/0160658 A1 | 8/2004 | Liu | |
| 2005/0051767 A1 | 3/2005 | Leon et al. | |
| 2005/0053347 A1 | 3/2005 | West et al. | |
| 2006/0109542 A1 * | 5/2006 | Mizuuchi | G02F 1/365 359/330 |
| 2006/0197959 A1 * | 9/2006 | Barwicz | G01C 19/66 356/470 |
| 2006/0215949 A1 * | 9/2006 | Lipson | G02F 1/025 385/2 |
| 2006/0245693 A1 * | 11/2006 | Barwicz | G01C 19/66 385/39 |
| 2007/0230854 A1 * | 10/2007 | Felix Keil | G02F 1/0121 385/1 |
| 2008/0166095 A1 * | 7/2008 | Popovic | B82Y 20/00 385/126 |
| 2008/0238796 A1 | 10/2008 | Rofougaran | |
| 2008/0272395 A1 | 11/2008 | Banna | |
| 2009/0116788 A1 * | 5/2009 | Rakich | B82Y 20/00 385/32 |
| 2009/0180748 A1 | 7/2009 | Stewart et al. | |
| 2009/0191657 A1 * | 7/2009 | Yang | H01S 3/0632 438/31 |
| 2009/0263078 A1 * | 10/2009 | Hosomi | G02B 6/12004 385/14 |
| 2010/0002994 A1 * | 1/2010 | Baehr-Jones | B82Y 20/00 385/32 |
| 2010/0061416 A1 * | 3/2010 | Mandorlo | H01S 5/1075 372/46.01 |
| 2010/0209038 A1 * | 8/2010 | Popovic | G02B 6/12007 385/1 |
| 2011/0012221 A1 | 1/2011 | Fujikata et al. | |
| 2011/0012693 A1 | 1/2011 | Casset et al. | |
| 2011/0026879 A1 * | 2/2011 | Popovic | B82Y 20/00 385/28 |
| 2011/0037133 A1 | 2/2011 | Su et al. | |
| 2011/0044362 A1 * | 2/2011 | Wada | H01S 5/1071 372/45.01 |
| 2011/0073989 A1 * | 3/2011 | Rong | G02F 1/025 257/532 |
| 2011/0075967 A1 | 3/2011 | Bratkovski et al. | |
| 2011/0089518 A1 | 4/2011 | Murshid | |
| 2011/0176762 A1 * | 7/2011 | Fujikata | G02F 1/025 385/2 |
| 2011/0235962 A1 * | 9/2011 | Shubin | G02B 6/12007 385/14 |

(56) References Cited

U.S. PATENT DOCUMENTS

| | | |
|---|---|---|
| 2012/0255599 A1 | 10/2012 | Xu et al. |
| 2013/0015760 A1 | 1/2013 | Chakraborty et al. |
| 2013/0224952 A1 | 8/2013 | Chang et al. |
| 2014/0193115 A1 | 7/2014 | Popovic |
| 2015/0036964 A1 | 2/2015 | Okano et al. |
| 2015/0331183 A1 | 11/2015 | Brown et al. |
| 2016/0171149 A1 | 6/2016 | Alloatti |
| 2016/0370607 A1* | 12/2016 | Akiyama ............ G02F 1/2257 |
| 2017/0040469 A1 | 2/2017 | Alloatti |
| 2017/0040487 A1 | 2/2017 | Alloatti |
| 2019/0326468 A1 | 10/2019 | Alloatti et al. |

FOREIGN PATENT DOCUMENTS

| | | | |
|---|---|---|---|
| JP | 2009-258257 A | 11/2009 | |
| JP | 2010-015041 A | 1/2010 | |
| JP | 2013-505485 A | 2/2013 | |
| WO | WO 98/53535 A | 11/1998 | |
| WO | WO 2006/022931 A2 | 3/2006 | |
| WO | WO 2010/055826 A | 5/2010 | |
| WO | WO 2012/122981 A1 | 9/2012 | |
| WO | WO 2013/051095 A | 4/2013 | |
| WO | WO-2013051095 A1 * | 4/2013 | ........... G02F 1/2257 |

OTHER PUBLICATIONS

Brimont et al., Design of a micro-ring resonator electro-optical modulator embedded in a reverse biased PN junction (2008), Physical Review B 85, 155441 (2012).*

Chen et al., First-principles analysis of photocurrent in graphene PN junctions, Phys. Rev. B 85, 155441 (2012).*

DeRose et al., "Silicon Microring Modulator with Integrated Heater and Temperature Sensor for Thermal Control," in Proc. Conference on Lasers and Electro-Optics/Quantum Electronics and Laser Science Conference (CLEO/QELS), OSA Technical Digest (CD) (Optical Society of America, 2010), San Jose, CA,CThJ3, 2 pages, May 2010.*

Dong et al, Wavelength-tunable silicon microring modulator, Opt. Express 18, 10941-10946 (2010).*

Gardes et al., High-speed modulation of a compact silicon ring resonator, Proceedings—6th IEEE International Conference on Group IV Photonics, p. FC2 (2009).*

Gardes et al., High-speed modulation of a compact silicon ring resonator based on a reverse-biased pn diode, Opt. Express 17, 21986-21991 (2009).*

Lv et al., Thermopower and conductance for a graphene p—n junction, Mar. 13, 2012, Journal of Physics: Condensed Matter, vol. 24, No. 14.*

Timurdogan et al., "L-Shaped Resonant Microring (LRM) Modulator", presented at the IEEE Optical Interconnects Conference, Santa FE, NM, 2013, pp. 19-20. doi: 10.1109/OIC.2013.6552903.*

Watts et al., "Vertical junction silicon microdisk modulators and switches", Opt. Exp. 19, 21989-22003 (2011).*

Watts et al "Adiabatic Resonant Microrings (ARMs) with Directly Integrated Thermal Microphotonics," in Proc. Conference on Lasers and Electro-Optics/Quantum Electronics and Laser Science Conference (CLEO/QELS), OSA Technical Digest (CD) (Optical Society of America, 2009), Baltimore, MD, Postdeadline, CPDB10, 2 pages, Jun. 2009, CPDB10.pdf, availabl.*

Michael R. Watts, "Adiabatic microring resonators," Opt. Lett. 35, 3231-3233 (2010).*

Xiao et al., 25 Gbig/s silicon microring modulator based on misalignment-tolerant interleaved PN Junctions, Optics Express, V. 20, N. 3, p. 2507 (published Jan. 19, 2012).*

Xiao et al., 44-Gb/s Silicon Microring Modulators Based on Zigzag PN Junctions, IEEE Photonics Tech Letters, V. 24, N. 19, 2012.*

Xu et. al., "Micrometre-scale silicon electro-optic modulator," Nature 435(7040), 325-327 (2005).*

Zortman et al., "Monolithic Integration of Silicon Electronics and Photonics," in Proc. IEEE Photonic Society Winter Topicals (WTM 2011), Keystone, Co, TuC2.3, pp. 139-140, 2011.*

Timurdogan et al., "An Interior-Ridge Silicon Microring Modulator," J. Lightwave Technol. 31, 3907-3914 (2013).*

Mekis et al., A Grating-Coupler-Enabled CMOS Photonics Platform, in IEEE Journal of Selected Topics in Quantum Electronics, vol. 17, No. 3, pp. 597-608, May-Jun. 2011; doi: 10.1109/JSTQE.2010.2086049.*

Cohen et al., High-Q microphotonic electro-optic modulator, Solid-State Electronics 45 (2001).*

Daniel et al., Dynamic mode theory of optical resonators undergoing refractive index changes, J. Opt. Soc. Am. B, V. 28, N. 9, 2011.*

Hagness et al., FDTD Microcavity Simulations: Design and Experimental Realization of Waveguide-Coupled Single-Mode Ring and Whispering-Gallery-Mode Disk resonators, Journal of Lightwave Technology, vol. 15, n.degree. 11, 1997.*

Rosenberg et al., A 25 Gbps silicon microring modulator based on an interleaved junction, Optics Express, V. 20, N. 24, p. 26511, 2012.*

Li et al., Silicon waveguide modulator based on carrier depletion in periodically interleaved PN junctions, V. 17, No. 18 / Optics Express, V. 17, N. 18, 2009.*

8. Li et al., Low driving-voltage optical modulator based on carrier depletion in silicon with periodically interleaved P-N junctions, 2008 5th IEEE International Conference on Group IV Photonics, WA5.*

Extended European Search Report for Application No. EP 14811277.4 dated Dec. 22, 2016.

EP 17182557.3, dated Sep. 2, 2018, Extended European Search Report.

Extended European Search Report dated Sep. 2, 2018 in connection with European Application No. 17182557.3

Japanese Notification of Reasons for Refusal and English machine translation thereof dated May 2, 2018 in connection with Japanese Application No. 2016-519655.

International Preliminary Report on Patentability for Application No. PCT/US2014/042177 dated Dec. 23, 2015.

Baehr-Jones et al., High-Q ring resonators in thin silicon-on-insulator. Applied Physics Letters. 2004; 85(16): 3346-7.

Chin et al., Design and modeling of waveguide-coupled single-mode microring resonators. Journal of Lightwave Technology. 1998; 16(8): 1433-46.

Hosseini et al., Systematic design and fabrication of high-Q single-mode pulley-coupled planar silicon nitride microdisk resonators at visible wavelengths. Opt Express. Feb. 1, 2010;18(3):2127-36.

Chinese Office Action for Application No. CN 201480044850X dated Jan. 30, 2018.

Yu et al., Silicon Carrier-Depletion-Based Mach-Zehnder and Ring Modulators with Different Doping Patterns for Telecommunication and Optical Interconnect. ICTON2012. 2012;1-5.

Ziebell et al., Ring resonator silicon optical modulator based on interleaved PN junctions. Proc of SPIE. 2012;8431:84310J-1-6.

Ziebell et al., Ten Gbit/s ring resonator silicon modulator based on interdigitated PN junctions. Optics Express. Jul. 18, 2011;19(15):14690-5.

Investigation of the SiGe Waveguide Photodiodes Using FDTD Method for High Speed Optical Communication, The Standard Simulation, 3 pages (2010). https://www.silvaco.com/tech_lib_TCAD/ . . . /2010/apr . . . /april_may_june_a1.pdf.

Final Office Action dated Oct. 5, 2018 from U.S. Appl. No. 15/332,877, 10 pages.

Georgas, et al., "A Monolithically-Integrated Optical Transmitter and Receiver in a Zero Change 45nm SOI Process," 2014 Symposium on VLSI Circuits Digest of Technical Papers (Jul. 21, 2014), p. 1, col. 1, 2 pages.

International Search Report and Written Opinion issued by the International Searching Authority in regards to International Application No. PCT/US2016/040491, dated Nov. 4, 2016, 17 pages.

International Search Report and Written Opinion dated Mar. 16, 2017 for International Application No. PCT/US2016/039741.

Non-Final Office Action dated Jan. 26, 2018 for U.S. Appl. No. 15/332,877, 20 pages.

(56) References Cited

OTHER PUBLICATIONS

International Search Report and Written Opinion dated Oct. 23, 2014, issued in PCT Application No. PCT/US2014/042177.

* cited by examiner

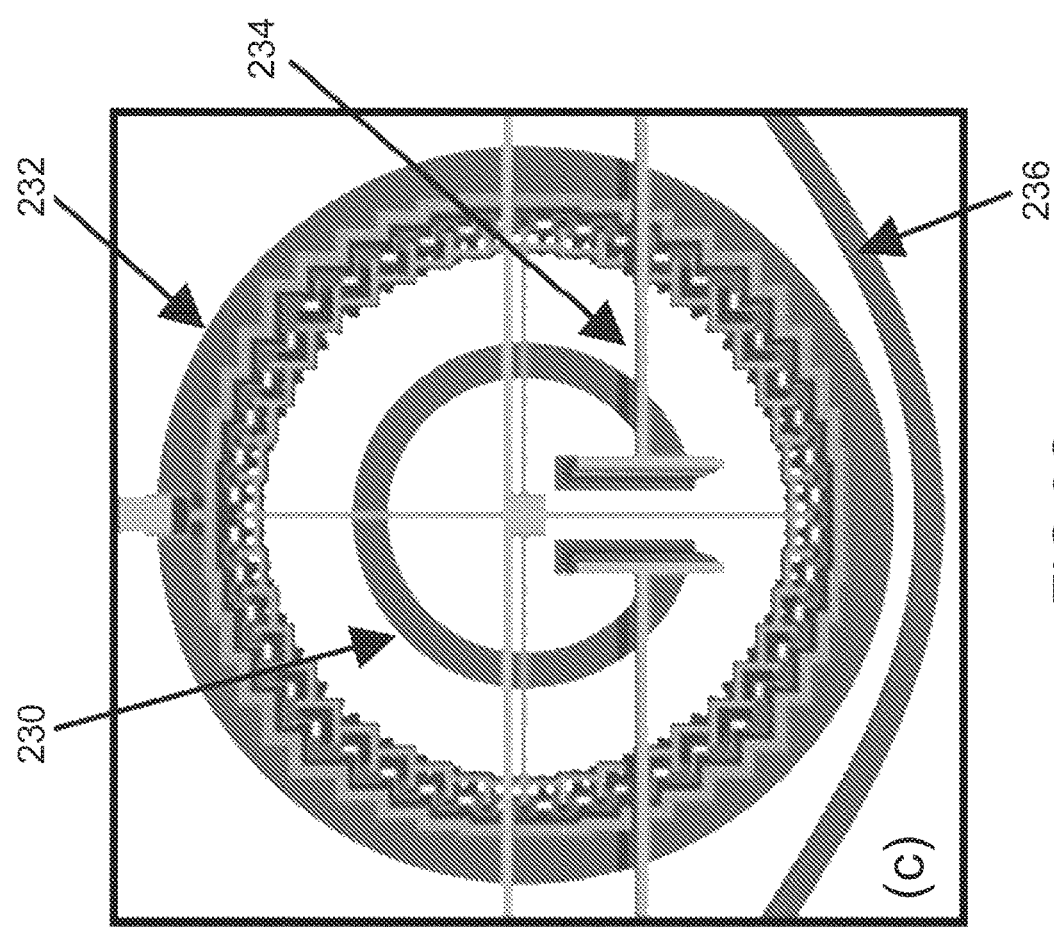
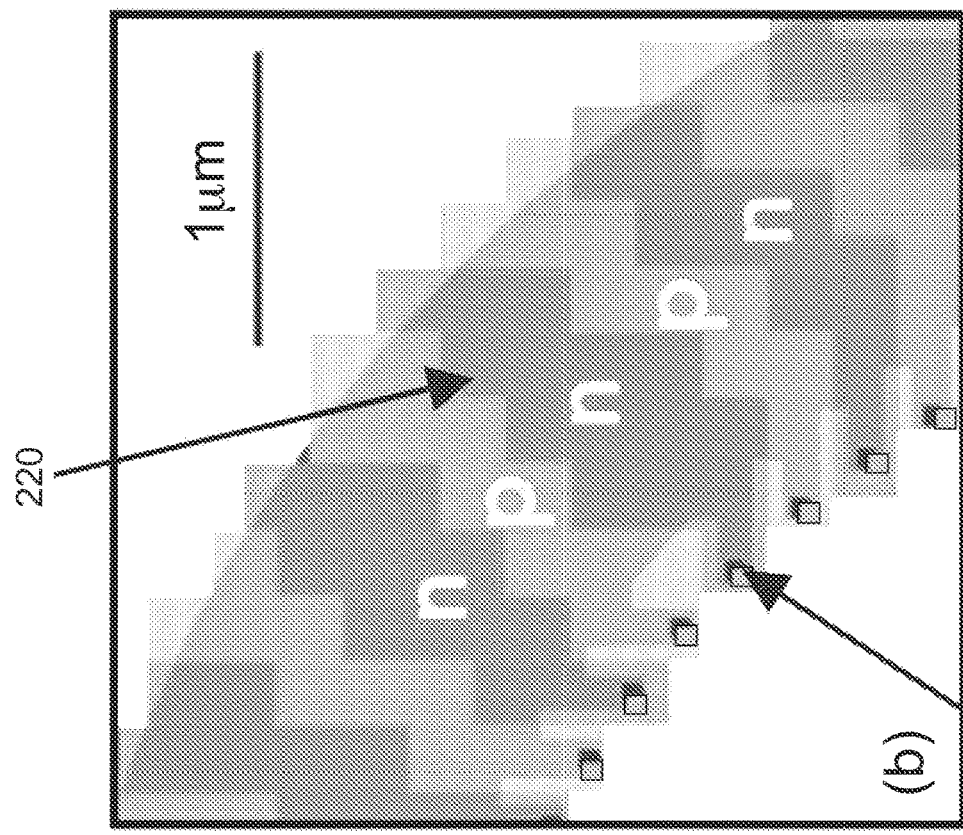
FIG. 2C
FIG. 2B

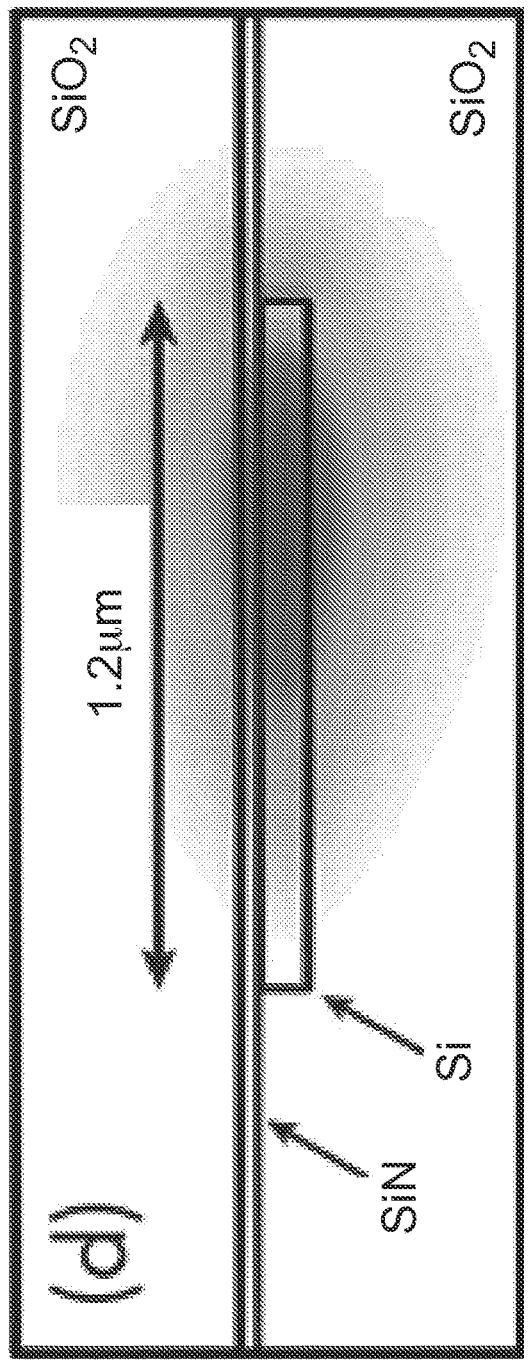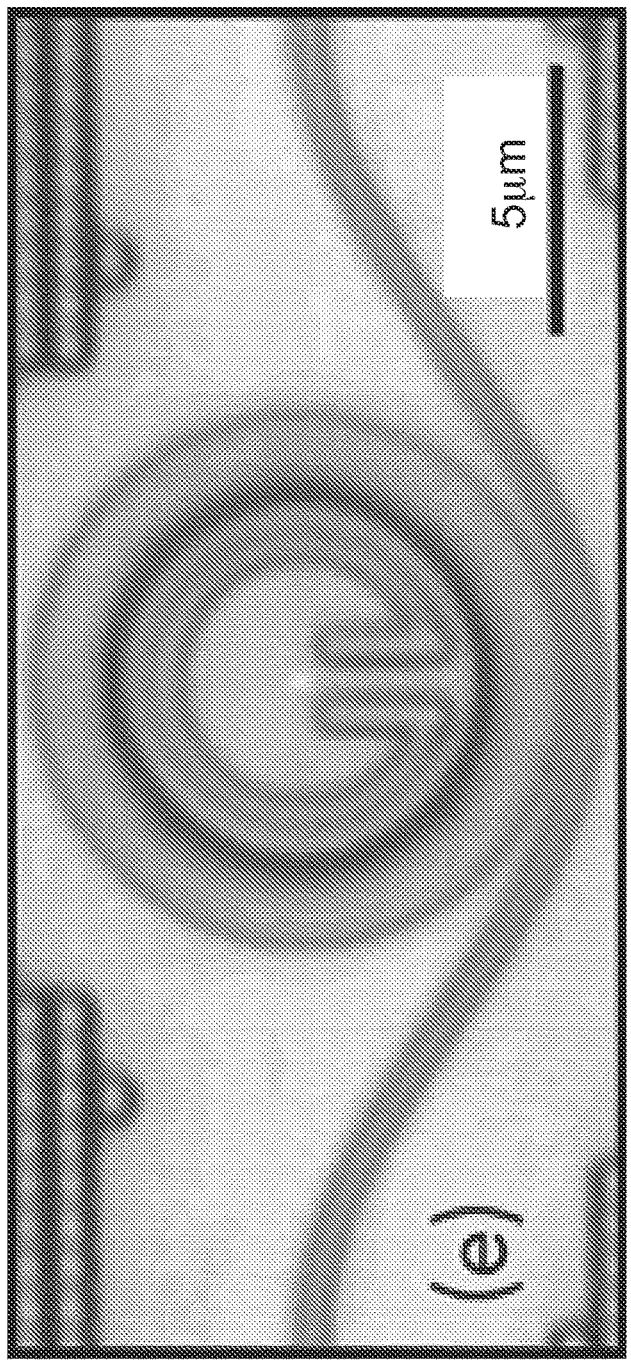
FIG.3D
FIG.3E

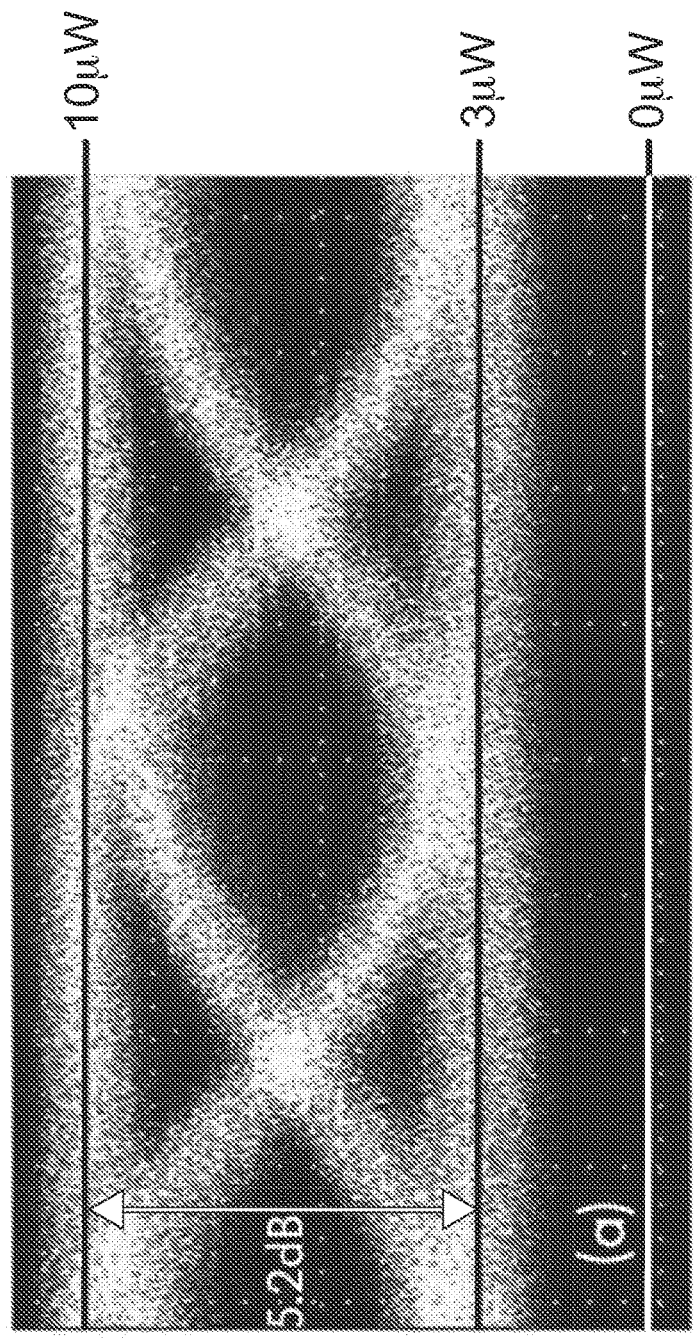
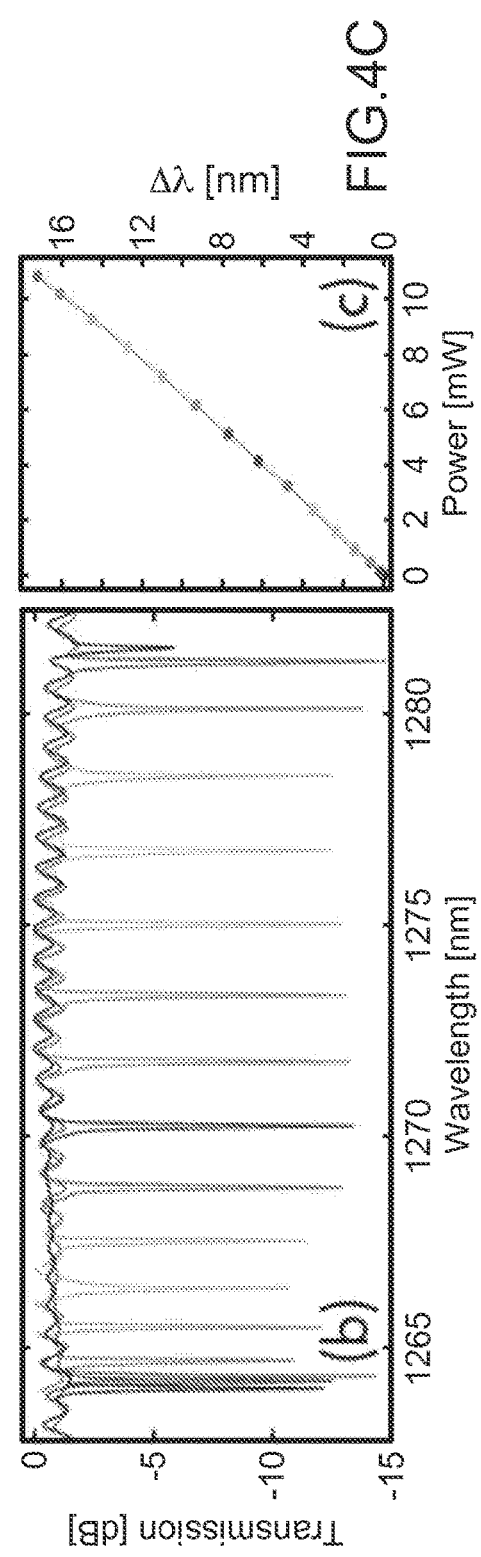
FIG. 4A
FIG. 4B
FIG. 4C

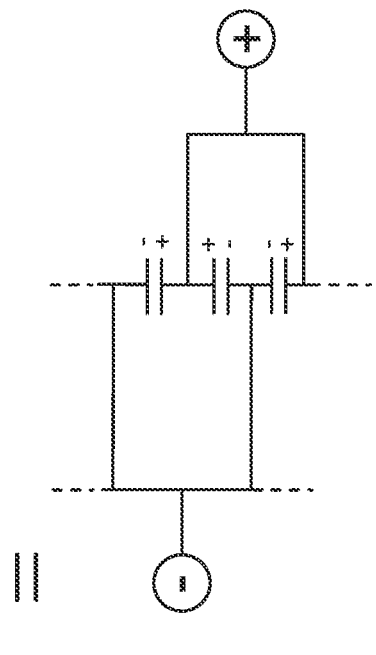
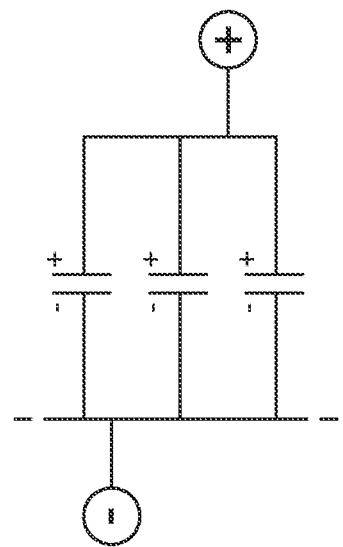
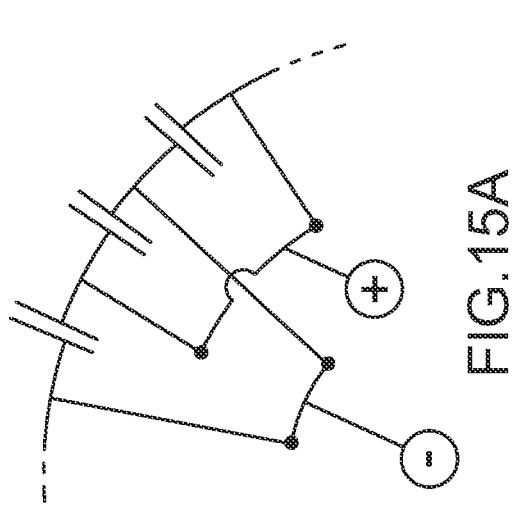
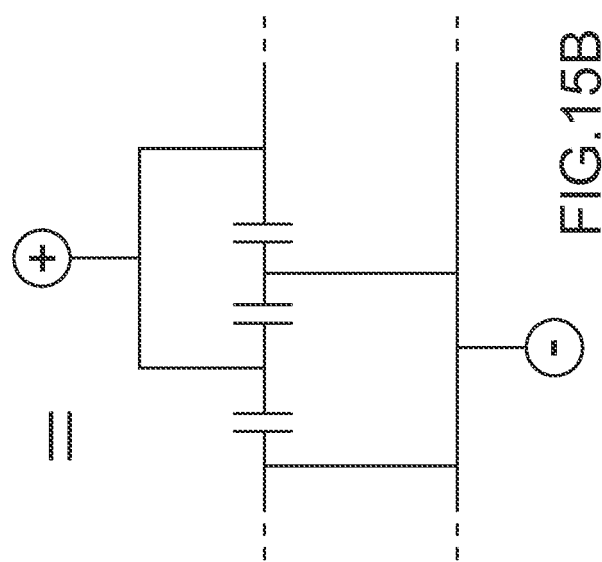
FIG.15C
FIG.15D
FIG.15A
FIG.15B

OPTICAL MODULATOR FROM STANDARD FABRICATION PROCESSING

CROSS-REFERENCE TO RELATED APPLICATION

This application is a 35 U.S.C. § 371 national stage filing of International Application No. PCT/US2014/042177, filed Jun. 12, 2014, entitled "Optical Modulator From Standard Fabrication Processing," which claims priority, under 35 U.S.C. § 119(e), to U.S. Provisional Application No. 61/834,362, filed Jun. 12, 2013, and entitled "Depletion-Mode Carrier-Plasma Optical Modulator In Zero-Change Advanced CMOS," each of which is hereby incorporated by reference in its entirety, including drawings.

GOVERNMENT SUPPORT

This invention was made at least in part using government support under contract nos. W911NF-10-1-0412 and HR0011-11-C-0100 awarded by the Defense Advanced Research Projects Agency (DARPA). The government has certain rights in the invention.

BACKGROUND

Silicon photonics can be used to facilitate energy efficient photonic links and interconnects that may play a role in continued scaling of complimentary metal-oxide semiconductor (CMOS) and computational power. To be compatible with CMOS technology, including CPUs and DRAM, silicon photonics should be compatible with state-of-the-art CMOS processes.

SUMMARY

The Inventors have appreciated the benefit of designing photonic devices that can be built using complimentary metal-oxide semiconductor (CMOS) technologies or other types of semiconductor fabrication technologies. The photonic devices according to the principles described herein can be configured, e.g., as passive photonics in zero-change advanced CMOS, or as active photonics in zero-change advanced processes. Non-limiting examples of the active photonic devices include modulators and detectors.

In view of the foregoing, various examples described herein are directed generally to systems, apparatus and methods for fabricating a photonic device using a semiconductor fabrication tool. An example photonic device according to the principles described herein can be configured as a depletion-mode modulator. The example photonic device can be fabricated in a standard CMOS process.

Various example systems, apparatus and methods described herein are directed generally to example optical modulators that include an optical resonator structure. The optical resonator structure includes at least one non-linear portion, the at least one non-linear portion comprising at least one radial junction region. The at least one radial junction region is formed between at least first and second materials, respectively, having different electronic conductivity characteristics. A principal axis of the at least one radial junction region is oriented along a radius of curvature of the at least one non-linear portion. The optical modulator includes an optical waveguide that is coupled to the at least one non-linear portion of the optical resonator structure.

In an example, the at least one radial junction region can have a zig-zag conformation along the principal axis.

In an example, the at least one non-linear portion is formed from a semiconductor material including at least a first region and a second region respectively having different doping characteristics, where the at least one radial junction region is disposed at an intersection between the first region and the second region. In an aspect, the different doping characteristics include at least one of different types of dopants and different concentrations of at least one dopant. In an aspect, the at least one radial junction region can be at least one of a p-n junction region, a p-i-n junction region, a p+-n junction region, a p+-p junction region, a p+-p-n+ junction region, a p+-p-n-n+ junction region, a metal-oxide-semiconductor capacitor structure, a metal-insulator-metal junction region and a Schottky junction.

The example optical resonator structure can have a substantially circular conformation, where the optical resonator structure comprises a microring resonator with optical confinement provided by a step index boundary at an outer radius of the microring resonator.

In an aspect, the microring resonator can be so dimensioned as to couple to only a first-order mode of an inner cavity of the microring resonator.

In an aspect, an inner cavity boundary of the microring resonator can include a plurality of independent contacts. In an example according to this aspect, a width of a ring of the microring resonator is sufficiently wide to significantly reduce optical loss due to interaction of an optical mode of the microring resonator with the plurality of independent contacts.

In an example, the at least one radial junction region can include alternating lateral p-n junctions distributed around a portion of the microring resonator.

The inner cavity boundary of the microring resonator can include a plurality of independent contacts, and wherein the plurality of independent contacts are in electrical communication with the p-n junctions.

The first optical waveguide can include an input port and a through port, the input port being configured to receive an input signal.

At least a portion of the optical modulator can be so dimensioned such that, when an input signal is present at the input port, a change in depletion width between two bias states of the p-n junctions provides an optical resonant frequency shift to modulate electromagnetic radiation output at the through port.

In an example, a coupling interaction between the first optical waveguide and the optical resonator excludes excitation of higher-order modes in the optical resonator, the presence of the higher-order modes being due to a width of a ring of a microring resonator of the optical resonator.

In an example, a second optical waveguide can be coupled to the optical modulator in a phase-matched configuration for use as a through port or a drop port of the optical modulator.

In an example, a second optical waveguide can be coupled to the optical modulator in a non-phase-matched configuration as a coupler for use as a drop port and dimensioned to receive electromagnetic radiation only from a first-order mode of an inner cavity of the optical resonator structure.

The at least one non-linear portion can be formed from a semiconductor material, and wherein the semiconductor material is at least one of silicon, amorphous silicon, polycrystalline silicon, a III-V semiconductor material, germanium, graphene or any combination of two of more of these semiconductor materials.

Various example systems, apparatus and methods described herein are directed generally to example wavelength-division multiplexing systems that include a plurality of optical modulators, each coupled with a through bus waveguide and aligned to a specified resonant wavelength. At least one optical modulator of the plurality of optical modulators includes an optical resonator structure including at least one non-linear portion, the at least one non-linear portion including at least one radial junction region. The at least one radial junction region is formed between at least first and second materials, respectively, having different electronic conductivity characteristics. A principal axis of the at least one radial junction region is oriented along a radius of curvature of the at least one non-linear portion.

In an example, a portion of a microring resonator of each optical modulator is doped to reduce electrical resistance such that electrical current applied to a portion of an optical cavity of the microring resonator produces Joule heating for thermal tuning of optical resonances of the optical cavity.

Various example systems, apparatus and methods described herein are directed generally to example optical modulator devices formed using a semiconductor fabrication tool, based on a design rule check of the semiconductor fabrication tool. The optical modulator device includes an optical resonator structure that includes at least one non-linear portion. The at least one non-linear portion includes at least one radial junction region. The at least one radial junction region is formed between at least first and second materials, respectively, having different electronic conductivity characteristics, and a principal axis of the at least one radial junction region is oriented along a radius of curvature of the at least one non-linear portion. The example optical modulator devices also includes a transistor layer disposed proximate to the optical resonator structure.

The example optical modulator device can include a microring resonator disposed in a portion of the transistor layer.

In an example, the optical resonator exhibits optical confinement provided by a step index boundary at an outer radius of the microring resonator.

In an example, the inner cavity boundary of the microring resonator can include a plurality of independent contacts.

In an example, an electrical contact can be made to each of the plurality of independent contacts by a metal and/or by via layers.

In an example, a portion of the microring resonator is doped to reduce electrical resistance to permit passing of electrical current through the inner cavity to produce Joule heating sufficient for thermal tuning of optical resonances of the inner cavity.

In an example, either a portion of transistor body silicon near the optical modulator, or a portion of metals or deposited silicon present in an SOI CMOS transistor fabrication process, is used to produce the Joule heating.

In an example, a width of a ring of the microring resonator is sufficiently wide to permit sufficiently low optical loss due to interaction of an optical mode with the plurality of independent contacts.

In an example, the optical modulator device includes a microheater disposed proximate to a portion of the inner cavity of the of the microring resonator.

In an example, the semiconductor fabrication tool can be a 0.35 μm complementary metal-oxide-semiconductor (CMOS) fabrication tool, a 0.25 μm CMOS fabrication tool, a 0.18 μm CMOS fabrication tool, a 0.13 μm CMOS fabrication tool, a 65 nm CMOS fabrication tool, a 45 nm CMOS fabrication tool, a 32 nm CMOS fabrication tool, a 22 nm CMOS fabrication tool, a 65 nm silicon-on-insulator (SOI) fabrication tool, a 45 nm SOI fabrication tool, a 32 nm SOI fabrication tool, a 22 nm SOI fabrication tool, a 14 nm FinFET fabrication tool, a 22 nm FinFET fabrication tool, or a III-V semiconductor fabrication tool.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2B shows example details of contacts and lateral junctions of the example integrated modulator, according to the principles described herein.

FIG. 2C shows a top view of an example integrated modulator showing a central heater, according to the principles described herein.

FIG. 3D shows an example of calculated cross-sectional mode profile, according to the principles described herein.

FIG. 3E shows an example of an optical micrograph of an example device, according to the principles described herein.

FIG. 4A shows an example of an optical eye diagram, according to the principles described herein.

FIG. 4B shows an example of thermal tuning of a modulated resonance, according to the principles described herein.

FIG. 4C shows an example of linear resonance tuning vs. heater power, according to the principles described herein.

FIGS. 15A-15D show examples of an effective capacitor circuit representation, according to the principles described herein.

Figure 1A:
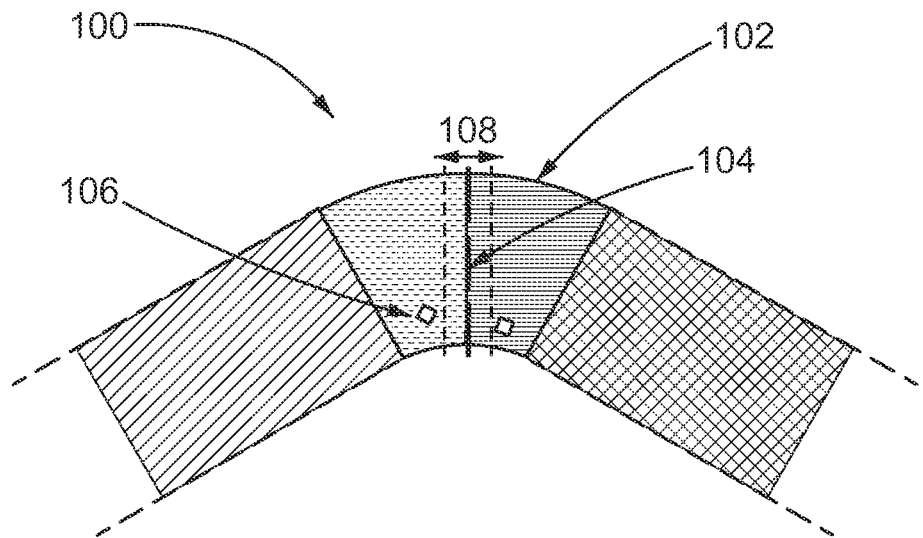
FIGS. 1A-1B show a portion of an example optical resonator structure, according to the principles described herein.

The features and advantages of the present invention will become more apparent from the detailed description set forth below when taken in conjunction with the drawings.

DETAILED DESCRIPTION

Following below are more detailed descriptions of various concepts related to, and embodiments of, inventive systems, methods and apparatus for providing photonic devices based on optical resonator structures. It should be appreciated that various concepts introduced above and described in greater detail below may be implemented in any of numerous ways, as the disclosed concepts are not limited to any particular manner of implementation. Examples of specific implementations and applications are provided primarily for illustrative purposes.

As used herein, the term "includes" means includes but is not limited to, the term "including" means including but not limited to. The term "based on" means based at least in part on.

With respect to substrates or other surfaces described herein in connection with various examples of the principles herein, any references to "top" surface and "bottom" surface are used primarily to indicate relative position, alignment and/or orientation of various elements/components with respect to the substrate and each other, and these terms do not necessarily indicate any particular frame of reference (e.g., a gravitational frame of reference). Thus, reference to a "bottom" of a substrate or a layer does not necessarily require that the indicated surface or layer be facing a ground surface. Similarly, terms such as "over," "under," "above," "beneath" and the like do not necessarily indicate any particular frame of reference, such as a gravitational frame of reference, but rather are used primarily to indicate relative position, alignment and/or orientation of various elements/components with respect to the substrate (or other surface) and each other. The terms "disposed on" and "disposed over" encompass the meaning of "embedded in," including "partially embedded in." In addition, reference to feature A being "disposed on," "disposed between," or "disposed over" feature B encompasses examples where feature A is in contact with feature B, as well as examples where other layers and/or other components are positioned between feature A and feature B.

According to the example systems, methods and apparatus described herein, photonic device structures are described herein that can be fabricated using standard device fabrication tools, including CMOS fabrication tools.

In any example systems, methods and apparatus described herein, the device fabrication tool can be a 0.35 µm complementary metal-oxide-semiconductor (CMOS) fabrication tool, a 0.25 µm CMOS fabrication tool, a 0.18 µm CMOS fabrication tool, a 0.13 µm CMOS fabrication tool, a 65 nm CMOS fabrication tool, a 45 nm CMOS fabrication tool, a 32 nm CMOS fabrication tool, a 22 nm CMOS fabrication tool, a 65 nm silicon-on-insulator (SOI) fabrication tool, a 45 nm SOI fabrication tool, a 32 nm SOI fabrication tool, a 22 nm SOI fabrication tool, a 14 nm FinFET fabrication tool, a 22 nm FinFET fabrication tool, or a group III-V semiconductor fabrication tool.

An example system and device herein can be fabricated based on a semiconductor material, the semiconductor material being at least one of silicon, amorphous silicon, polycrystalline silicon, a III-V semiconductor material, germanium, graphene or any combination of two of more of these semiconductor materials.

As a non-limiting example, a depletion-mode optical modulator can be fabricated in a commercial 45 nm CMOS logic process according to the principles described herein, with no modifications required within the foundry.

An example photonic device according to the principles described herein can be fabricated in a standard CMOS process, including a 45 nm logic CMOS process, such as but not limited to a IBM 12SOI (IBM, Armonk, N.Y.). As a non-limiting example, the fabrication of the photonic devices herein can be performed based on an example process utilized to fabricate an IBM Cell™ or a Power7™ processor.

The example systems, methods and apparatus described herein can facilitate the production of complete optical links monolithically integrated with advanced CMOS electronics, implemented directly in existing advanced-node CMOS foundries.

To facilitate the continued scaling of massively multicore processors and the realization of the exascale supercomputing paradigm, processor-to-memory interconnect power consumption should be dramatically reduced while data bandwidth density is increased. Wavelength-division multiplexed (WDM) optical interconnects are emerging as a promising technology to replace electrical CPU-DRAM interconnects.

The example systems, methods and apparatus described herein can be used to fabricate optical interconnects based on photonic components monolithically integrated with state-of-the-art microelectronics, with no process changes required.

Certain example implementations herein are configured with the restriction that no modifications to the process flow are allowed by the foundry. Accordingly, the example implementations can be fabricated using a CMOS tool that required no modifications to design rules. To accomplish this, examples herein provide a novel modulator structure.

In certain example implementations, a single post-processing step may be performed to remove the fabrication substrate, to provide enhanced optical confinement (up to and including complete optical confinement). The removal of the substrate is demonstrated to have little or no appreciable effect on the performance of the electronics on chip.

The example systems, methods and apparatus herein facilitate the fabrication of photonic devices and structures that could be used as photonic links and interfaces in advanced CMOS electronics. For example, an energy-efficient, depletion-mode optical modulator that is fully compatible with a native CMOS process flow can be fabricated according to the principles described herein. The approach herein can be implemented to effectively eliminate any need for hybrid integration, modifications to existing CMOS processes, or even additional lithographic masks. Other devices described as CMOS compatible depend on a thick silicon device layer with partial etch steps, vertical junctions (which can be ill-suited for implementation in a thin transistor device layer), or specific implantation conditions not common to transistors—none of which is typically available in a state-of-the-art CMOS process used for microprocessors (such as a sub-100 nm CMOS process used for microprocessors). It is envisioned that any of these techniques could be implemented in an example photonic device according to the principles described herein without departing from the scope of this disclosure.

In an example implementation, the photonic device is configured as a multimode ring cavity formed in a fully-etched transistor body silicon layer. In certain examples, the photonic device can be configured to support a transverse (i.e., radial) multimode character of whispering gallery or microring resonator optical modes, where increasing order modes have an increasing number of field nulls along the radial direction (including along the out of the plane of the chip, z). Optical mode confinement can be provided by the outer-radius step-index boundary of the cavity.

FIG. 1A shows a portion of an example optical resonator structure 100 according to the principles described herein. The example optical resonator structure 100 includes a non-linear portion 102. The non-linear portion 102 includes a junction region 104 formed between materials of differing electronic properties, such as two materials having differing electrical conductivity characteristics. As shown in the example of FIG. 1A, the junction region 104 is oriented radially along the non-linear portion of the example optical resonator structure 100. That is, a principal axis of the junction region 104 is oriented along an effective radius of curvature of the at least one non-linear portion 102. In various examples, the non-linear portion can have a meander, curved, sinusoidal, oval, parabolic, or any other non-linear conformation. The example optical resonator structure 100 of FIG. 1A includes a non-linear portion 102 that has a curved conformation.

As shown in FIG. 1A, the example optical resonator structure 100 can include at least one electrical contact 106. The electrical contact(s) provide an electrical communication that can be used to effect a change in electrical property of the at least one radial junction region of the resonator structure.

A non-limiting example system, method and apparatus for tuning an optical property of an example optical resonator structure herein is as follows. The electrical properties of the delta region 108 surrounding the junction region 104 can be modulated by controlling the current or voltage applied at the at least one electrical contact 106. That is, through control of the current or voltage applied at the electrical contacts, the effective refractive index of portions of the example optical resonator structure 100 can be tuned. For example, the effective refractive index of portions of the resonator structure can be tuned through modification of the carrier concentration via controlling the current or voltage at the electrical contacts. In an example, the example optical resonator structure 100 can be tuned, to control the type of optical mode, including the order of the optical mode that couples to the example optical resonator structure 100.

In an example, one or more portions of the resonator structure can be tuned to facilitate greater optical coupling between the resonator structure and an optical waveguide. For example, based on the allowed variations in the manufacture process, a resonator structure may not be optimally tuned to couple with a waveguide coupler. Through the selective modification of the carrier concentration at selected radial junction regions (e.g., by changing the width of the depletion zone), the coupling between the resonator structure and the optical waveguide can be optimized. By tuning the carrier concentration with the application of a voltage, the example structure may be tuned into and out of resonance with a driving optical signal in the optical waveguide, and may thus absorb or transmit more or less of the optical waveguide signal, causing the desired modulation.

In another example, if a curved coupler is formed, with propagation constant correlating or matching to a resonator structure mode, then solely or mainly the fundamental optical mode may be coupled between the resonator structure and the optical waveguide. This design feature facilitates isolating the incident optical signals in the waveguide from coupling to other, higher order (and potentially higher loss) undesired resonator modes.

In an example implementation, one or more electrical contacts can be placed at a portion of an inner-radius boundary of the resonator cavity of the optical resonator structure 100. In an example, the electrical contacts may be placed far enough radially inward from the inner-radius boundary to avoid scattering light in an optical mode. The optical mode may be preferentially confined to the outer boundary by the curvature of the boundary wall. For example, a simple disk resonator has whispering gallery modes that are confined to the outer boundary, and hence have no substantial light, in a certain optical mode, at a sufficiently far distance radially inward from the disk boundary.

Figure 1B:
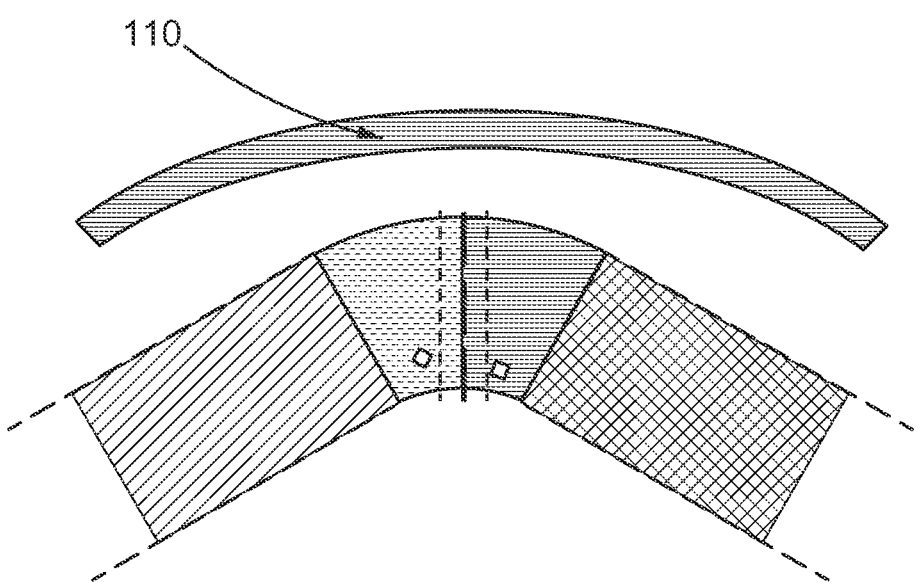

FIG. 1B shows a portion of an example optical waveguide 110 that can be disposed proximate to the non-linear portion of an example optical resonator structure 100. The example optical waveguide 110 can have a linear conformation or a non-linear conformation. As described hereinbelow, the material composition and dimensions (including width) of the example optical waveguide 110 can be configured such that only desired optical modes couple to the example optical resonator structure 100. For example, the optical waveguide 110 can be configured such that only a fundamental optical mode couples to the optical resonator structure 100.

As illustrated in FIG. 1A, in an example implementation, the portion of the optical waveguide 110 proximate the optical resonator structure 100 can have a non-linear conformation with a similar radius of curvature.

In an example, the non-linear portion of the optical resonator structure 100 can be formed from a semiconductor material. The radial junction region can be formed at an intersection between regions of the non-linear portion that are configured to have differing doping characteristics. The differing doping characteristics can be at least one of a different type of dopant and a different concentration of at least one dopant.

The at least one radial junction region can be formed as at least one of a p-n junction region, a p-i-n junction region, a p+-n junction region, a p+-p junction region, a p+-p-n+ junction region, a p+-p-n-n+ junction region, a metal-oxide-semiconductor capacitor structure, a metal-insulator-metal junction region and a Schottky junction. Lateral p-n junctions can be used for index modulation, and can be formed from implants present in the transistor process. More generally, various example implementations may include other types of junctions, including p-i-n, p+-n, p+-p, p+-p-n+ and other junction types. Other example implementations could also include metal-oxide-semiconductor capacitor structures, or metal-insulator-metal and Schottky junctions.

In the example of FIGS. 1A and 1B, the radial junction region is illustrated as extending substantially across an entire width of the portion of the optical resonator structure 100. In other examples, the radial junction region extends across less than the width of the portion of the optical resonator structure 100.

Figure 1C:
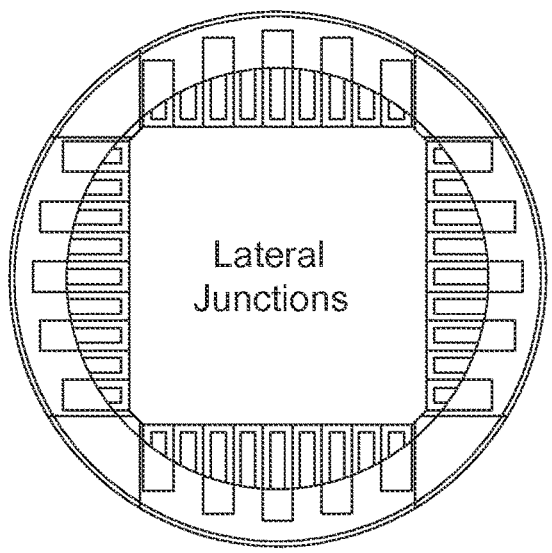
FIGS. 1C-1E show examples of modulators, according to the principles described herein.
Figure 1D:
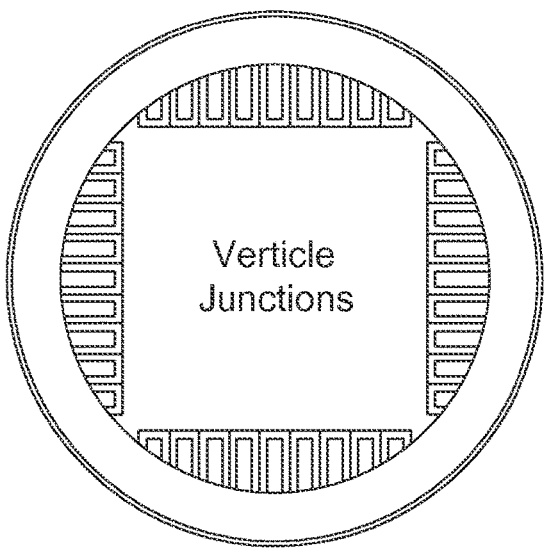

FIGS. 1C and 1D show examples of optical modulator structures that include lateral junctions and vertical junctions, respectively. In an example, a modulator structure herein can be configured to include a radial junction and at least one of a lateral junction and a vertical junction.

Figure 1E:
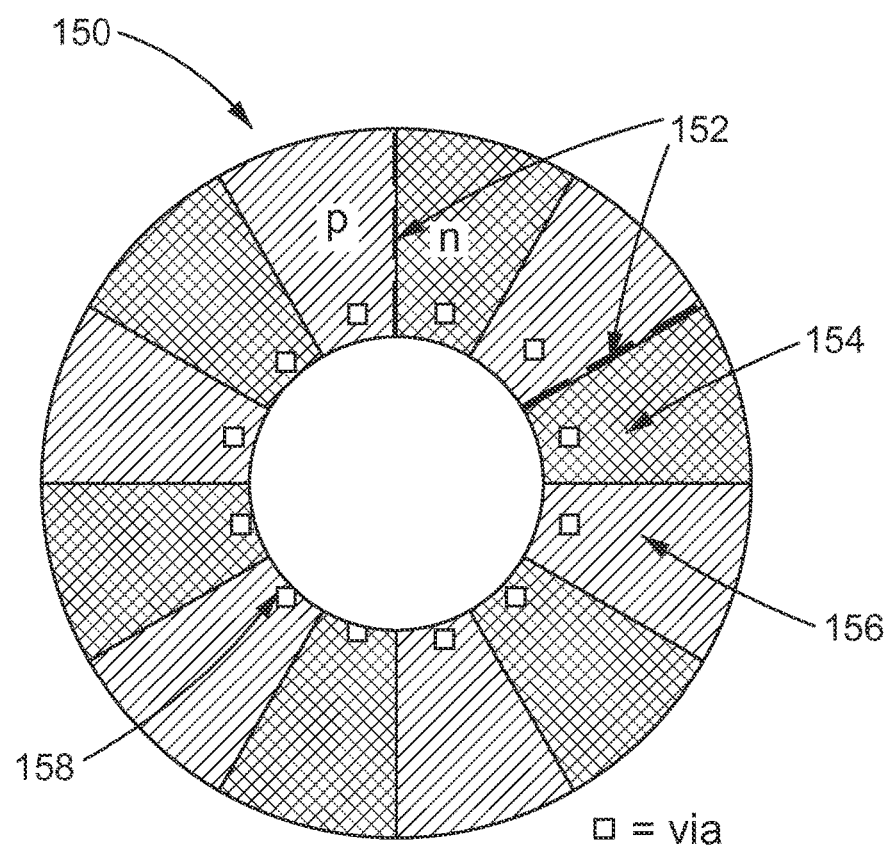

FIG. 1E shows an example modulator structure according to the principles described herein, with an optical resonator structure 150 formed as a substantially circular structure. The optical resonator structure 150 includes a plurality of junction regions 152. Each junction region 152 has a principal axis oriented along a radius of curvature of the optical resonator structure. Each junction region is formed between two materials 154 and 156, where material 154 has differing electrical conductivity characteristics from material 156. Any one or more of electrical contacts 158 are formed in the structure, for example, as p+ regions or n+ regions, as a silicide, as a tungsten plug, or as metal vias.

The modulators design of FIG. 1E can be fabricated from a thin body silicon (e.g., approximately 80 nm thick), with no requirement of a vertical junction being included, and no requirement of a partial etch.

Figure 2A:
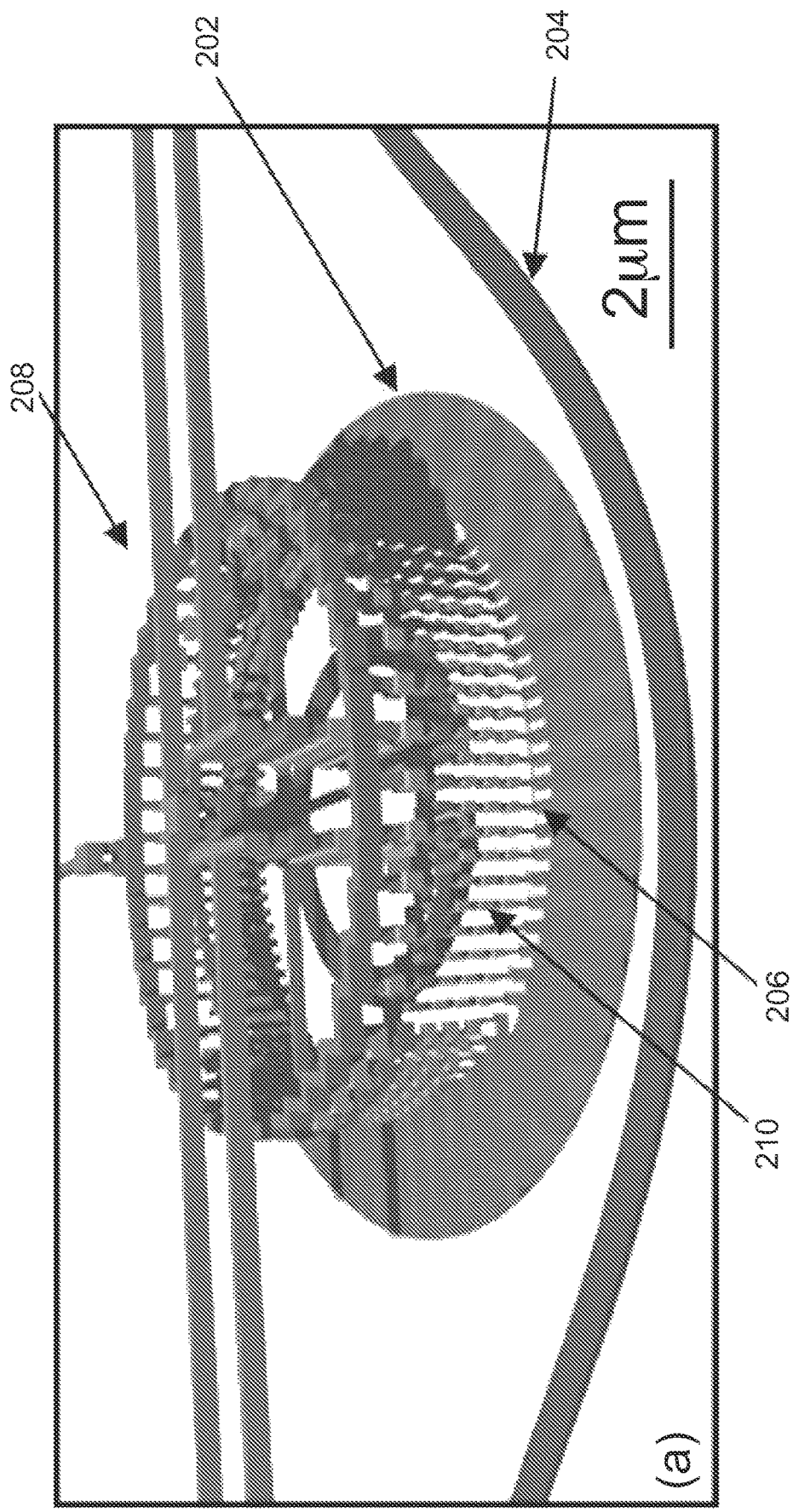
FIG. 2A shows a layout of an example integrated modulator, according to the principles described herein.

FIG. 2A shows an example three-dimensional (3D) layout of a monolithically integrated optical modulator, according to the principles described herein. The example optical modulator includes a plurality of radial p-n junction regions 202, a mode-selective waveguide coupler 204 disposed proximate the plurality of radial p-n junction regions, and a plurality of electrical contacts 206 disposed along an inner ring of the example optical modulator. The optical modulator system includes a back-end metal stackup 208 that includes a plurality of electrical conduits 210 that are each in electrical communication with at least one of the electrical contacts 206. The electrical conduits 210 are configured to not come into physical contact with a portion the resonator structure that is intended to support an optical mode, to avoid attenuation of the signal. As shown in FIG. 2A, the electrical conduits 210 extend from the back-end metal stackup 208 to form the electrical communication with the electrical contacts 206, without coming into contact with the radial p-n junction regions. The modulator in FIG. 2A includes a device layer, implant masks, and several layers of electrical connections including vias and metals. In the non-limiting example of FIG. 2A, the mode-selective waveguide coupler 204 is configured as a coupling bus having a portion with a curved configuration. As shown in FIG. 2A, the coupling bus can be configured as a curved coupling bus. In other examples, the coupling bus can be configured as a substantially straight coupling bus. The back-end metal stackup 208 can be in communication with an integrated circuit, a heater, or any other component.

FIG. 2B shows a portion of an example resonator structure, according to the principles herein. The example resonator structure includes a plurality of radial junction regions 220, each having a principal axis oriented along a radius of curvature of the example resonator structure. As shown in FIG. 2B, the interface between two materials forming the radial junction region 220 can be fabricated with a zig-zag-shaped conformation along the principal axis. In other examples, the interface can be between two materials forming the radial junction region 220 can be fabricated substantially smoother. The shape(s) achievable for the materials interface along the junction region can vary depending on the feature resolution and design rule check of the CMOS fabrication tool. FIG. 2B also shows the plurality of electrical contacts 222 disposed in a ring along the inner cavity of the example resonator structure.

FIG. 2C shows a top view of an example monolithically integrated modulator according to the principles described herein. The example modulator includes a central heater 230 disposed proximate to an optical resonator structure 232, contacts 234 to the central heater 230, and an optical waveguide 236 disposed proximate to a portion of the optical resonator structure 232. The example optical resonator structure 232 includes at least one radial junction region.

In a non-limiting example where the modulator structure is fabricated based on a silicon substrate, the central heater 230 can be formed as a poly-Si feature over the silicon substrate.

A non-limiting example system, method and apparatus for thermally tuning an optical property of an example optical resonator structure herein is as follows. The properties of the junction region can be modulated by controlling the temperature at a portion of the resonator structure, e.g., through application of a current to the central heater 230 (a resistive heater). That is, through control of the current or voltage applied at the electrical contacts, the effective refractive index of portions of the example optical resonator structure 232 can be tuned through thermal tuning (Joule heating). In an example, the optical resonator structure 100 can be tuned, to control the type of optical mode, including the order of the optical mode, that couples to the example optical resonator structure 232.

In an example, one or more portions of the resonator structure 232 can be tuned to facilitate greater optical coupling between the resonator structure 232 and the optical waveguide 236. For example, based on the allowed variations in the manufacture process, the resonator structure 232 may not be optimally tuned to couple with the waveguide coupler 236. Through selective heating, the optical properties of the resonator structure 232 may be held at a specified setting, facilitating greater coupling between the resonator structure 232 and the optical waveguide 236. For example, pinning the resonator structure at a selective specified heating setting can facilitate solely or mainly the fundamental optical mode being coupled between the resonator structure 232 and the optical waveguide 236.

Figure 2D:
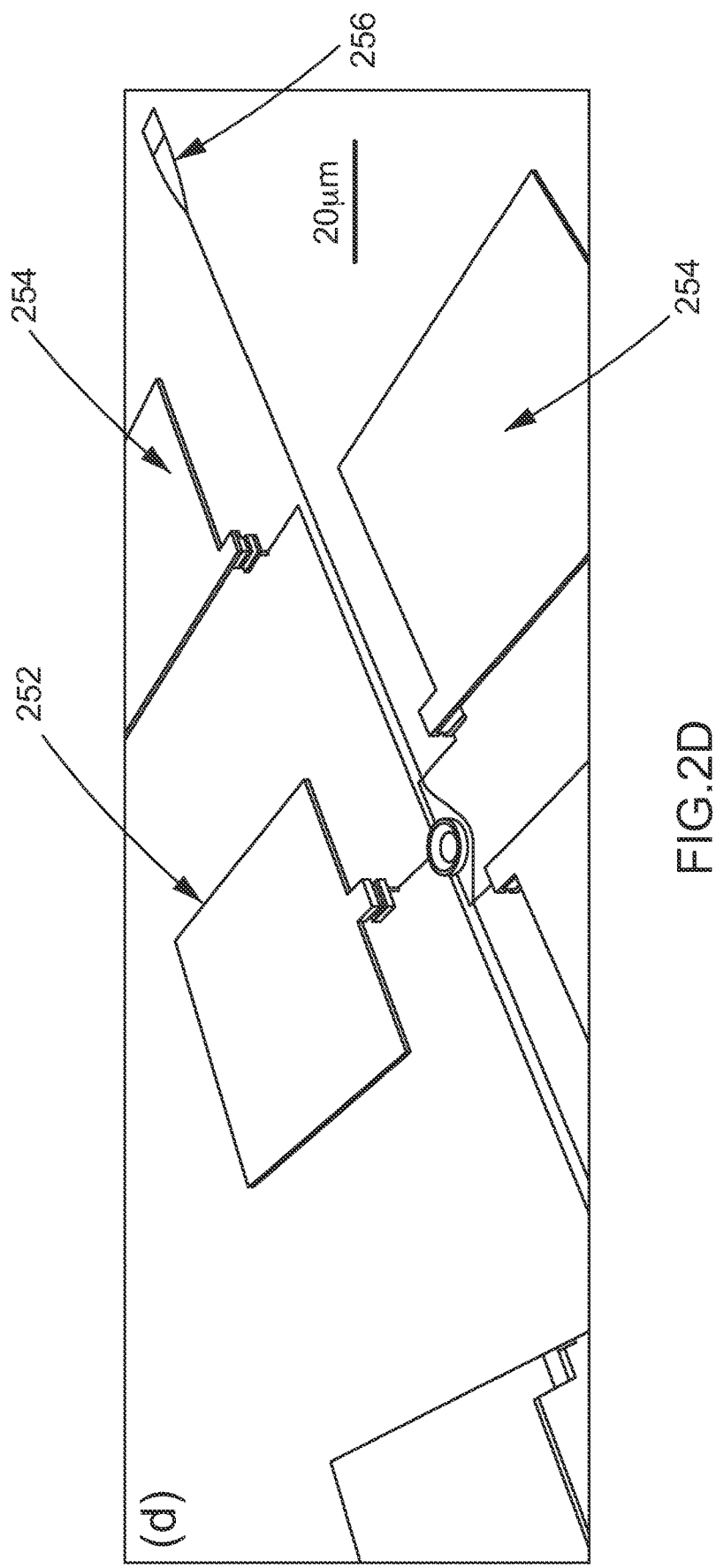
FIG. 2D shows a zoomed-out view of an example integrated modulator, according to the principles described herein.

FIG. 2D shows a zoomed-out view of an example monolithically integrated modulator that includes a driver 252, heater contact pads 254, and input grating coupler 256, according to the principles described herein.

Non-limiting example results are described herein for an example implementation of a depletion-mode optical modulator in a standard sub-100 nm CMOS SOI process with zero process modifications. The example modulator can be configured for modulation at about 5 Gbps, with an extinction ratio of about 5.2 dB, an estimated energy consumption of about 40 fJ/bit to about 50 fJ/bit, and about 291 GHz/mW thermal tenability.

The example modulator utilizes disk-like whispering-gallery modes of a microring of multi-modal width, formed in the sub-90 nm-thick transistor body device layer of the SOI CMOS process. The layer dimensions of the example implementation in the IBM 45 nm 12SOI CMOS process can be determined, for example, using the IBM 12SOI Process Design Kit. The example modulator is configured with eighty-four (84) junction regions (p-n junctions) that extend radially out and are azimuthally distributed around the ring (see, e.g., FIG. 2B). It is understood that the number of junction regions may be varied from one device configuration to another.

Finer pitch patterning of junctions, where permitted by the process, enables a larger carrier-plasma index modulation, by including many depletion regions in the volume of the resonator, and hence provides more efficient (lower voltage and energy) modulation. The ring cavity is configured to be wider than the single-mode width to allow electrical contacts placed at the inner-radius edge to impart minimal optical loss to the fundamental mode. Although the higher-order spatial modes are suppressed in Q by scattering from these contacts and bending loss, the higher-order spatial modes may remain with high enough Q to have an undesirable spectral signature (described in connection with FIGS. 7B-7C below). Hence, according to the example systems, methods and apparatus, the modulator can be configured for excitation of only the fundamental mode, and suppression of the higher order modes, by employing a suitably designed waveguide coupler. The waveguide coupler can be configured as a propagation-constant-matched, curved bus-to-resonator coupler with a long interaction length that has a small k-space spread of the perturbation and does not excite the higher order, low-Q resonances (described in connection with FIGS. 6A and 6B below). As described in connection with FIGS. 8A-8B below, example simulations can be performed that allows the point of maximum anticrossing to be selected for the coupling, which is favorable in design. A straight waveguide coupled to this small-radius, multimode resonator can, in general, excite higher order modes which can be undesirable (described in connection with FIG. 5 below). The 5-μm outer ring radius of the example modulator is configured to be larger than the minimum permitted by bending loss to accommodate an efficient coupler design.

Figure 3A:
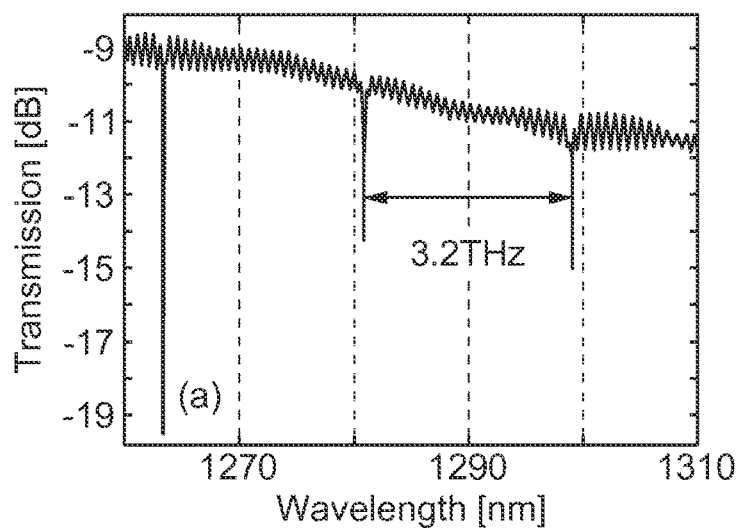
FIG. 3A shows an example of optical transmission spectral response, according to the principles described herein.
Figure 3B:
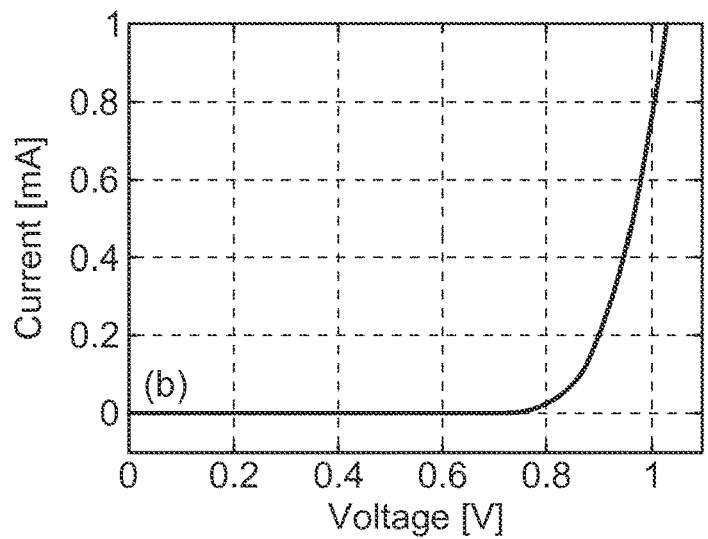
FIG. 3B shows an example of current to voltage (I-V) curve of an example device, according to the principles described herein.
Figure 3C:
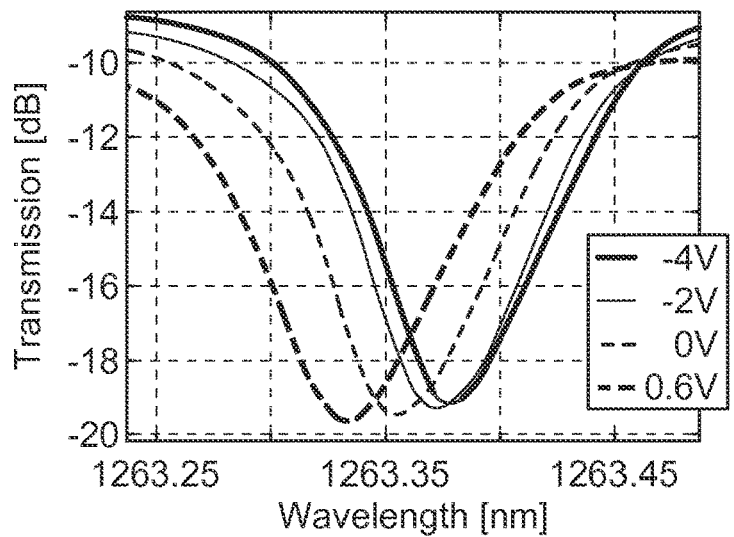
FIG. 3C shows an example of resonant optical response at DC bias voltages, according to the principles described herein.

FIG. 3A shows an example measurement of optical transmission spectral response of the example modulator, with single transverse-mode operation observed for a free spectral range (FSR) of about 3.2 THz and extinction near 1260 nm is greater than about 10 dB, according to the principles described herein. The example measurement is of a passive spectrum showing single-mode operation. FIG. 3B shows an example of current to voltage (I-V) curve of the device. FIG. 3C shows an example of resonant optical response at DC bias voltages from about −4V to about +0.6V. FIG. 3D shows an example of calculated cross-sectional mode profile, where the waveguiding body silicon and the nitride liner layer above it are outlined. FIG. 3E shows an example optical micrograph of the example modulator device.

The optical transmission spectrum in FIG. 3A shows that only the fundamental family of transverse-electric (TE)-polarized modes are excited in the cavity, as desired for the example modulator configuration. The measured FSR is about 17 nm near 1260 nm (3.2 THz near 240 THz), and the linewidth of about 3 dB is 26 GHz near critical coupling, indicating an intrinsic Q of about 18,000. Through-port optical extinction exceeds about 10 dB near the design wavelength, while overcoupling limits extinction at longer wavelengths. The transverse-magnetic (TM)-polarized guided modes are generally not supported in waveguides this thin. Lightly doped p-n junctions can be beneficial to achieving low optical loss and sufficient wavelength shift under drive to effect high extinction ratio modulation. The source/drain implants for field-effect transistors in this process cannot be utilized because they lead to dopant concentrations exceeding $10^{19}/cm^3$, whereas concentrations between $5 \times 10^{17}/cm^3$ and $5 \times 10^{18}/cm^3$ are more suitable for depletion-mode modulators. To realize these concentrations, for example, transistor well-doping implants available in the CMOS process can be utilized. The example I-V curve measurements shown in FIG. 3B confirms rectification, and spectral shifts for several DC bias conditions are shown in FIG. 3C.

To maximize the optical wavelength shift for a given voltage swing, the angular width of each spoke can be configured such that, in the maximally reverse-biased state, each spoke unit cell (i.e., the entire cavity) is nearly fully depleted of carriers. For the dopant concentrations measured, this can require 140 nm-wide regions of each dopant. However, design rules for implant mask layers can limit this width to approximately 220 nm, and therefore mode shifts can be limited to about 60% of what could, in principle, be achieved with these carrier concentrations. FIG. 3C shows that the mode shifts can be made sufficiently large to allow for modulation with a modest voltage swing. For optical excitation at about 1263.33 nm, at the bottom of the resonant dip at +0.6V applied bias, near 6 dB modulation depth is expected when switching to a reverse bias between −2V and −4V. In various examples, different junction region widths, and doping concentrations may be used.

FIG. 4A shows an example measurement of a 5 Gbps optical eye diagram with 5.2 dB modulation depth in response to drive voltage swing from about −3V to about +0.6V (at the device terminals), according to the principles described herein. The eye diagram measurements are performed on the example device of FIG. 3E. FIG. 4B shows an example of thermal tuning of the modulated resonance across a full FSR (with efficiency of about 291 GHz/mW), according to the principles described herein. FIG. 4C shows an example of near resonance tuning vs. heater power.

FIG. 4A shows an example measurement of an eye diagram acquired on a sampling oscilloscope with about 10 GHz optical sampling module and 5 GHz low-pass filter. The example device can be driven with about 5 Gbps, $2^7-1$ bit pseudo-random binary sequence, by a 40-GHz GSG probe. The GSG probe pad and wiring layout are shown in FIG. 1D. Due to impedance mismatch between the 50Ω driving probe and the device, voltage doubling can be expected at the example device, and the voltage swing actually seen by the modulator is about −3V to about +0.6V, a range accessible to integrated driver circuits. Under these operating conditions, 5.2 dB modulation depth is measured with 4.5 dB insertion loss, consistent with DC mode shifts shown in FIG. 2C. The average switching energy is estimated using the expression: ¼ $CV_{pp}^2$ for NRZ data, from the voltage swing and a computed device capacitance, and calculated to be about 40 fJ/bit. The maximum leakage current measured in an example device is about 16 μA at about 0.6V. This places an upper limit of about 1.2 fJ/bit on the energy consumption due to driving current. To one significant figure, the total energy consumption of the device under these driving conditions is estimated to be about 40 fJ/bit. This is comparable to state-of-the-art custom-process devices.

Scaling the modulator cavity size can have little or no impact on speed but can affect energy efficiency. The RC time constant of the modulator array is about equal to that of a single spoke. The device speed is observed to be independent of the number of spokes, and thus independent of the ring radius. The optical Q is also observed to be independent of radius (to the first order), so neither electrical nor optical bandwidth is governed by the cavity size. However, the device energy is observed to be proportional to total device capacitance and thus to radius. Also, the example device can exploit single boundary (outer-radius) optical confinement to produce a small transverse mode, and small series resistance, at smaller radii.

In a WDM transmitter, modulators are multiplexed along a waveguide, each tuned to a wavelength channel. For active wavelength tuning, a resistive microheater was included in the modulator cavity (see, e.g., FIG. 2C). The heater also can be formed in the body silicon layer and employ the process source/drain implants to give about 10 kΩ resistance. While tuning on the order of a channel spacing (~1 nm) can be used, FIG. 4B shows tuning of a full FSR with an efficiency of about 1.6 nm/mW (291 GHz/mW). Other example implementations show even higher speed, greater modulation depth, lower insertion loss, and/or higher energy efficiency with modest modification. The optical cavity design in this example is configured to be conservative, to ensure high enough optical Q amid process uncertainties. In other example implementations, a narrower ring width and contacts placed closer to the optical mode can be used to reduce both resistance and capacitance. A change of a few hundred nanometers could be used to more than double the cutoff frequency and significantly reduce the energy consumption per bit by reducing the capacitance. Greater modulation depth and reduced insertion loss can be achieved by reducing the width of the spokes by almost a factor of 2, which can be achieved with a design rule waiver.

In an example implementation, the optical modulator devices can be designed with radially extending junctions that are implemented with zig-zag approximations to this geometry (e.g., as shown in FIG. 2B). For example, a fabrication tool may have a design rule that requires dopants to be laid out on a coarse Manhattan grid.

Figure 5:
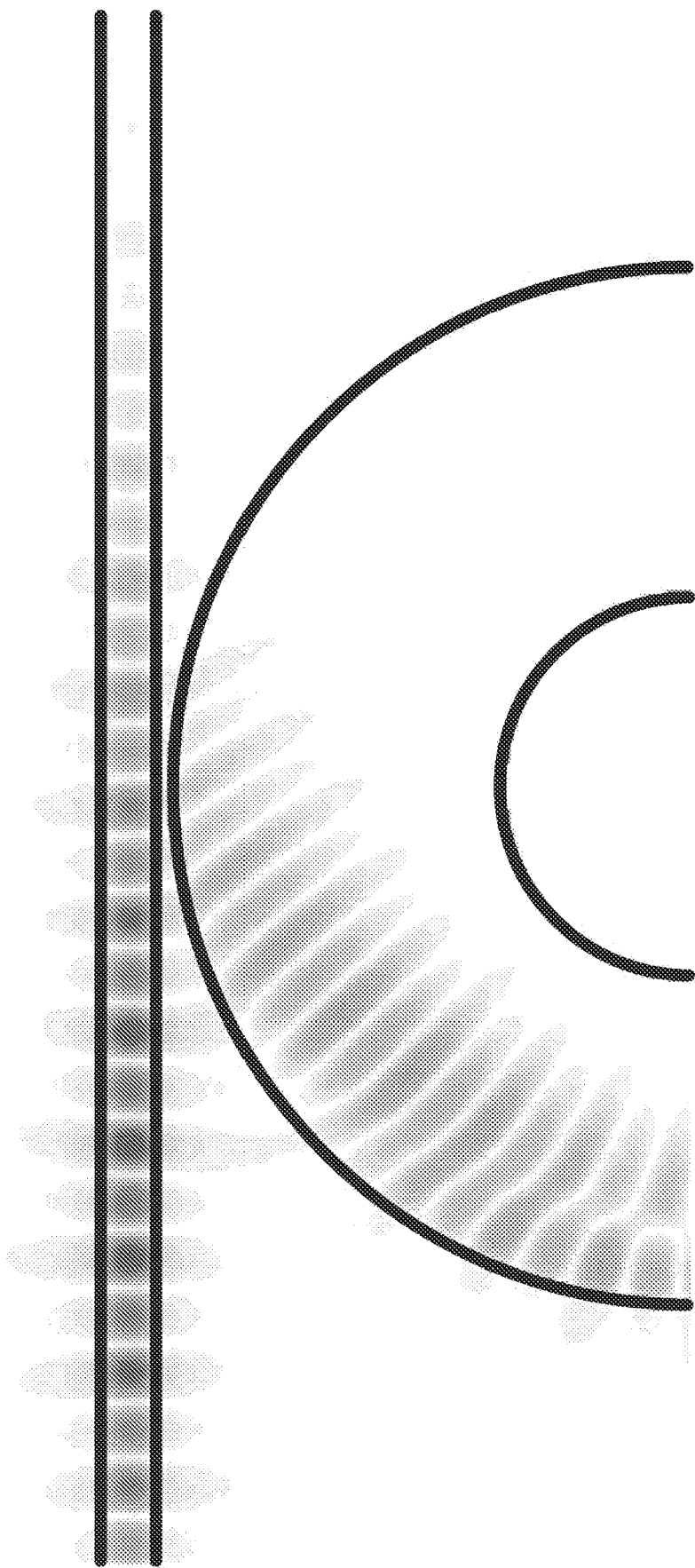
FIG. 5 shows an example of a straight waveguide coupled to a multimode-width resonator, accordingly to the principles described herein.

FIG. 5 shows an example of optical coupling from a straight waveguide to a multimode-width resonator to excite higher-radial-order modes, accordingly to the principles described herein. The resonator can be configured as a disk or a wide ring. A guided optical pulse launched from the right to left excites the resonator cavity in the coupler region with a small coupling gap. The field in the resonator shows that not only the fundamental but also higher order modes can be excited. For a given implementation, this may not be ideal for a modulator design because the higher order resonant modes act effectively as a loss mechanism in some designs.

Figure 6A:
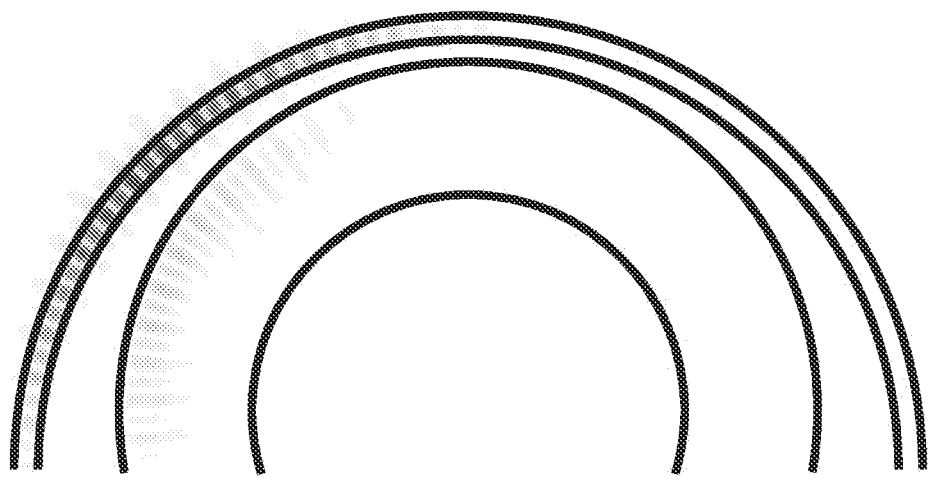
FIG. 6A shows an example a curved waveguide coupled to an example resonator, according to the principles described herein.
Figure 6B:
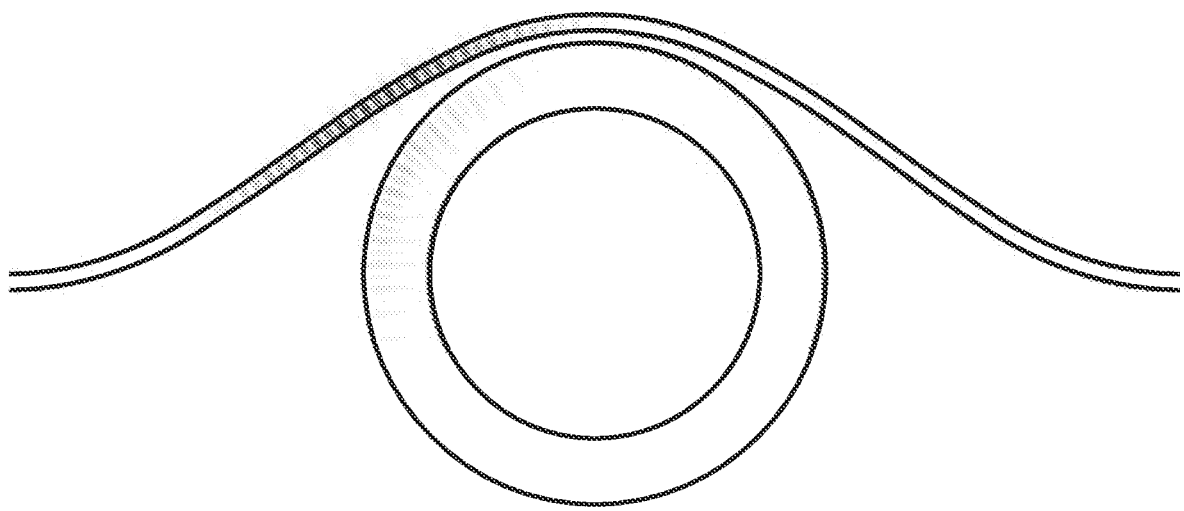
FIG. 6B shows an example of a sinusoidal coupling bus coupled to an example resonator, according to the principles described herein.

FIG. 6A shows an example of optical coupling from a curved waveguide to a multimode-width resonator, according to the principles described herein. A guided optical pulse launched from the right to left in the bus excites the cavity in the coupler region with a small coupling gap. The field in the resonator shows that primarily a fundamental transverse mode can be excited with no sign of higher order modes being excited. This can be a desirable configuration to couple only to the fundamental mode, in a cavity that may support also higher order modes. The width of the waveguide can be chosen such that the angular propagation constant of the optical guided mode in the waveguide approximately matches that of the fundamental mode in the resonator cavity. This means the guided optical wavelength is longer in the waveguide than in the resonator cavity, because the waveguide is at a larger radius, but the angular phase fronts line up. In some examples, increasing the interaction length can facilitate greater coupling to only a single mode. FIG. 6B shows an example of a sinusoidal coupling bus in another variation of a curved coupler that accomplishes substantially the same result as the coupler in FIG. 6A, according to the principles described herein. In some examples, the waveguide can be configured as a sine-bend waveguide to minimize straight-to-bend transitions and leave room for a drop port, which can be straight. The drop port can be utilized, for example, for closing the control loop to stabilize the example modulator at the desired wavelength, or as a loop-back check of the modulation characteristics in a link.

Figure 7A:
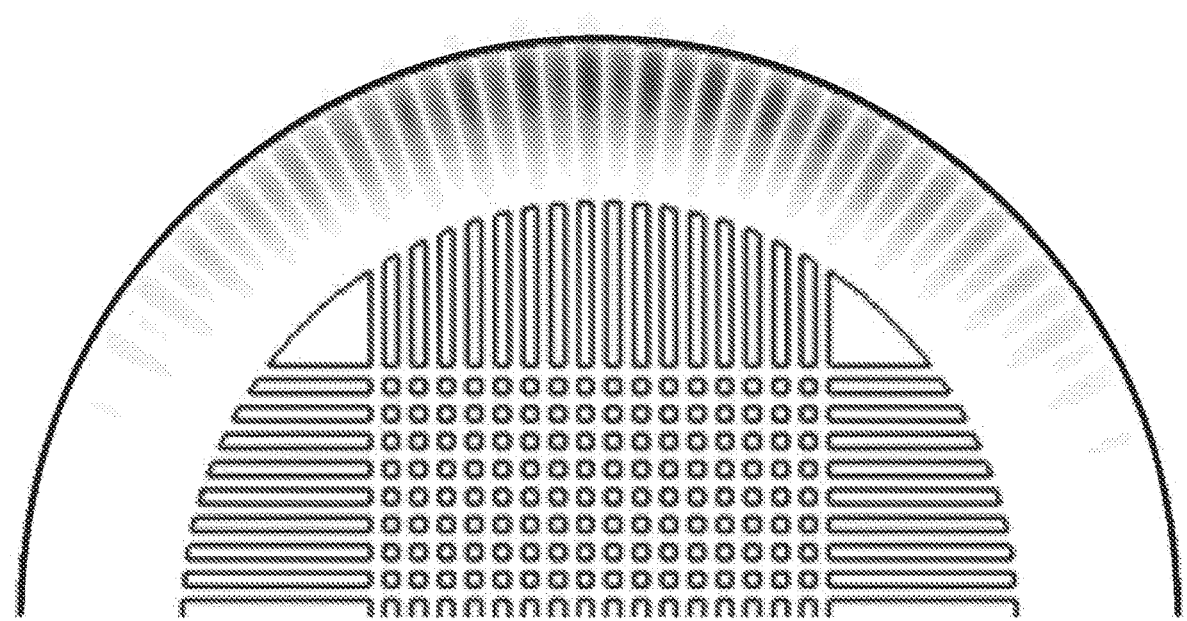
FIG. 7A shows an example simulation of optical cavity loss, according to the principles described herein.
Figure 7B:
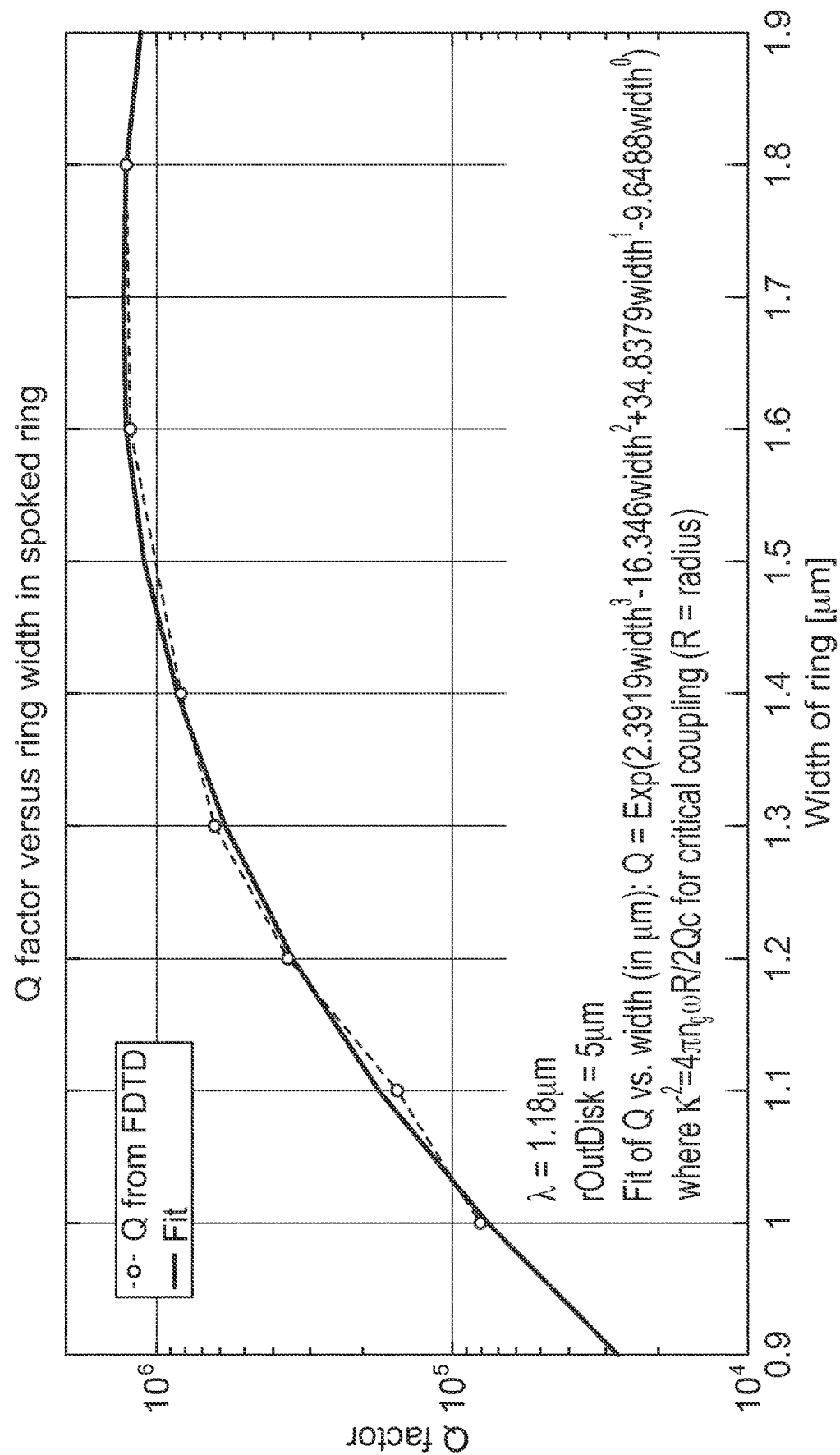
FIG. 7B shows an example plot of the optical radiation Q versus the ring width, according to the principles described herein.
Figure 7C:
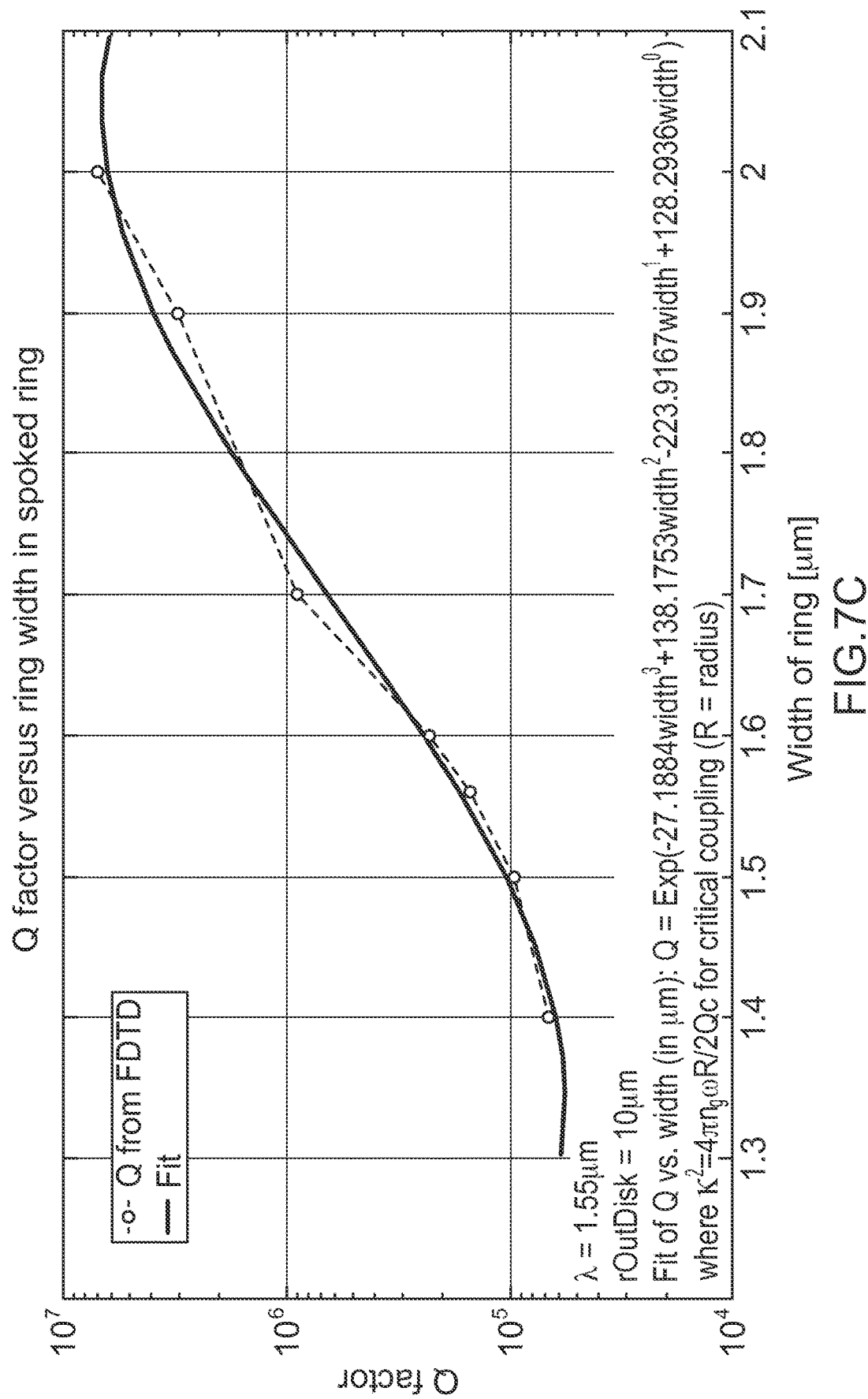
FIG. 7C shows an example of a similar simulation to FIG. 7B for an example device operated at the 1550 nm wavelength, according to the principles described herein.

FIGS. 7A-7C show examples of methodologies that can be implemented to determine ring widths that result in lower scattering loss. FIG. 7A shows an example of optical cavity loss simulated due to inner contacts placed at various radial distances (i.e., "ring width") from the outer radius, according to the principles described herein. The electromagnetic field computed from a 3D finite-difference time-domain (FDTD) simulation shows low loss propagation with electromagnetic field distribution that stays away from the electrical contacts. Such a result is desirable, since coupling between the electromagnetic field and the electrical contacts is a source of loss.

FIG. 7B shows an example of the optical radiation Q versus the "ring width," i.e., distance of the contacts from the outer radius boundary, according to the principles described herein. Wider widths give higher radiation Q, but may have higher resistance in electrically doped structures, and may have higher-order modes that are less well suppressed. This example data is for a design at 1180 nm wavelength, of potential relevance to on-chip interconnect applications.

FIG. 7C shows an example of a similar simulation to FIG. 7B for a design in the 1550 nm wavelength window (used in telecommunications), according to the principles described herein.

Figure 8A:
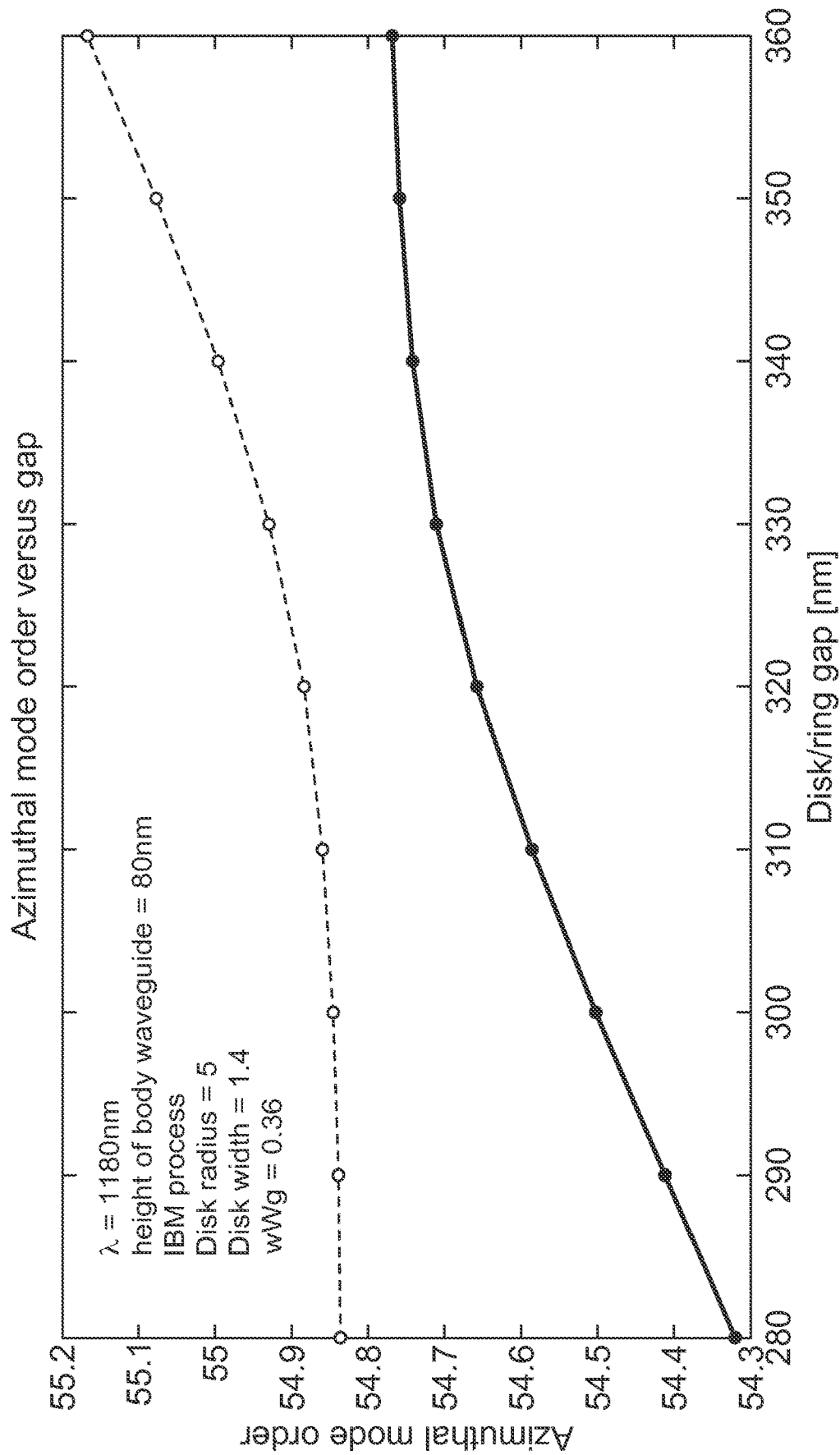
FIG. 8A-8D show examples of a disk coupling for wrapped-bus coupling, accordingly to the principles described herein.

FIG. 8A shows an example of a plot of the angular propagation constant versus coupling gap between the cavity and waveguide, for an example design of cavity, and waveguide (width, height), for the structure in FIG. 6B, according to the principles described herein. The anti-crossing in the propagation constants around a gap of about 325 nm shows the point of strongest coupling, where the largest power transfer is obtained in a length, or a certain power coupling in the shortest propagation length, for a given gap. This allows use of the largest available coupling gap that can give a certain coupling, thus minimizing radiation loss and avoiding excitation of unwanted modes.

Figure 8B:
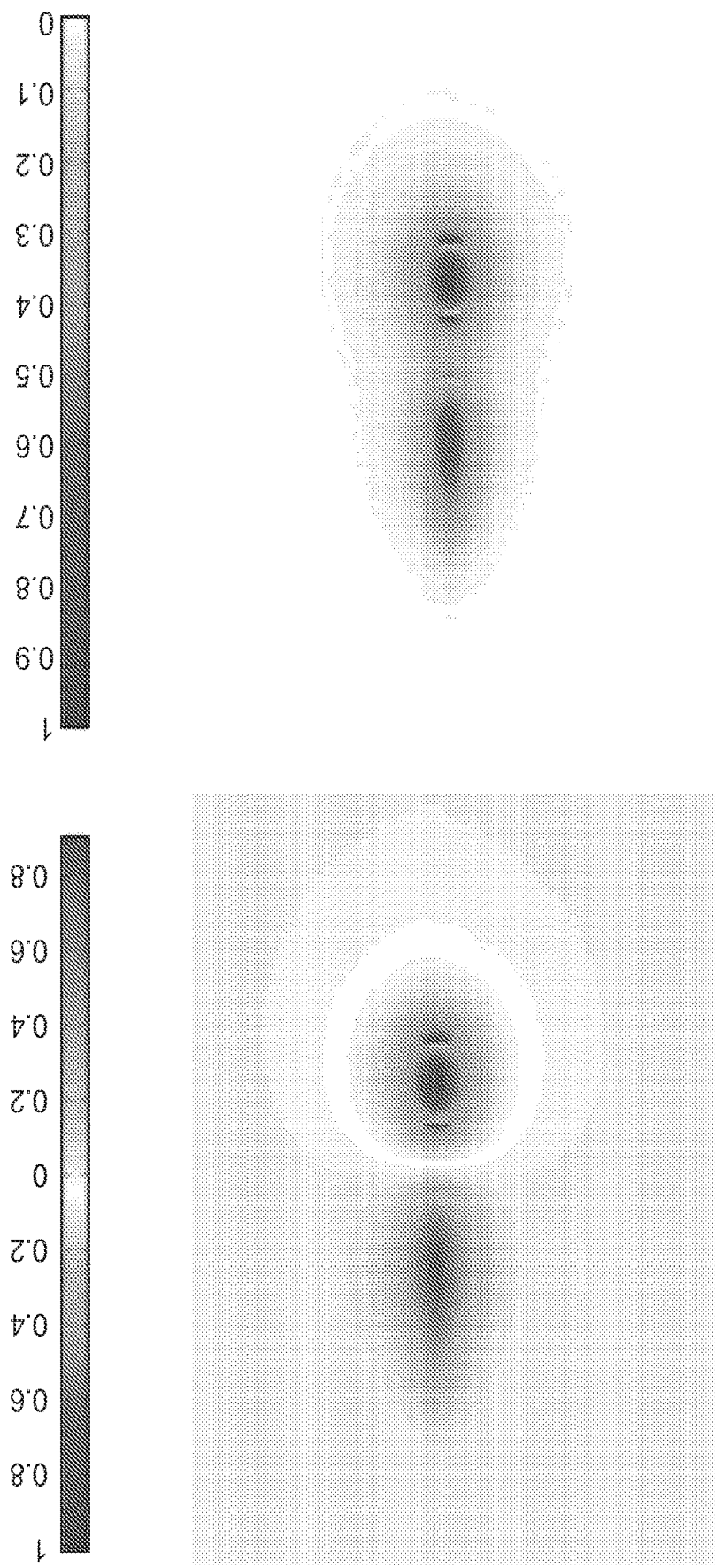
Figure 8C:
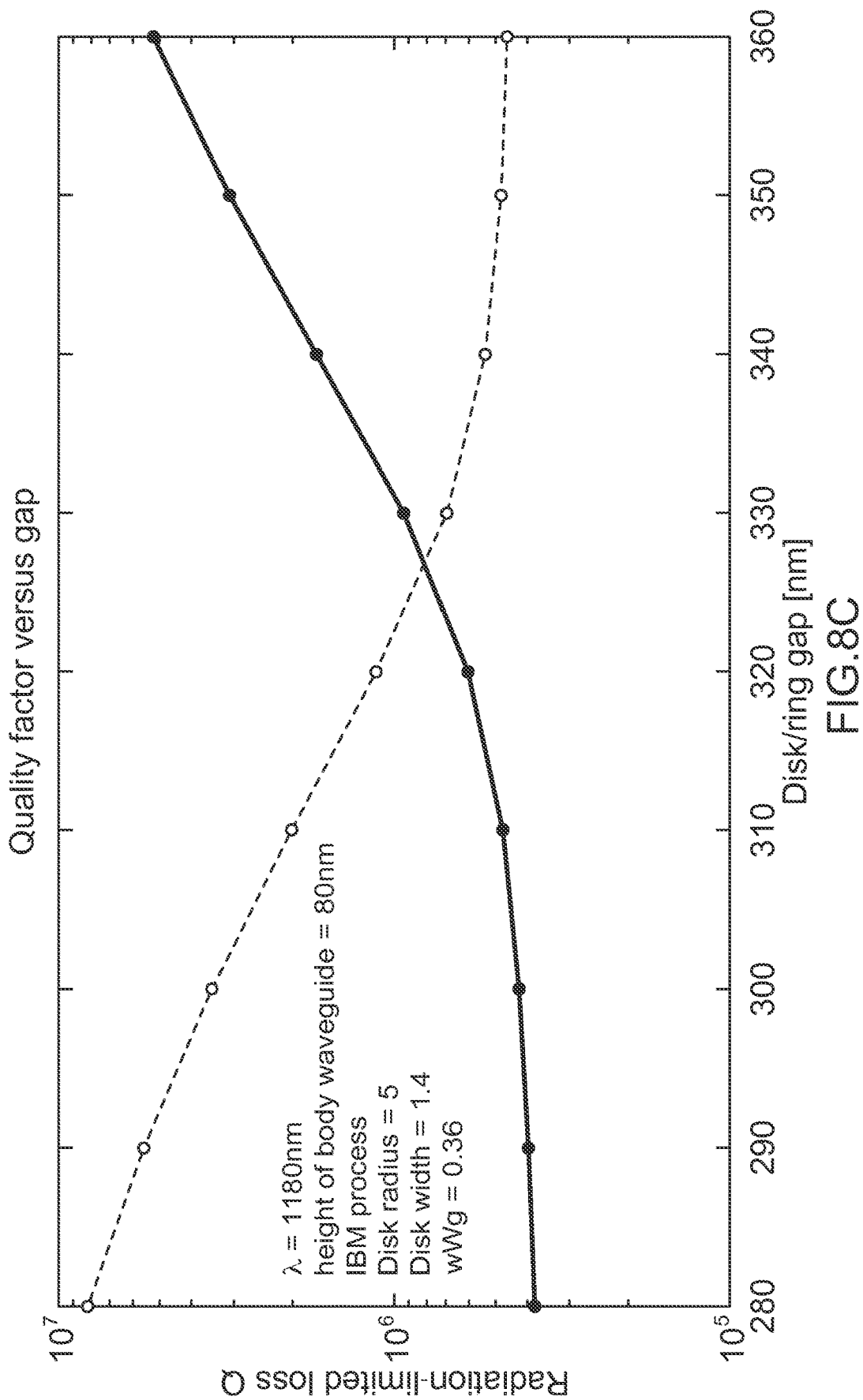
Figure 8D:
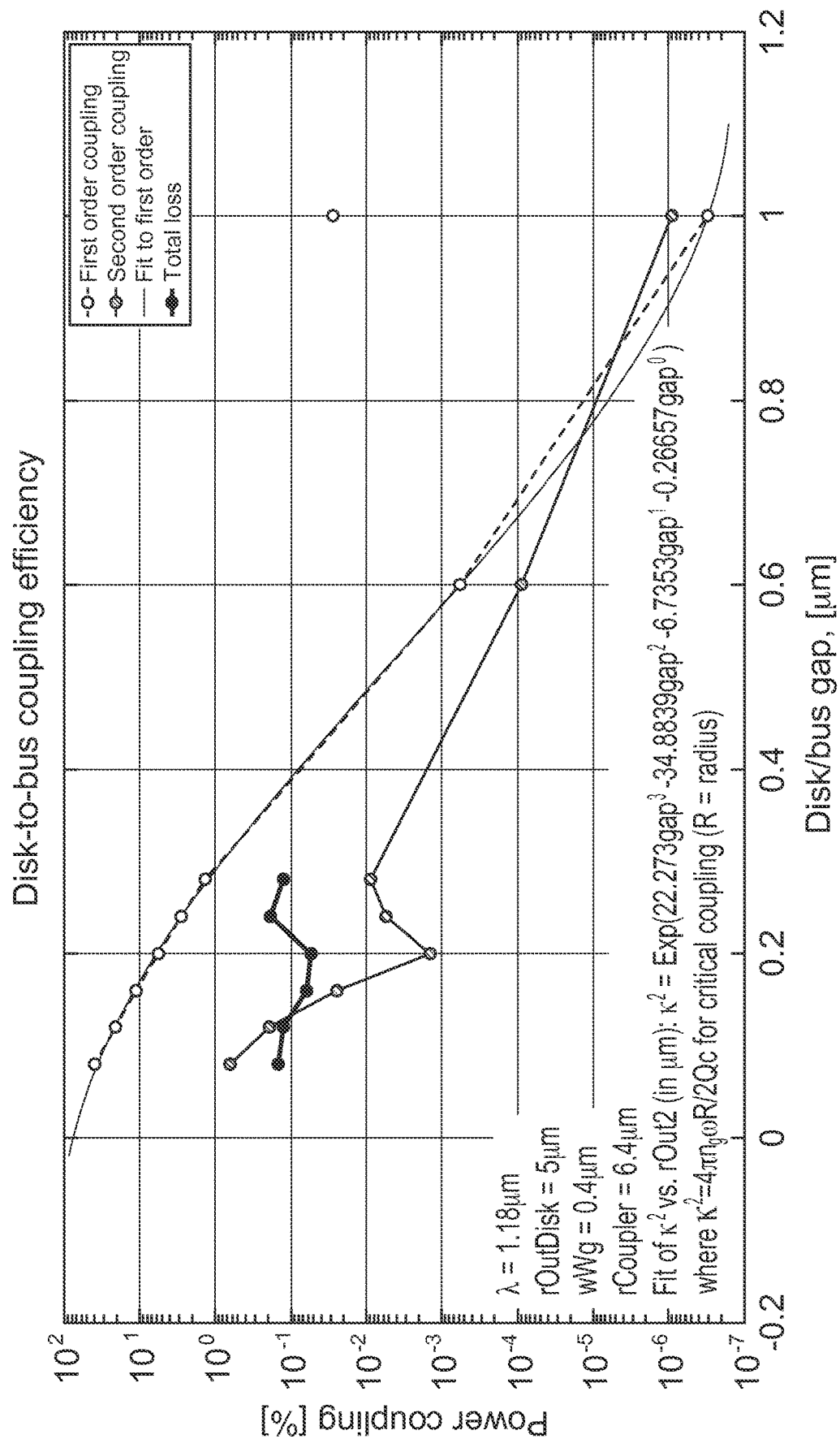

FIG. 8B shows an example of the angularly propagating optical supermodes—the antisymmetric (left) mode with lower angular propagation constant, and the symmetric (right) mode with the higher angular propagation constant, according to the principles described herein. Approximately even splitting of power between the two guides at this gap shows that the point of strongest coupling (anticrossing) can be reached. In some examples, FIGS. 8A-8D show disk/ring coupling for wrapped-bus coupling.

FIGS. 9A-9H show examples of the layouts for various components of the example modulator, according to the principles described herein. Based on these layouts, the lithographic masks can be designed and combined with process-design kit processing steps for given mask layers in the foundry to fabricate these example modulator devices. Processor-executable instructions can be determined based on the process-design kit processing steps. Execution of these processor-executable instructions using the computing systems of one or more fabrication tools facilitates fabrication of portions of an example modulator device.

Figure 9A:
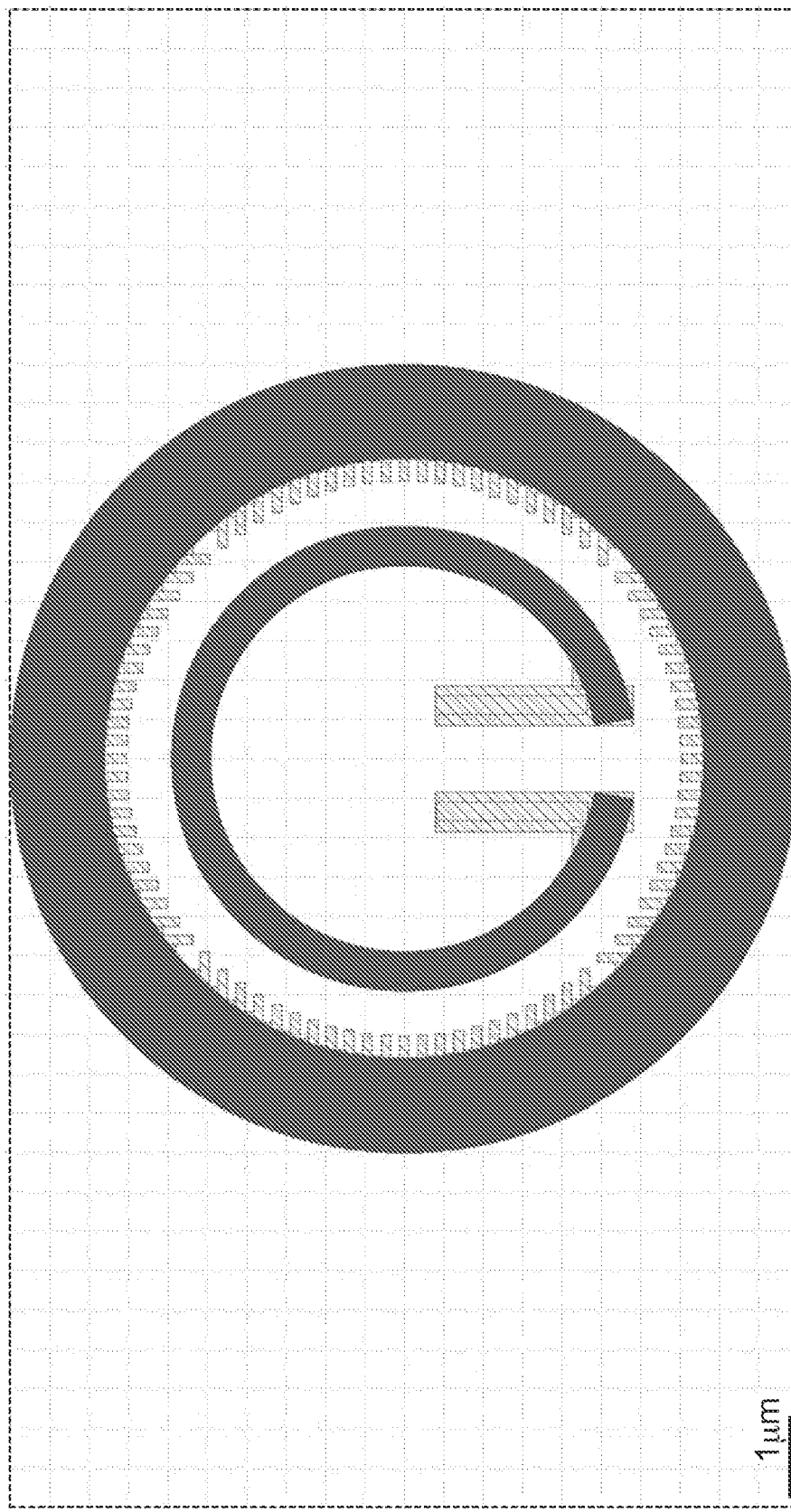
FIGS. 9A-9H show examples of modulator layouts, accordingly to the principles described herein.
Figure 9B:
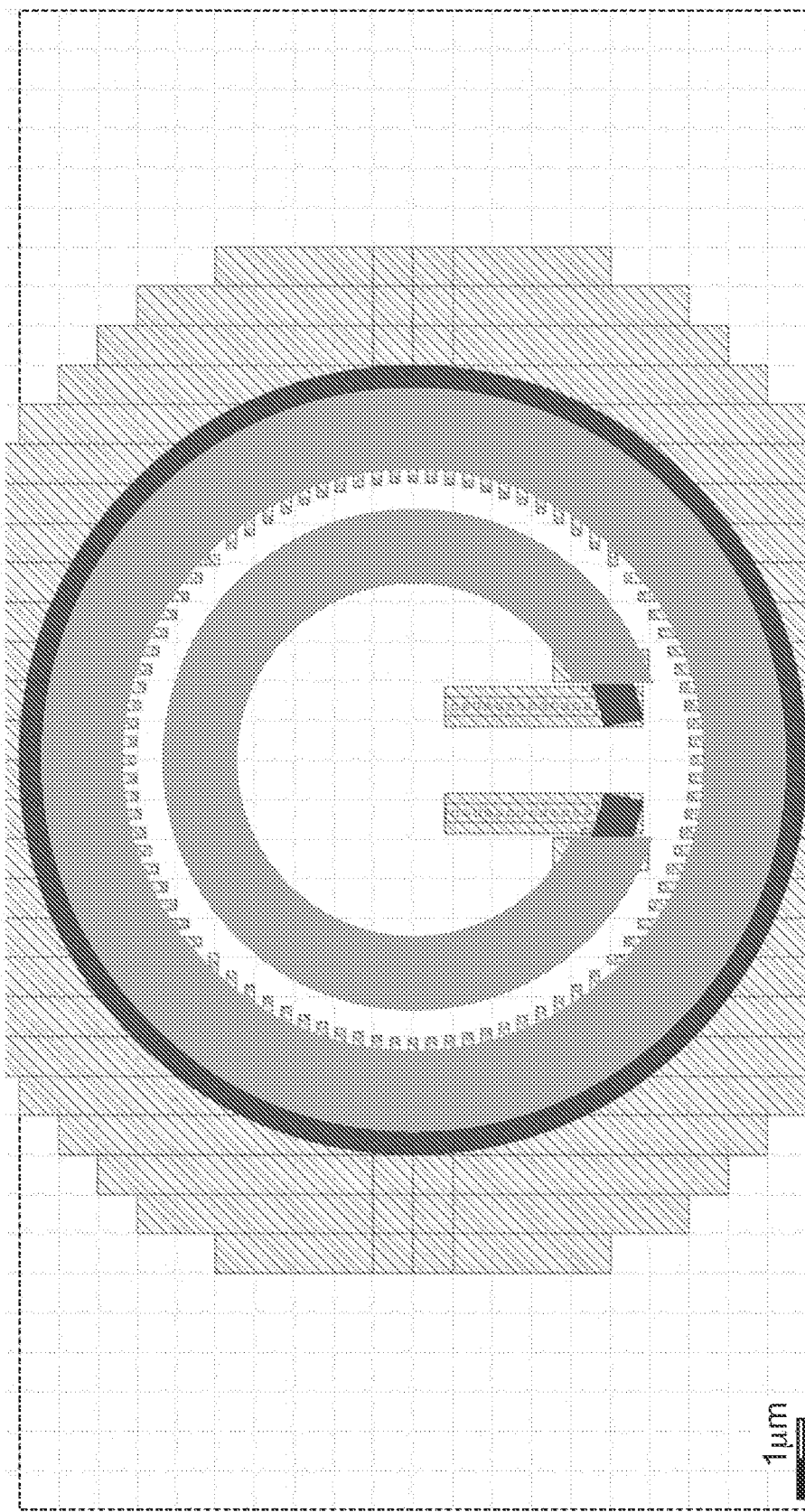
Figure 9C:
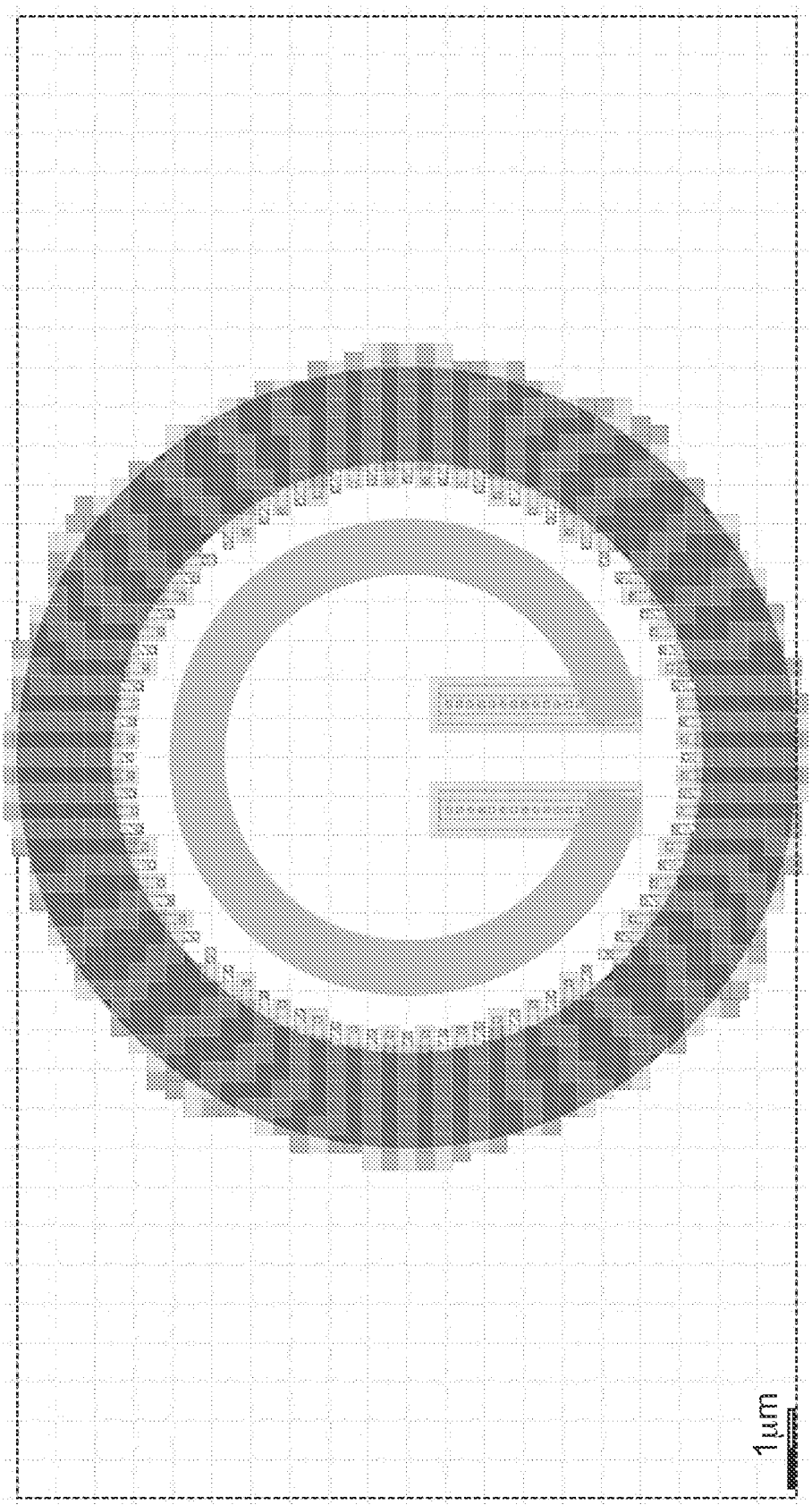
Figure 9D:
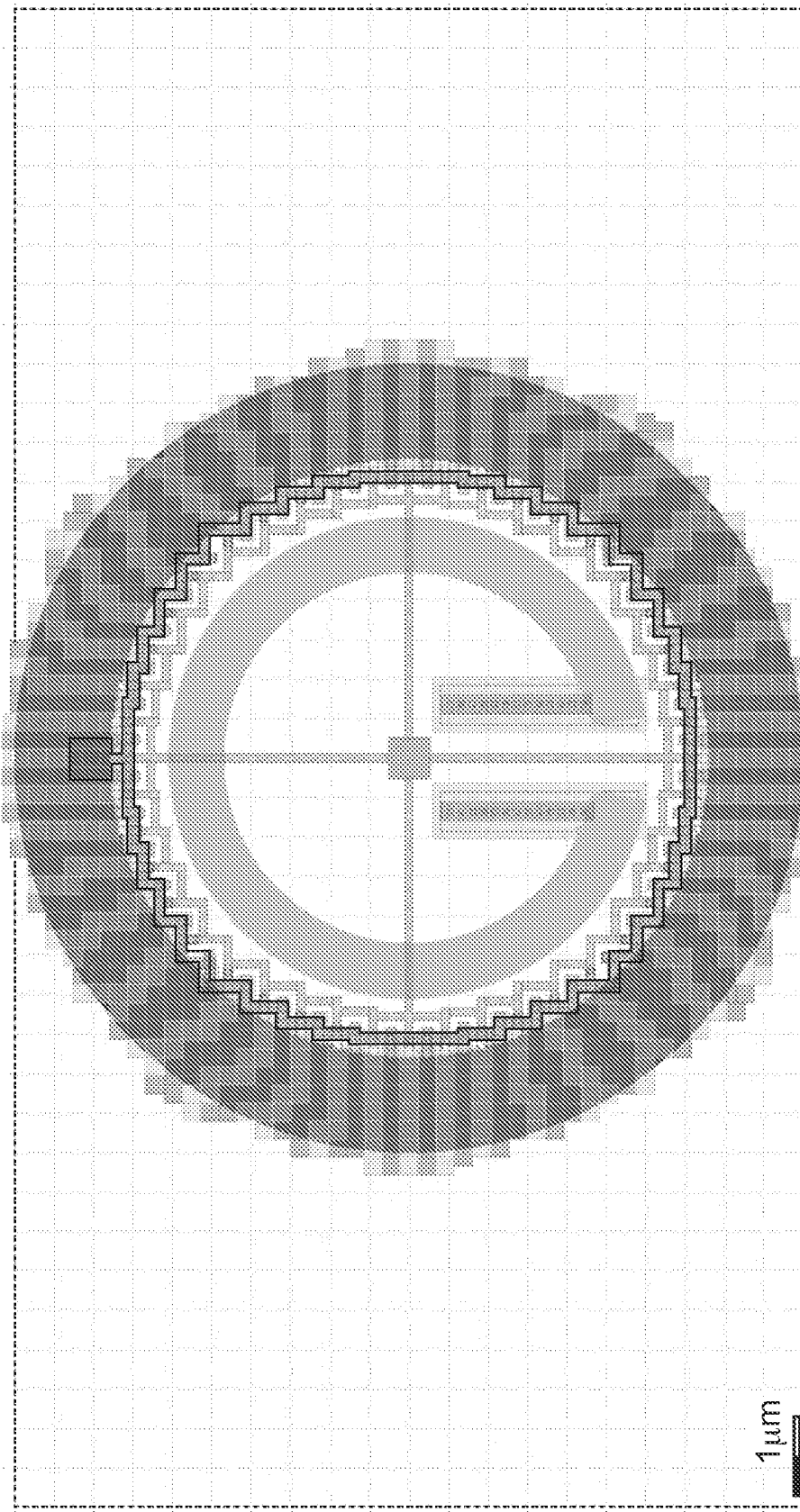
Figure 9E:
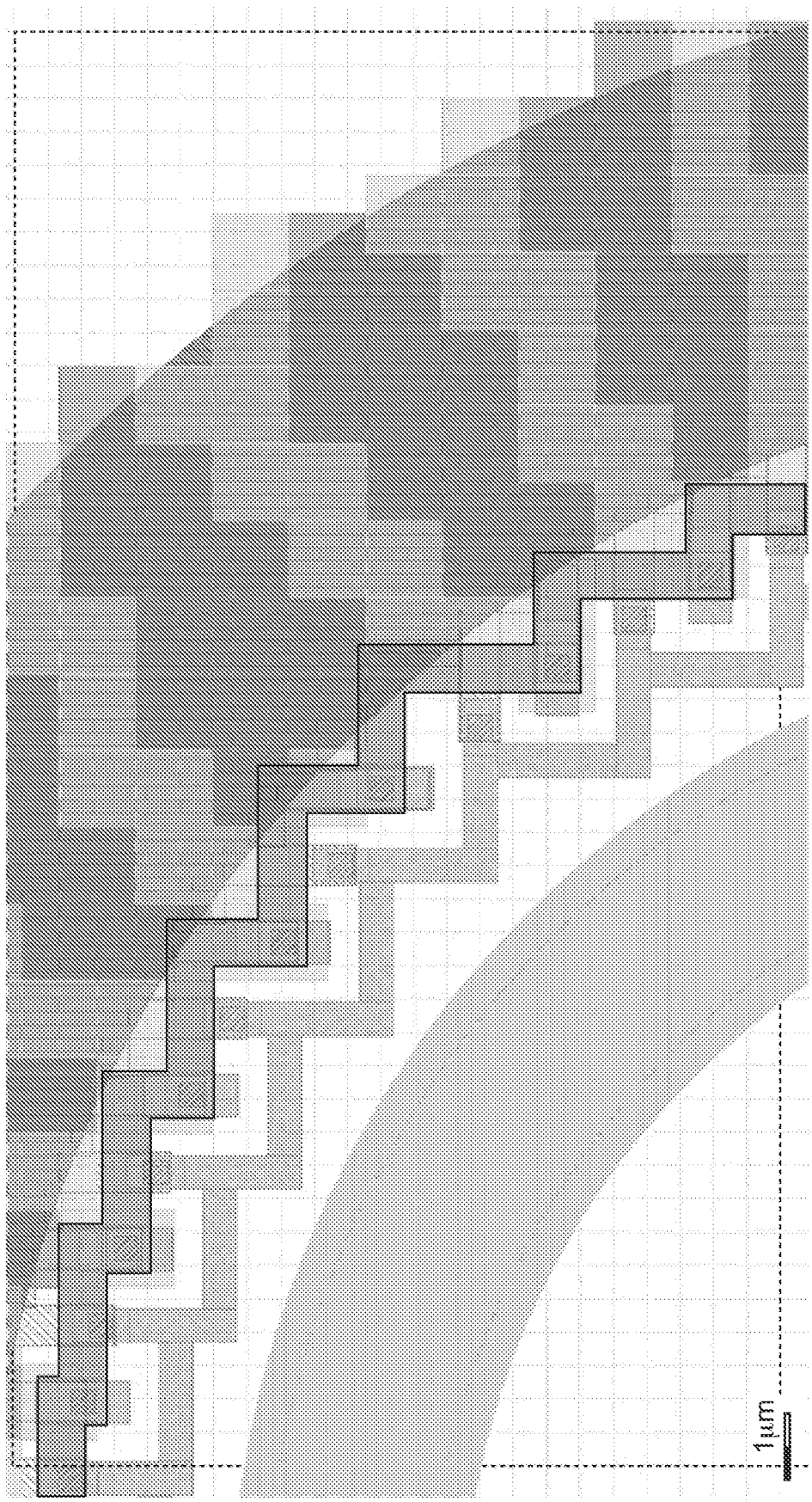
Figure 9F:
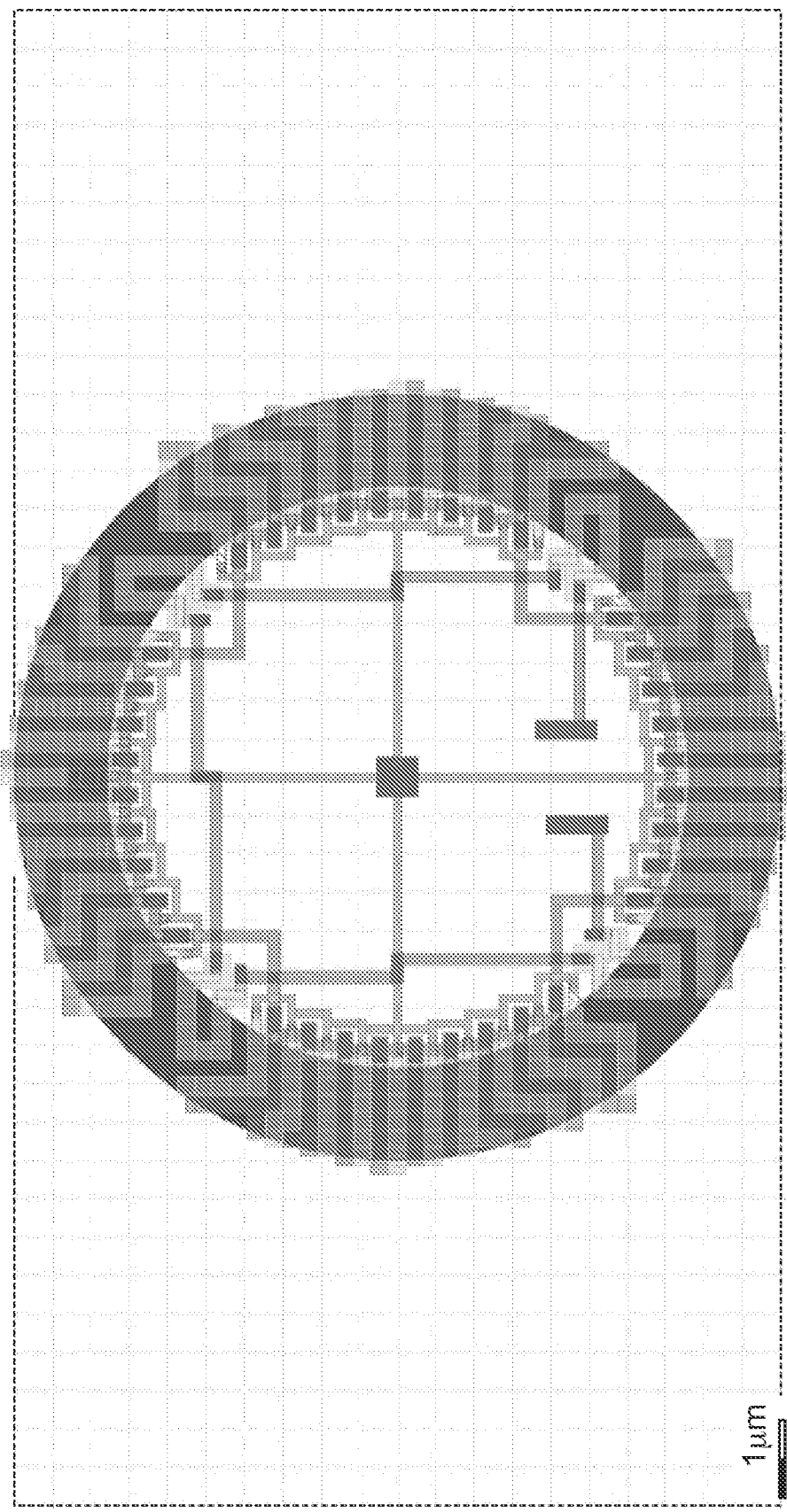
Figure 9G:
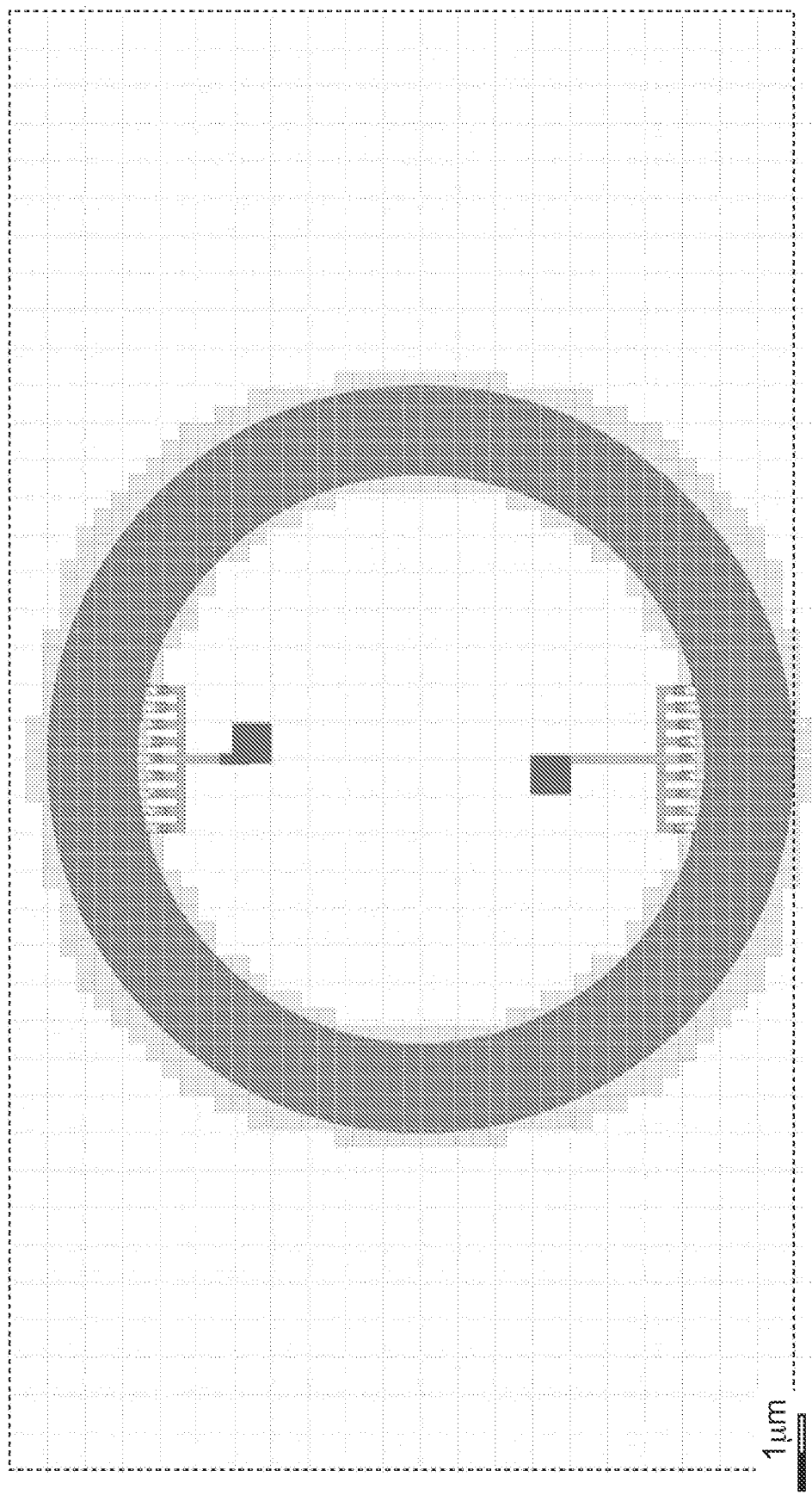
Figure 9H:
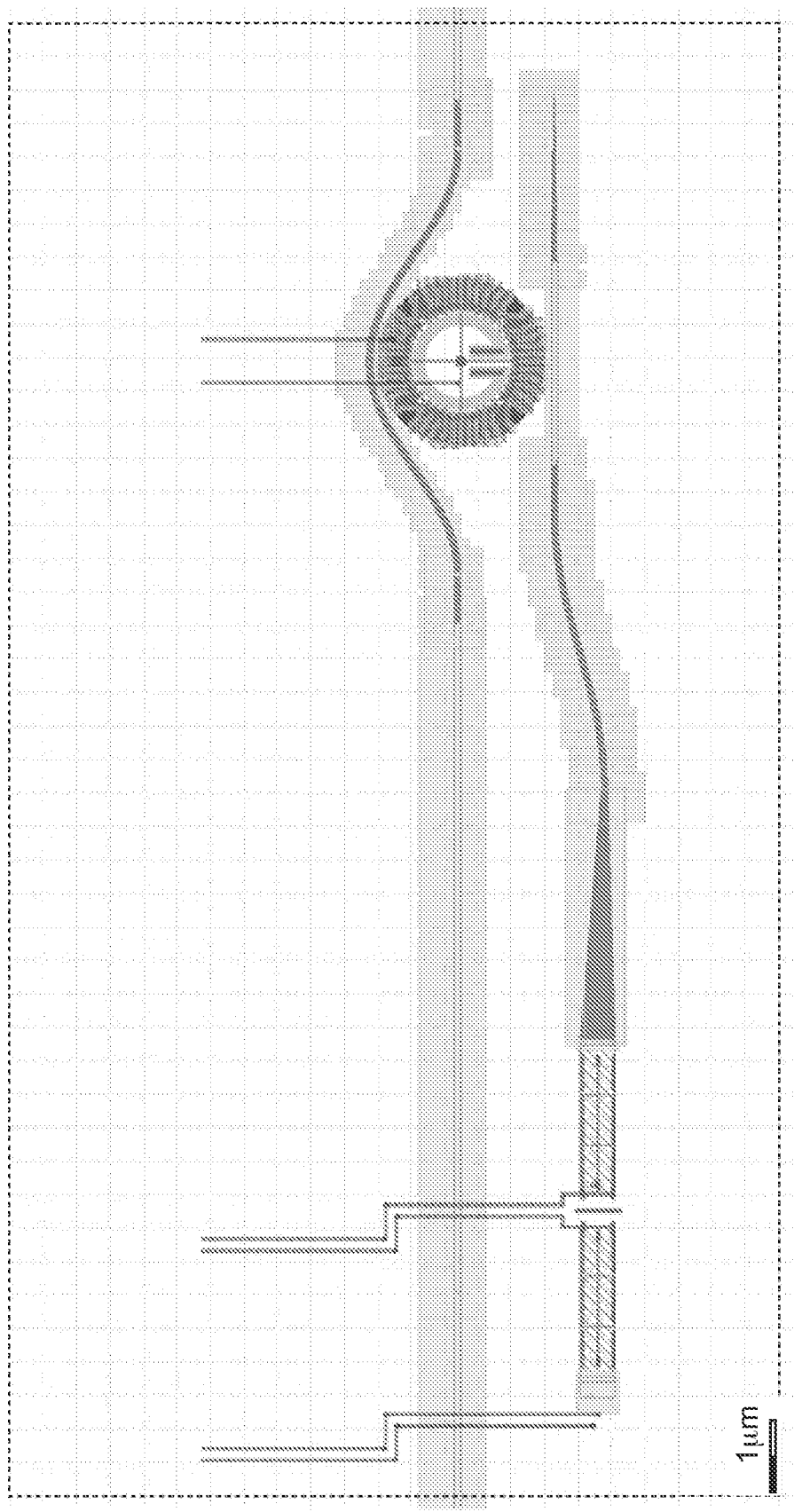
Figure 10A:
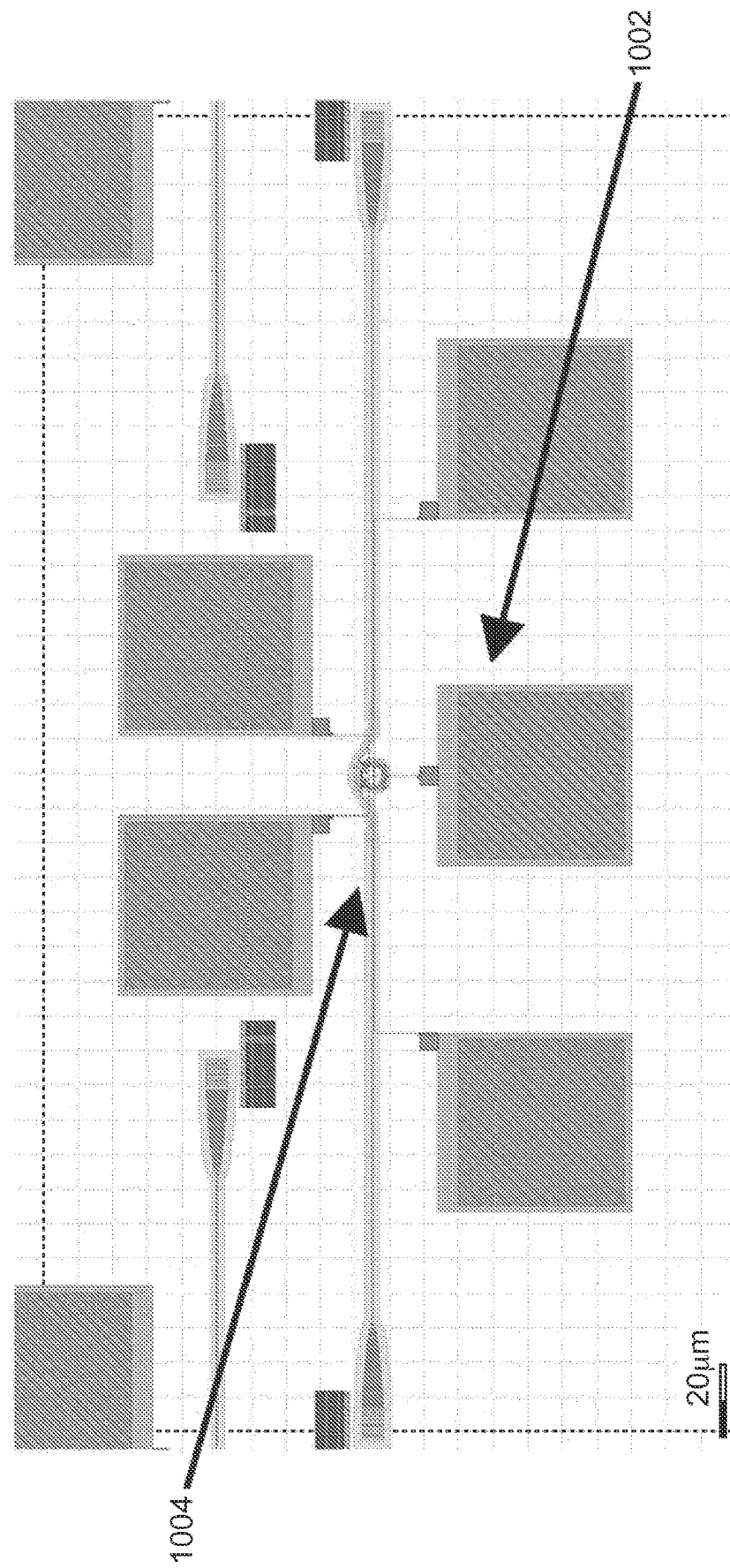
FIGS. 10A-10E show examples of the layouts for an example independent test site, accordingly to the principles described herein.
Figure 10B:
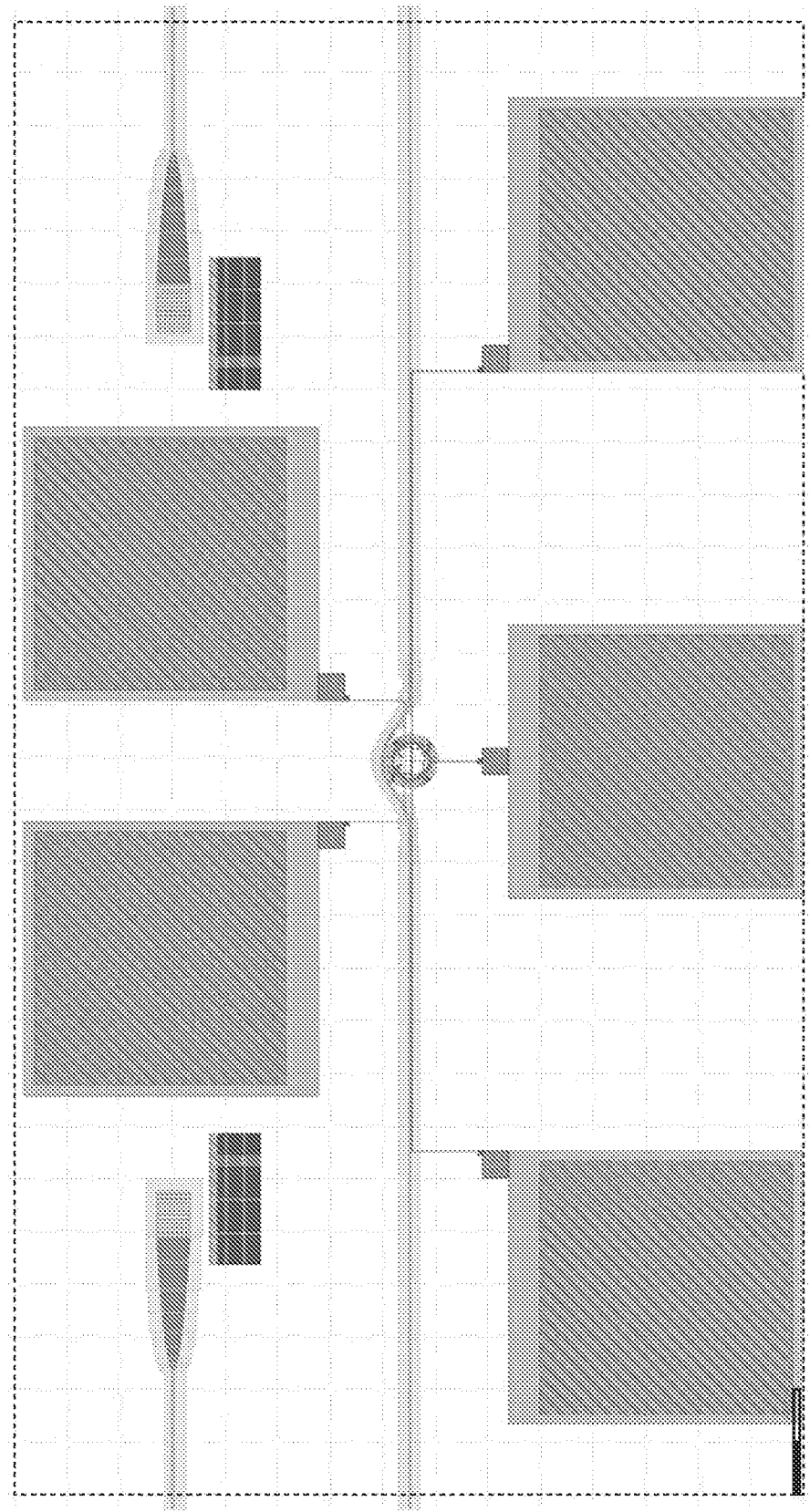
Figure 10C:
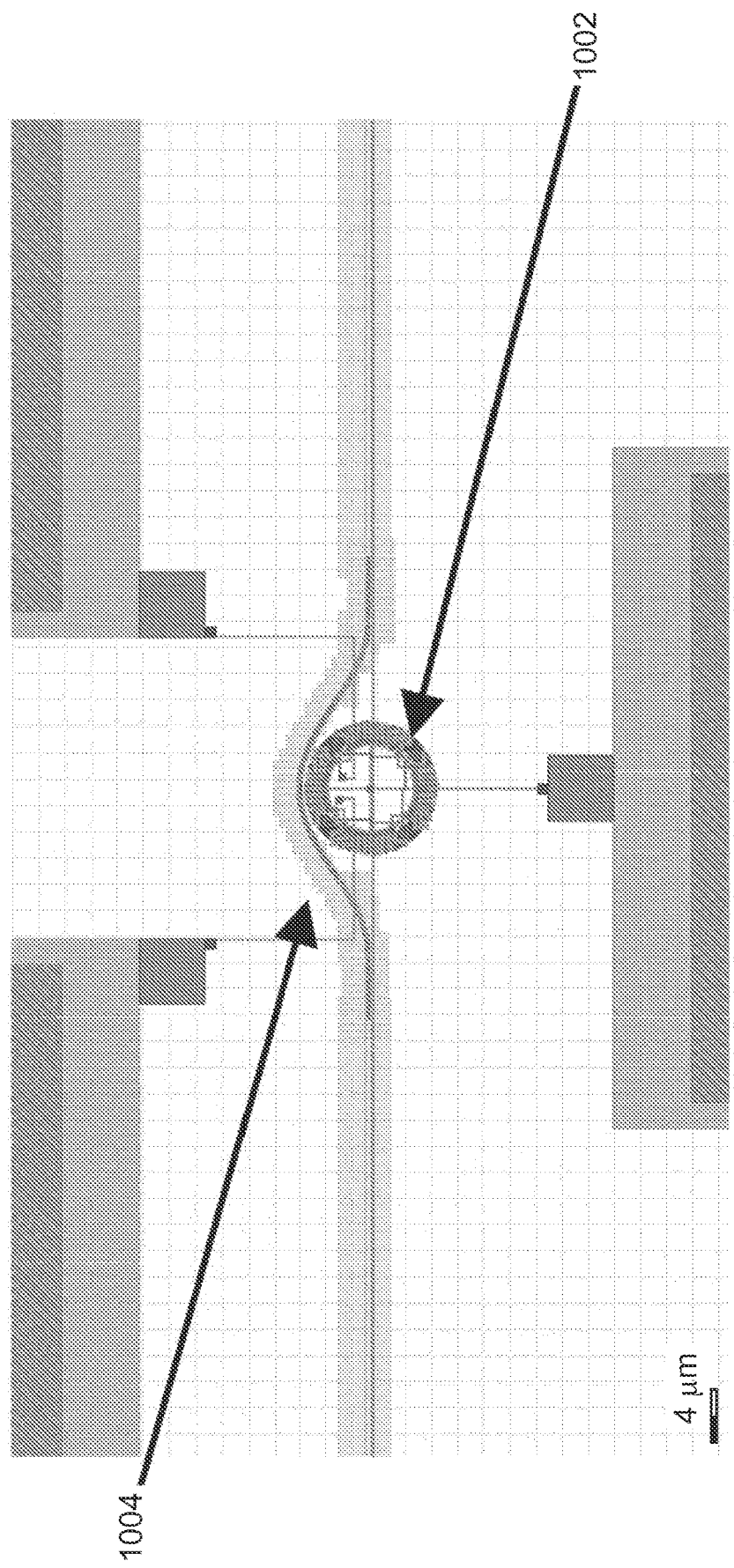
Figure 10D:
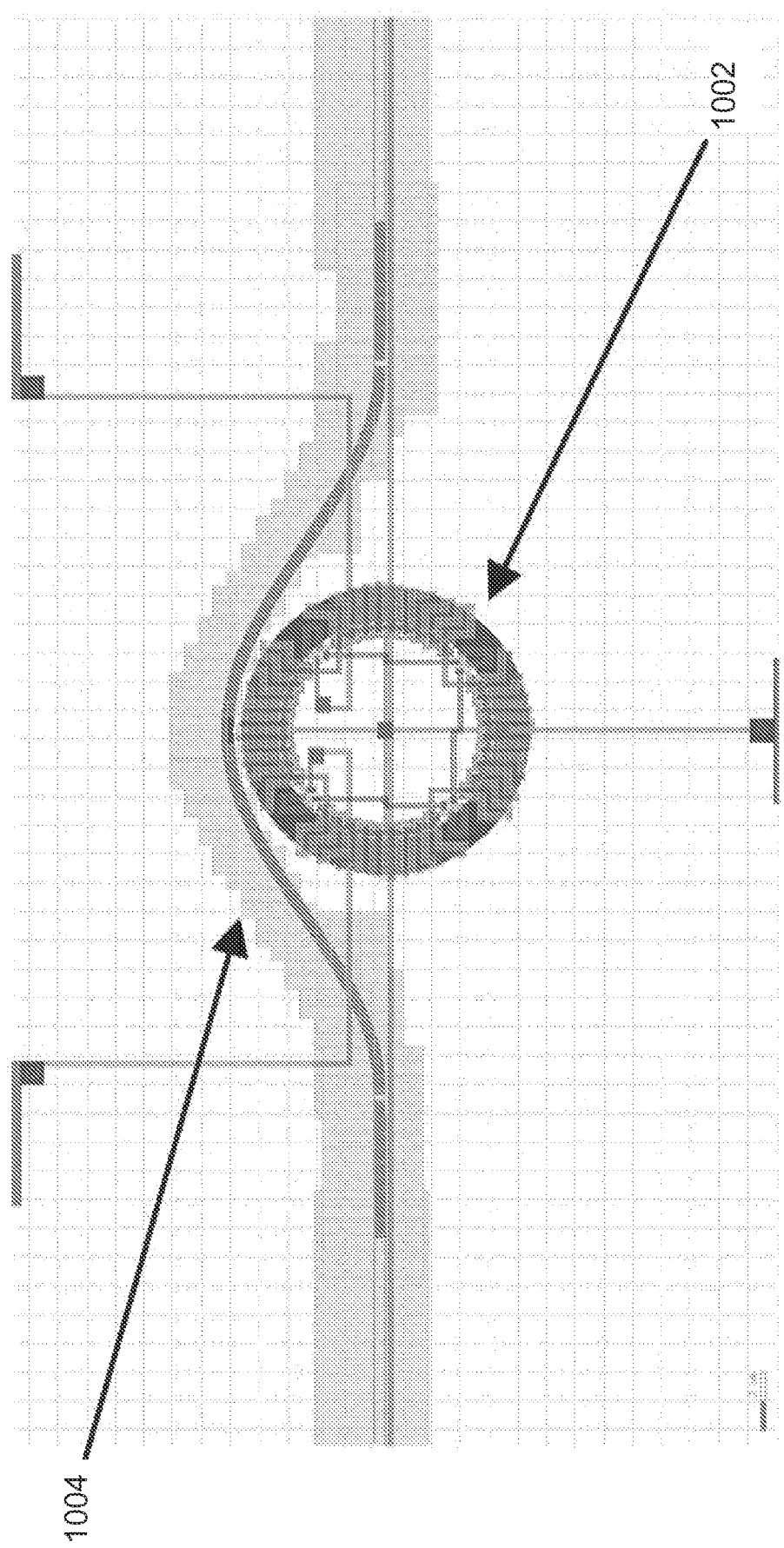
Figure 10E:
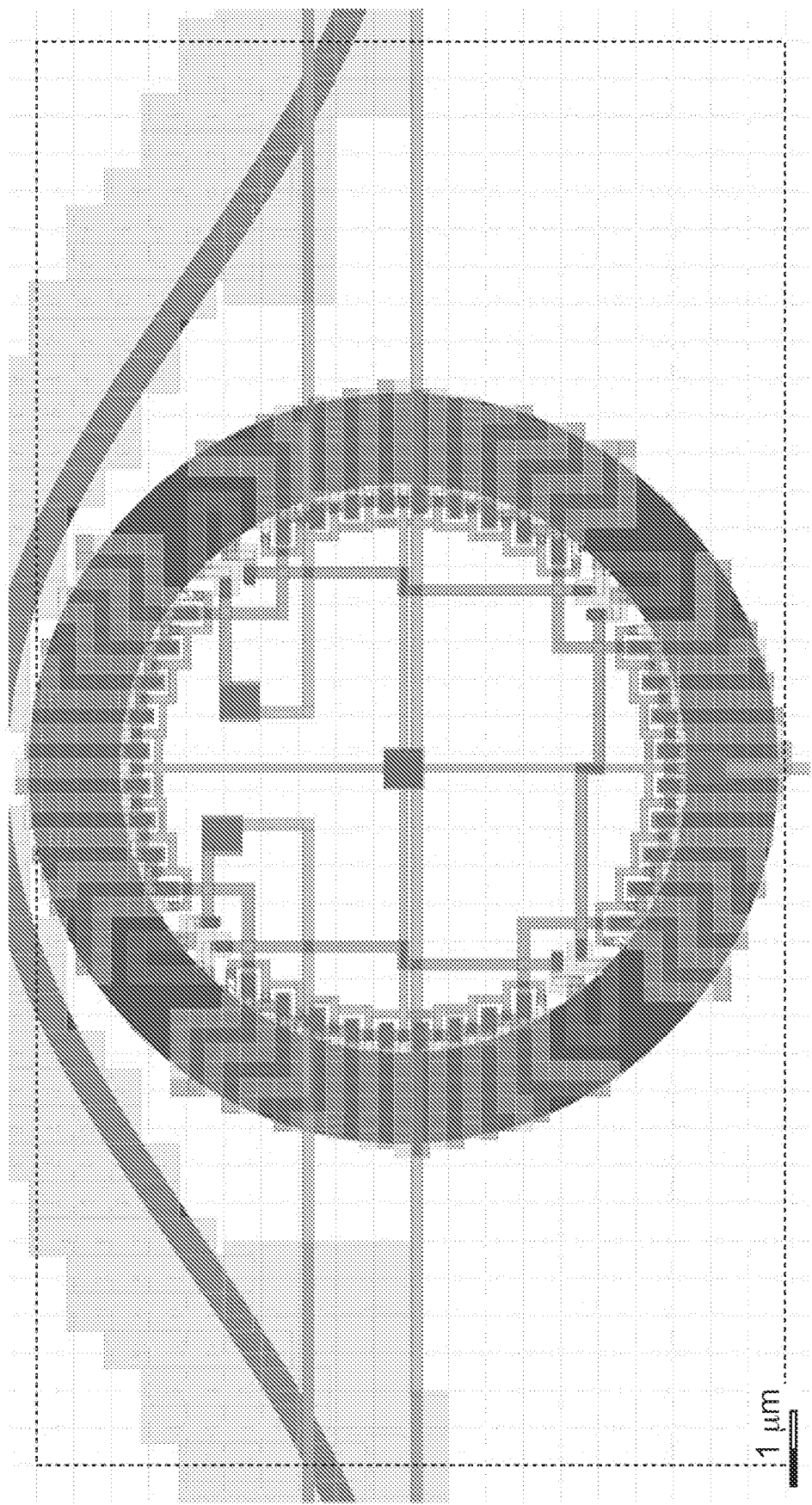

FIGS. 9A, 9B, and 9C show examples of the modulator layouts for the body silicon, the dopeblock, and the doping, respectively. FIG. 9D shows an example of the wiring layout. Non-limiting example simulations show that the parasitic capacitance of the wiring laid out in this way is estimated at about 5 fF. FIG. 9E shows a close up layout of the corner of the resonator structure, showing the doping layouts and the wiring layout. FIGS. 9F and 9G show example layouts for an example in-silicon heater and solely the heater, respectively. FIG. 9H shows an example of a megacell layout. In some examples, there can be 11 channels, similar to the example show in FIG. 9H. In some examples, similar circuit-driven test sites can be present on the chip.

FIGS. 10A-10E show examples of the layouts for an independent test site, according to the principles described herein. The independent test site includes the modulator structure 1002, driver, heating pads, and waveguide coupler 1004. FIGS. 10A to 10E show different levels of magnification from the wider view to a larger magnified view of the modulator structure. The example waveguide coupler 1004 includes a non-linear portion to facilitate selective optical coupling between the waveguide coupler 1004 and the resonator 1002, as described hereinabove.

Figure 11A:
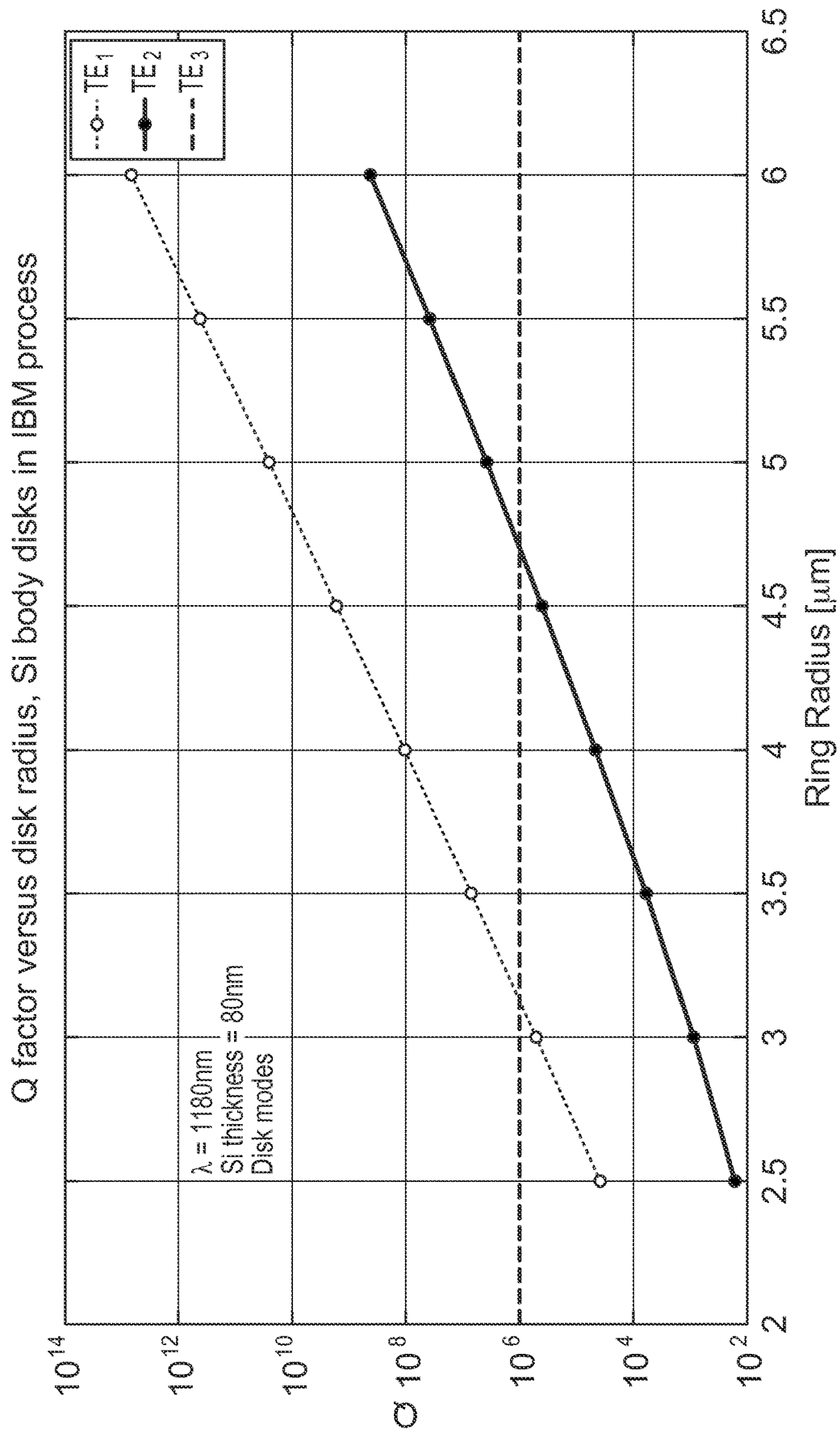
FIGS. 11A-11D show example results of the Q factor versus disk radius for silicon body disks, according to the principles described herein.
Figure 11B:
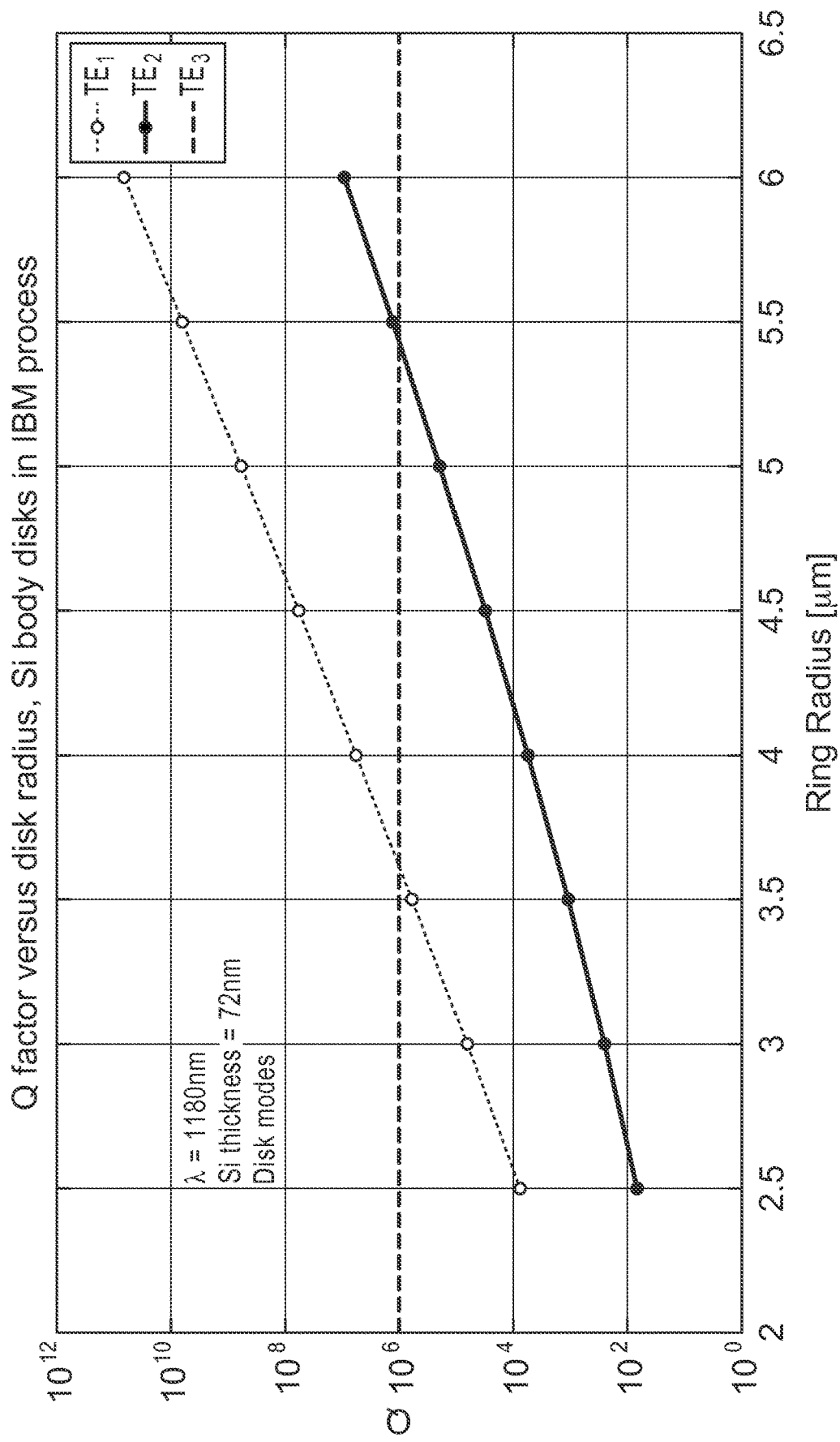

FIGS. 11A-11D show example results of the Q factor versus disk radius for example silicon body disks, according to the principles described herein. FIGS. 11A and 11B show example computation of values of Q factors for optical modes of a silicon disk of thickness about 80 nm and 72 nm, respectively, at an optical wavelength of 1180 nm (of potential relevance to on-chip interconnect applications).

Figure 11C:
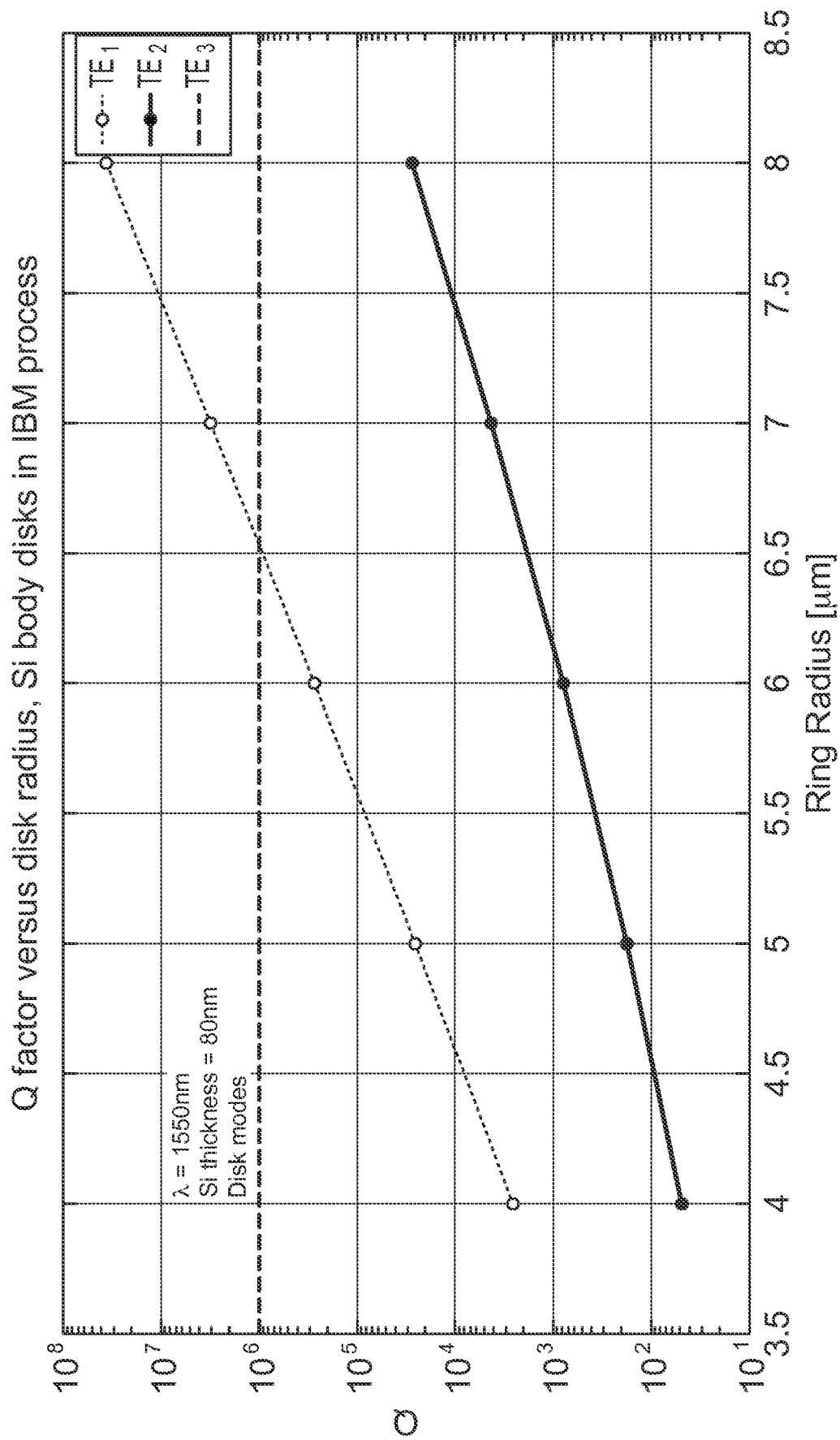
Figure 11D:
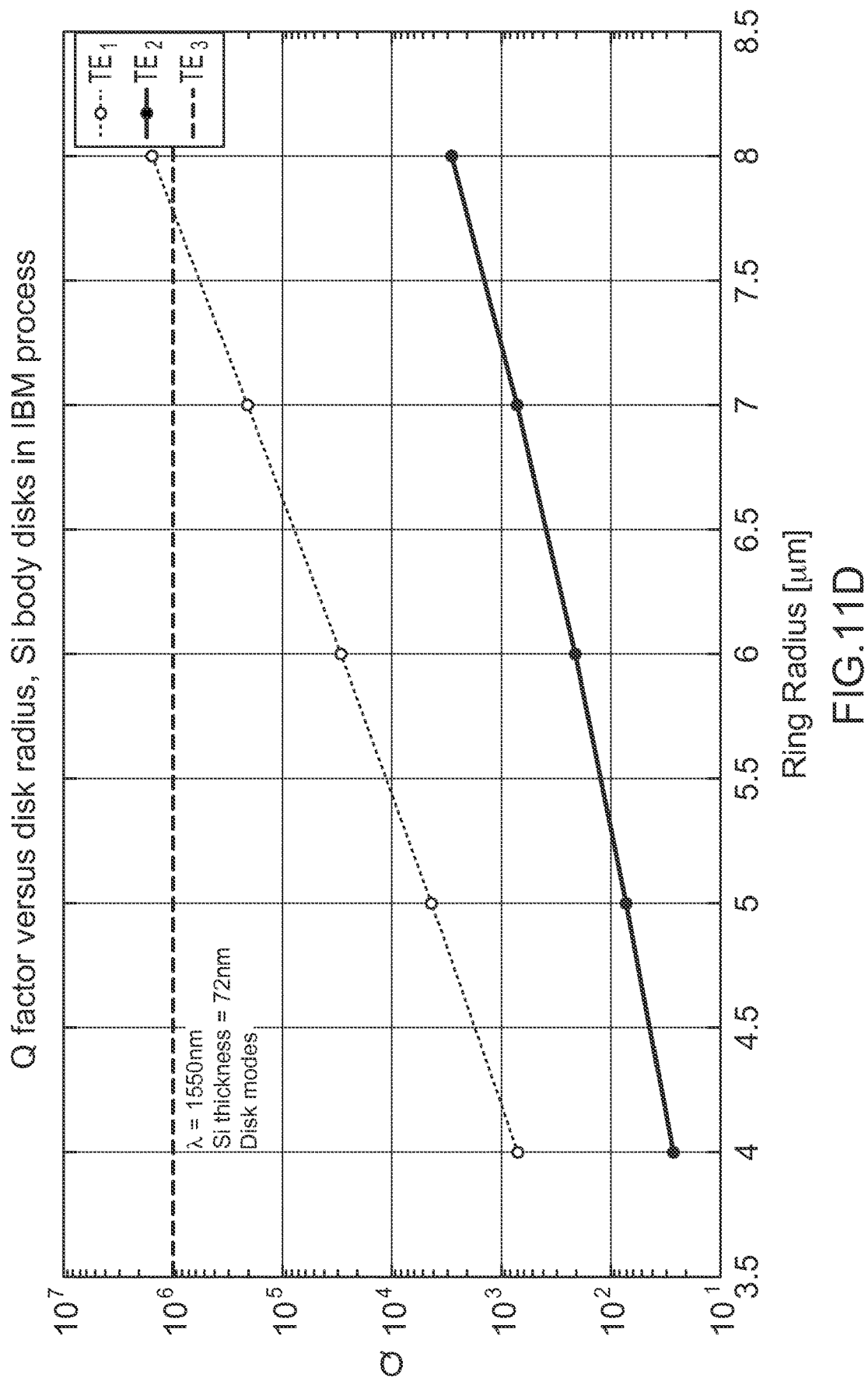

FIGS. 11C and 11D show example computation of values of Q factors for optical modes of a silicon disk of thickness about 80 nm and 72 nm, respectively, at an optical wavelength of 1550 nm (used in telecommunications).

Figure 12A:
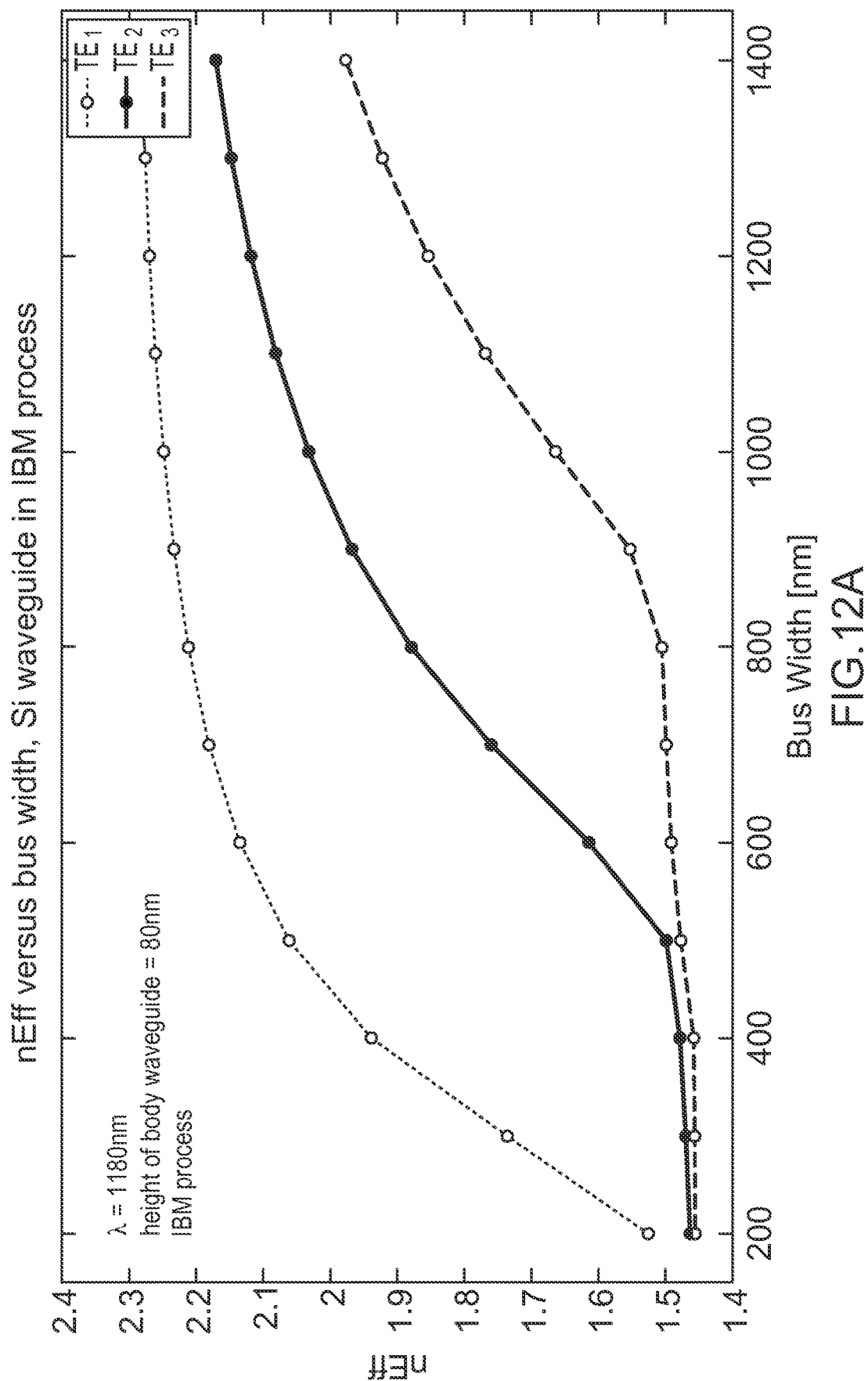
FIGS. 12A-12B show example results of the effective refractive index (nEff) versus bus width for a silicon waveguide, according to the principles described herein.
Figure 12B:
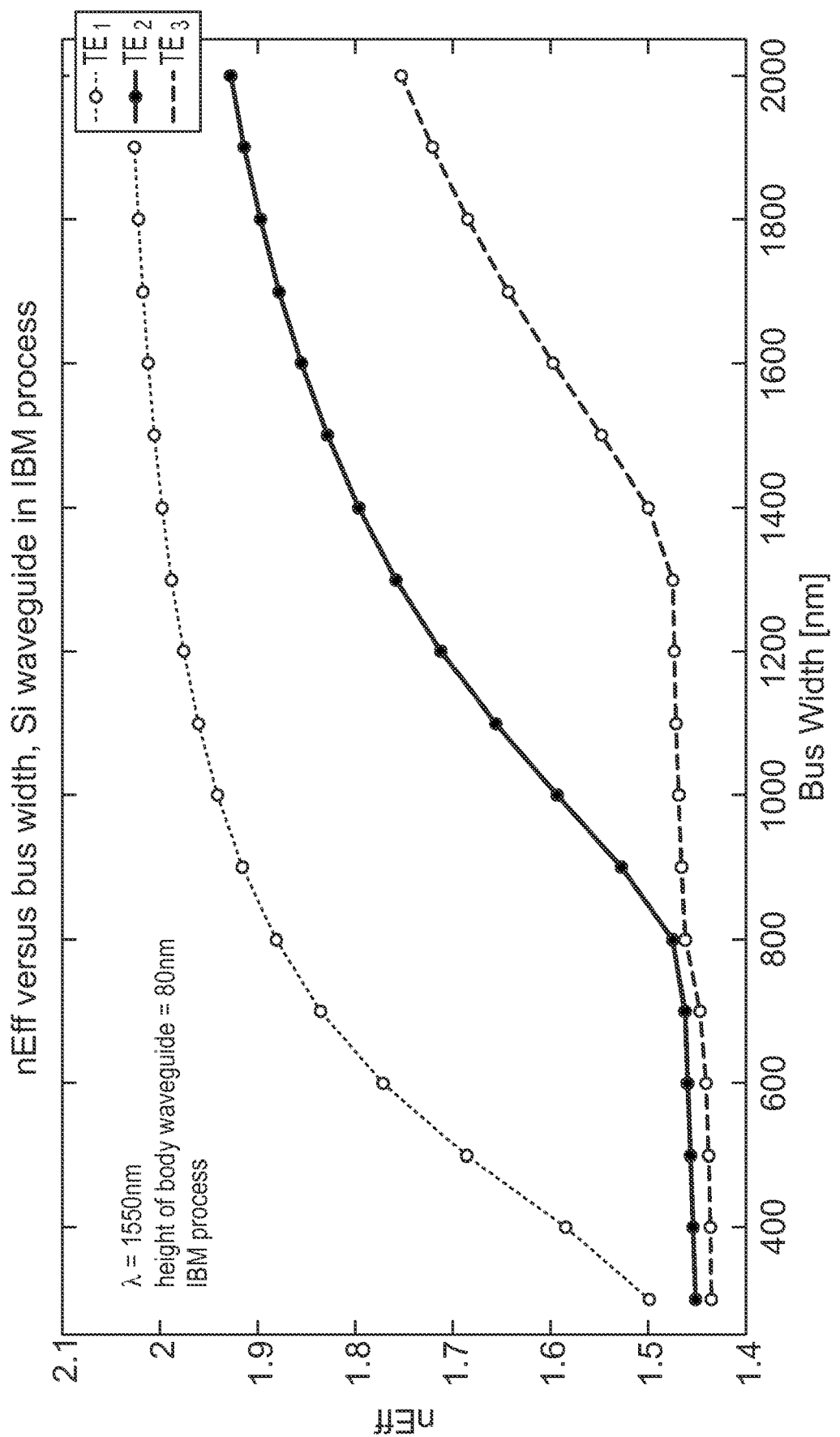
Figure 13B:
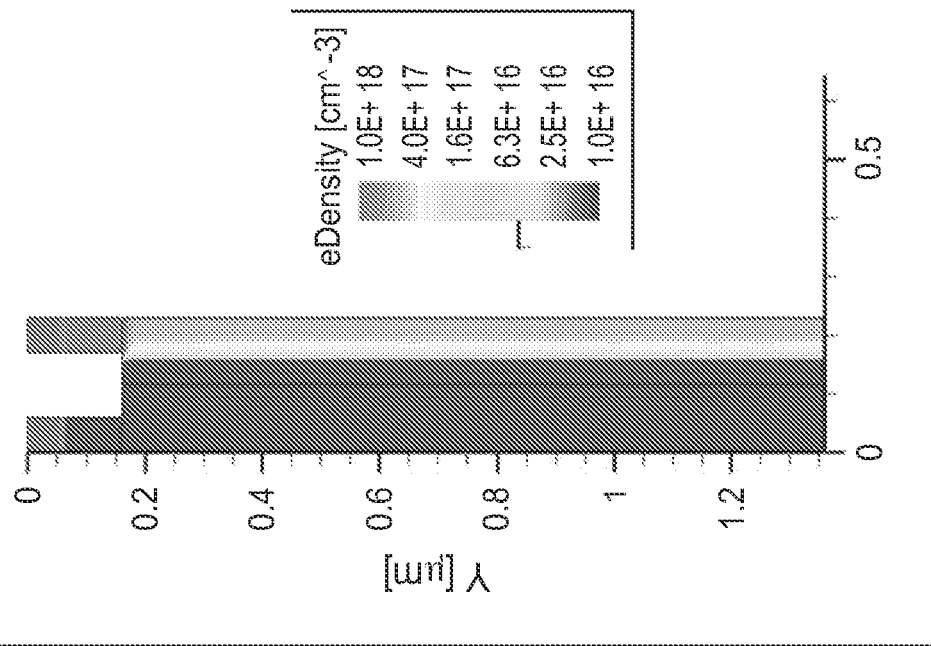
FIGS. 13A-13D show examples of diode characteristics, according to the principles described herein.
Figure 13A:
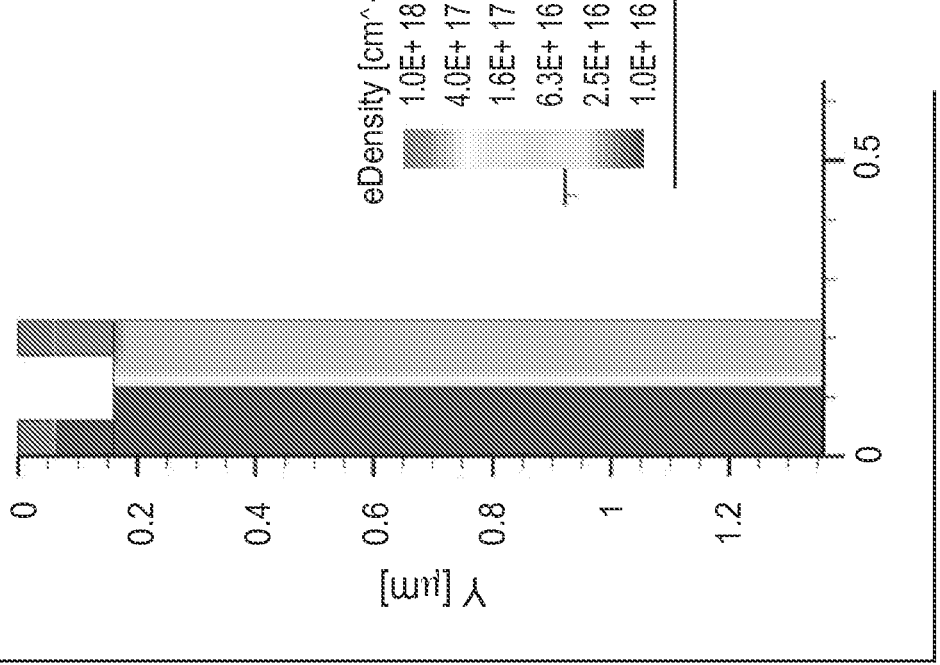
Figures 13C, 13D:
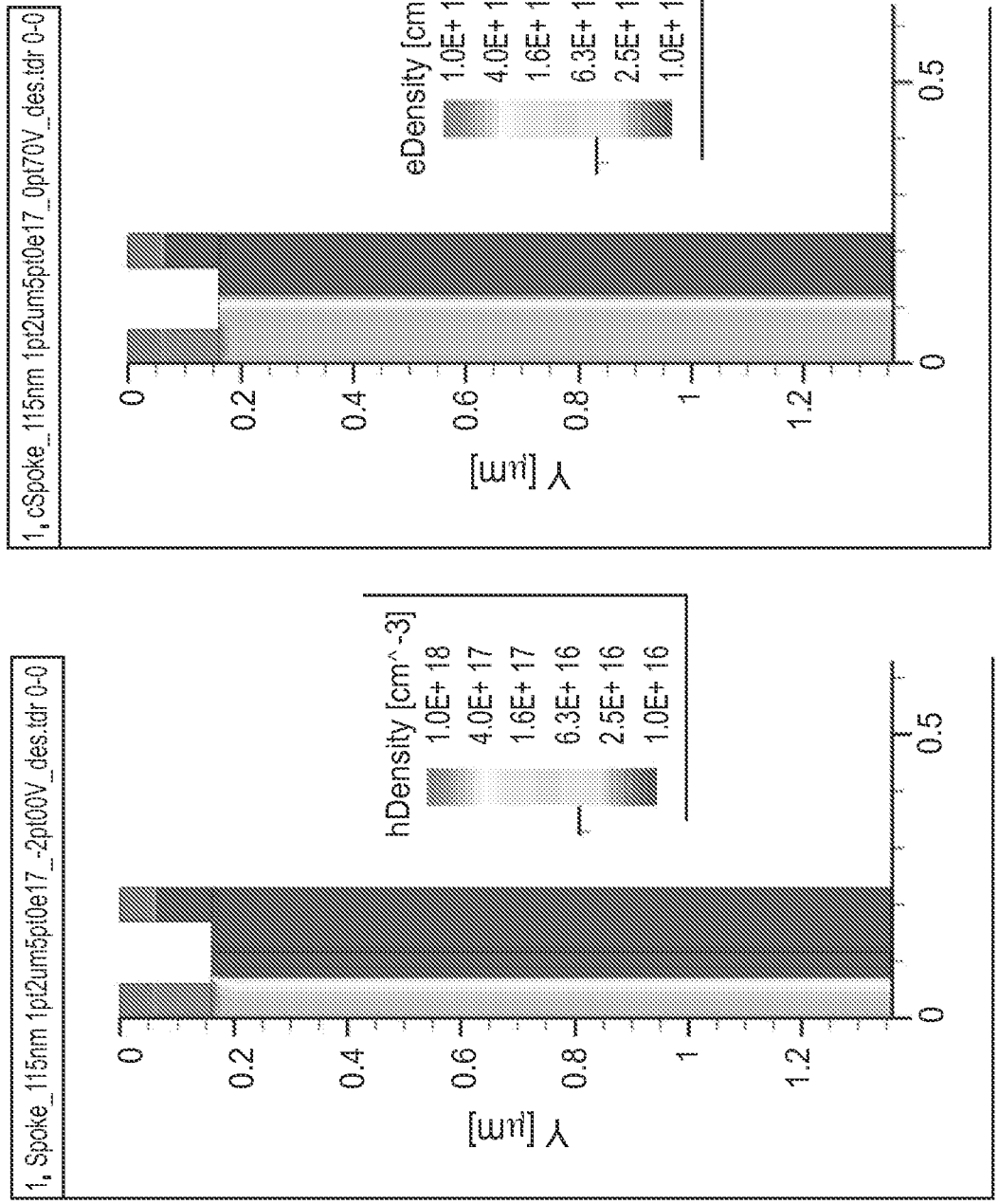

FIGS. 12A-12B show example results of computation of the effective refractive index (nEff) versus bus width for example silicon waveguides, according to the principles described herein. FIGS. 12A and 12B show example computation for a waveguide body height for a silicon waveguide at an optical wavelength of 1180 nm and 1550 nm, respectively.

FIGS. 13A-13D show examples results of the diode characteristics for example structures, according to the principles described herein.

Figure 14A:
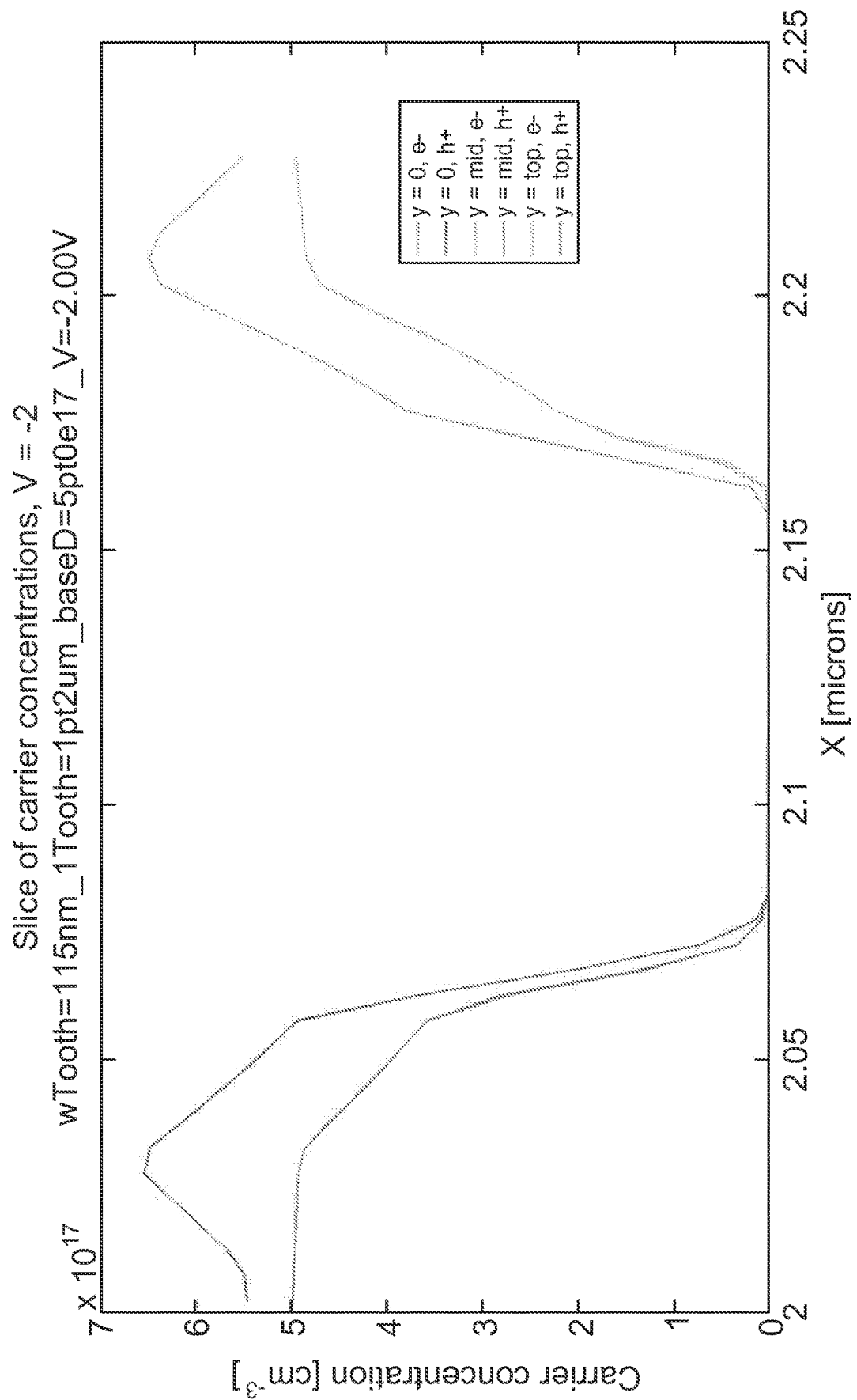
FIGS. 14A-14B show example plots of carrier concentration distribution in an example optical modulator diode versus applied voltage, illustrating diode characteristics, according to the principles described herein.
Figure 14B:
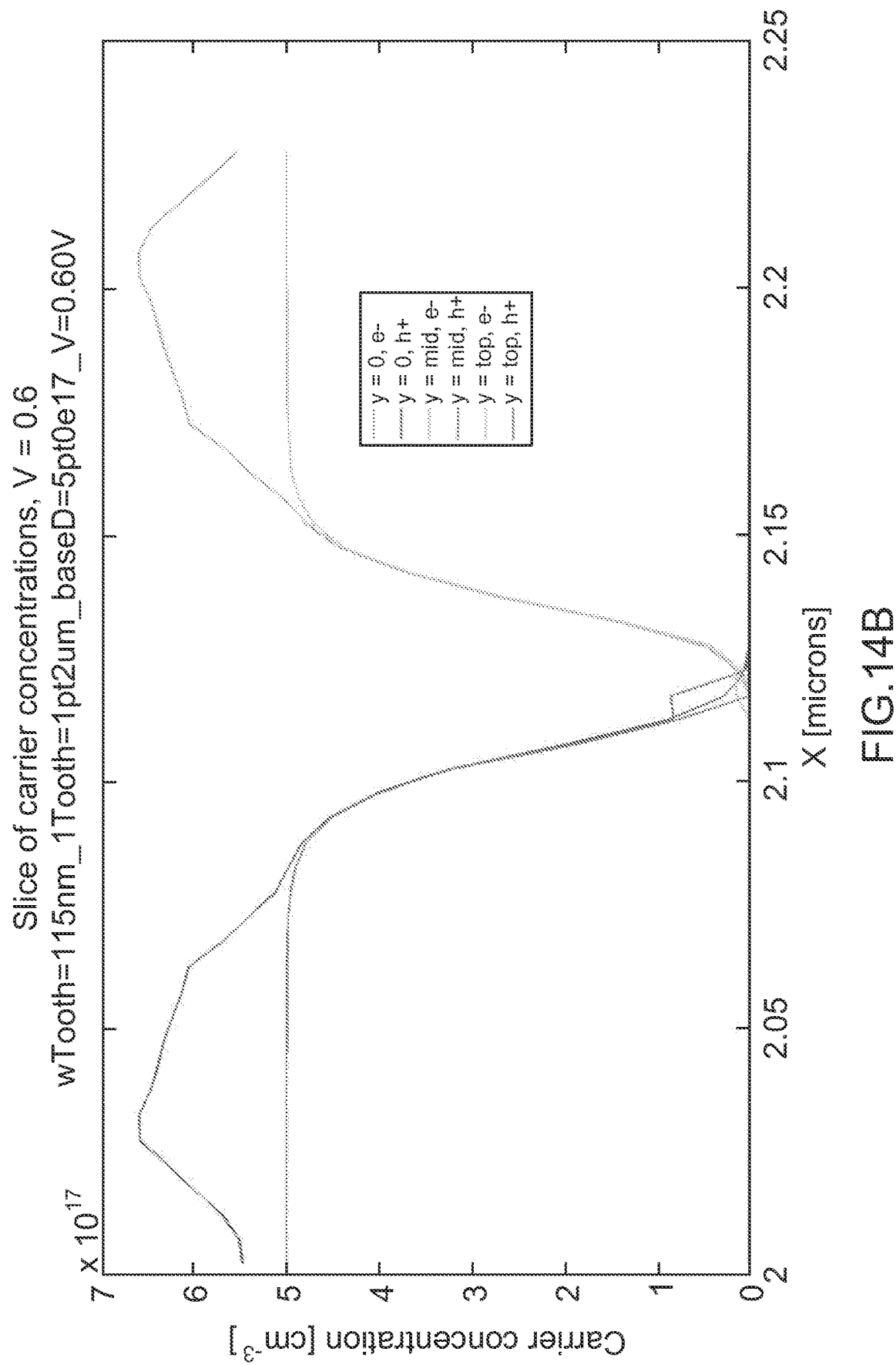

FIGS. 14A-14B show example plots of carrier concentration distribution in an example optical modulator diode versus applied voltage, illustrating diode characteristics, according to the principles described herein.

FIGS. 15A-15D show examples of various effective capacitor circuit representations, according to the principles described herein. The example capacitor circuit designs are in parallel. The example approximation can be implemented to represent one or more of the junction regions to facilitate simulation of the properties of the optical modulators.

Figure 16A:
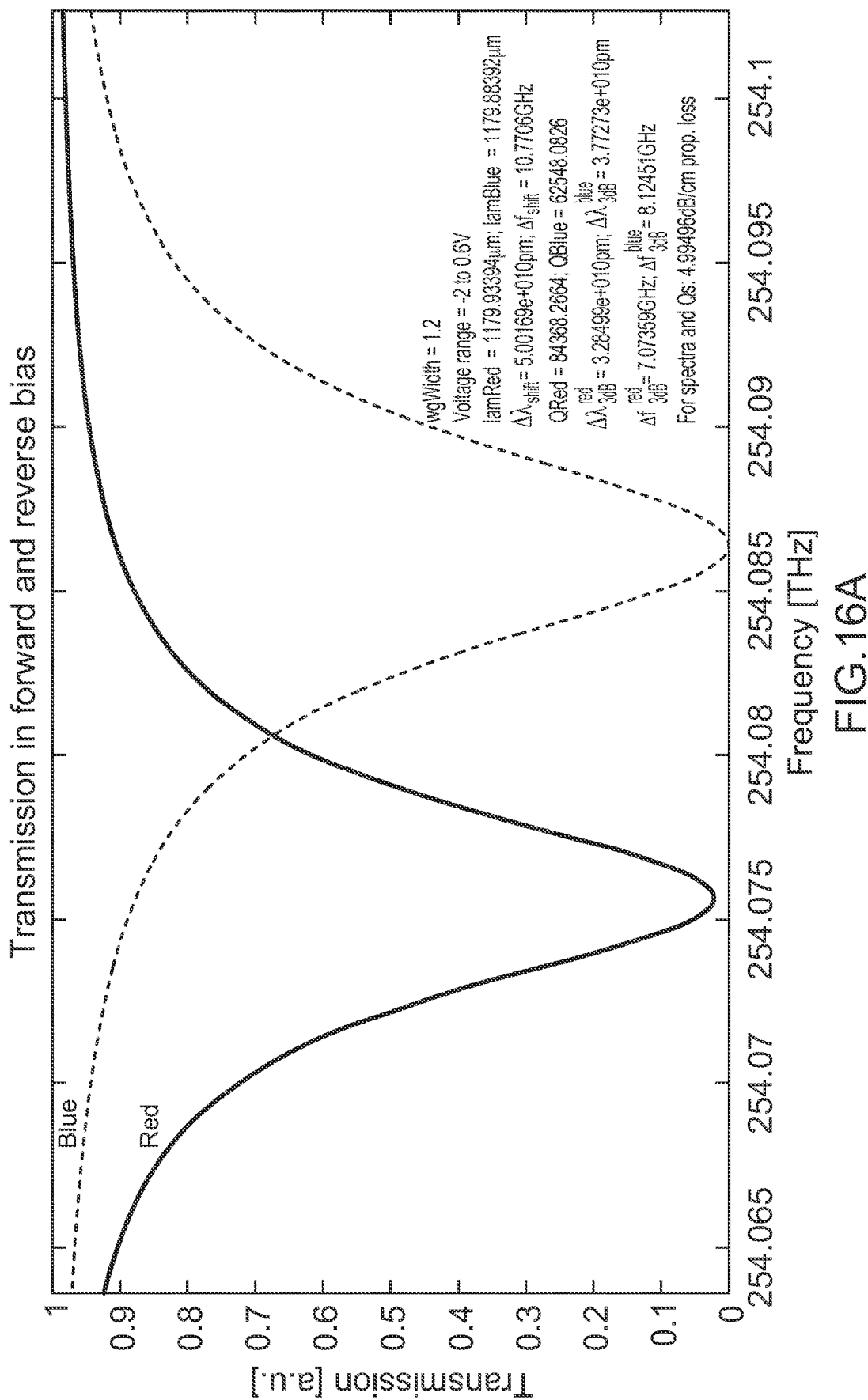
FIGS. 16A-16B show example plots of modulator performance, according to the principles described herein.
Figure 16B:
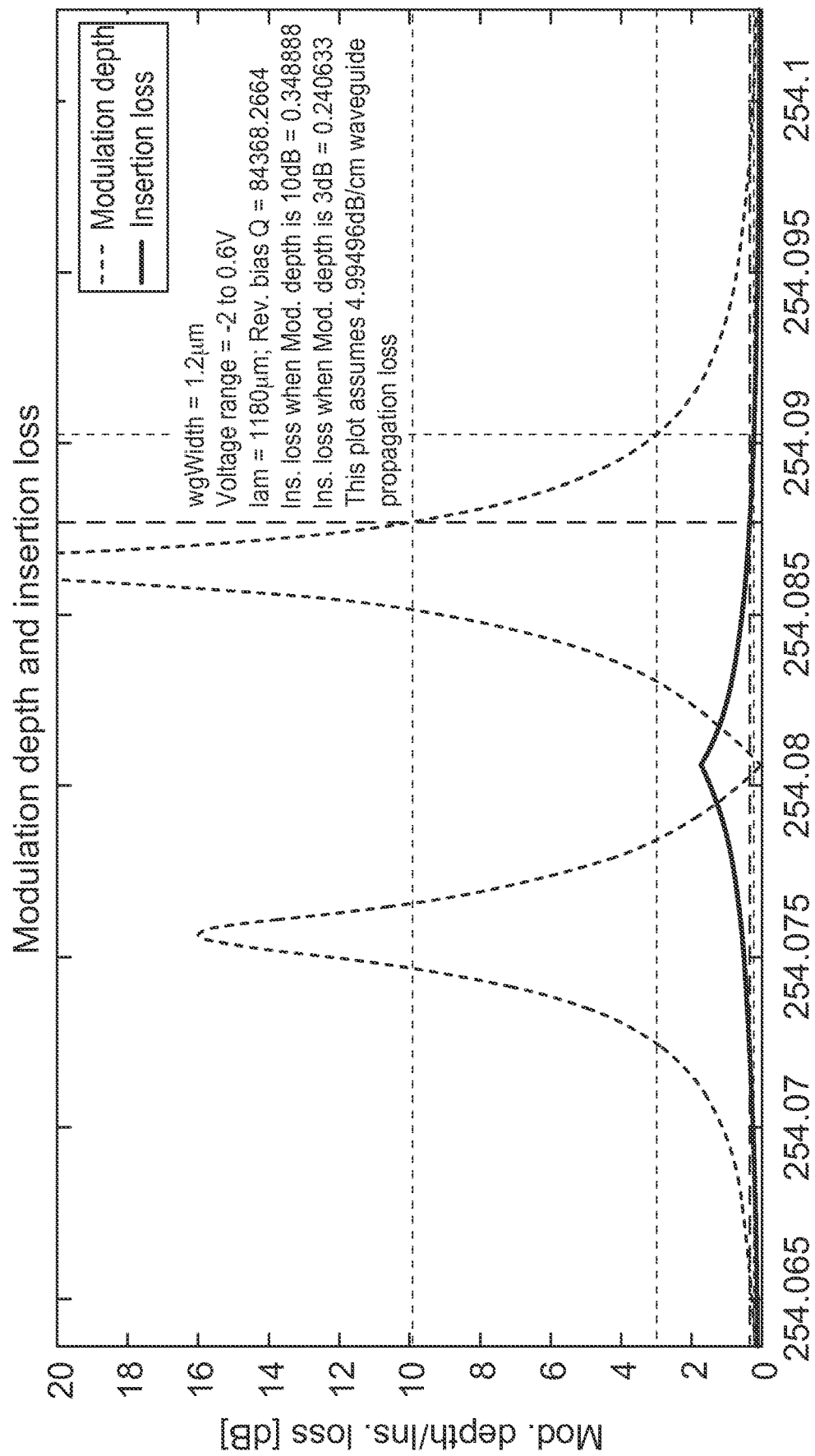

FIGS. 16A-16B show plots of modulator performance, according to the principles described herein. The modulator properties can be computed using the following expression:

$$\frac{\delta\omega}{\omega} = -\frac{1}{2}\frac{\int E^*\delta\epsilon(r)EdV}{\int E^*\epsilon(r)EdV}$$

FIG. 16A shows example results of computations of transmission, for both a forward and a reverse bias, versus frequency, measured at a voltage range of from about −2V to about 0.6V. FIG. 16B shows example results of computations of modulation depth and insertion loss versus frequency, measured at a voltage range of from about −2V to about 0.6V. The embodiments described above include novel designs for optical modulators. These modulators utilize optical resonators. One result of the innovative design is that these resonators, and resulting modulators, are fully compatible with realization in many native CMOS microelectronics processes, including silicon-on-insulator CMOS and bulk silicon CMOS.

Embodiments include a novel resonant cavity for integrated photonics applications. The resonant cavity includes a core comprising a material. The core material could include crystalline, polycrystalline or amorphous silicon, silica or another glass, silicon nitride (SiN, Si3N4), or a number of other semiconductors including III-V semiconductors. The cavity is formed by etching its structure from the core material layer, and may be either partially etched, or preferably fully etched through the core material.

In other embodiments, the novel resonant cavity has a traveling-wave optical resonator. The outer radius of the circular, oval, or otherwise closed-loop resonator is the primary light-guiding interface. For example, outer-boundary guiding is the confinement mechanism of whispering gallery modes of a disk microcavity. In the presented cavity, light is trapped along the outer wall to define resonant optical modes with a well-defined resonant frequency and a high optical quality factor (Q) due to low radiation loss. Bending-loss quality factors in the range of 100 to over 1 million may be achieved by design, as well as higher values, by choice of large enough radius. The optical resonant mode is confined against the outer boundary—a so-called whispering gallery mode.

In other embodiments, there may be a set of attachments along an inner radius of the cavity. These attachments may allow direct electrical, thermal and/or mechanical contact to the core of the resonator. The attachments may be placed radially sufficiently close to the outer radius to enable, e.g., low resistance from one contact to another through the primary core. Preferably the attachments are placed away from the outer radius (toward the center) by a distance a little more than the radial width of the confined optical resonant mode, to avoid scattering light in the resonant mode. This leaves a continuous core region of a certain radial width between the contacts on an inner radius and the outer radius boundary.

In a resonator where the core is silicon, realized in a silicon device layer around 80 nm in thickness, the width of the continuous silicon region could be about the width of a single mode straight waveguide, and likely between half and 3 times that width for tight bend radii (e.g., around 1 to 20 microns) that are typical in small devices. At larger radii, this design is realizable with a larger width, because whispering gallery modes are wider when confined by a larger outer radius, i.e., a weaker curvature outer boundary.

In other embodiments, the inner contacts to the core region are below 1 μm in width, and are spaced by etched regions that electrically isolate them, also less than 1 μm in width. Preferably, the contacts and the separating regions are between 10 and 500 nm wide.

In other embodiments, the optical resonator is implanted to form doped semiconductor regions. These doped regions may overlap with one or more of the inner contacts. The doped cavity geometry may overlap p-n junctions with the optical field of the resonant mode. In another aspect of the invention, the doped regions may be alternated azimuthally around the cavity, e.g., forming pnpnpn . . . or pinipinip . . . junctions. In another aspect of the invention, the junctions may repeat periodically around the cavity. In some implementations, the width of each doped region may approach the depletion region width in the cavity, either at 0V or preferably at a chosen reverse bias voltage. Such designs can be used to optimize the modulation efficiency (optical resonant wavelength shift per unit voltage applied) of the cavity.

Using the example systems, methods, and apparatus according to the principles herein, a design for an example photonic device can be determined for a given semiconductor fabrication technology, while complying with the complicated design rule check (DRC) and manufacturing constraints for the given semiconductor fabrication tool.

Figure 17:
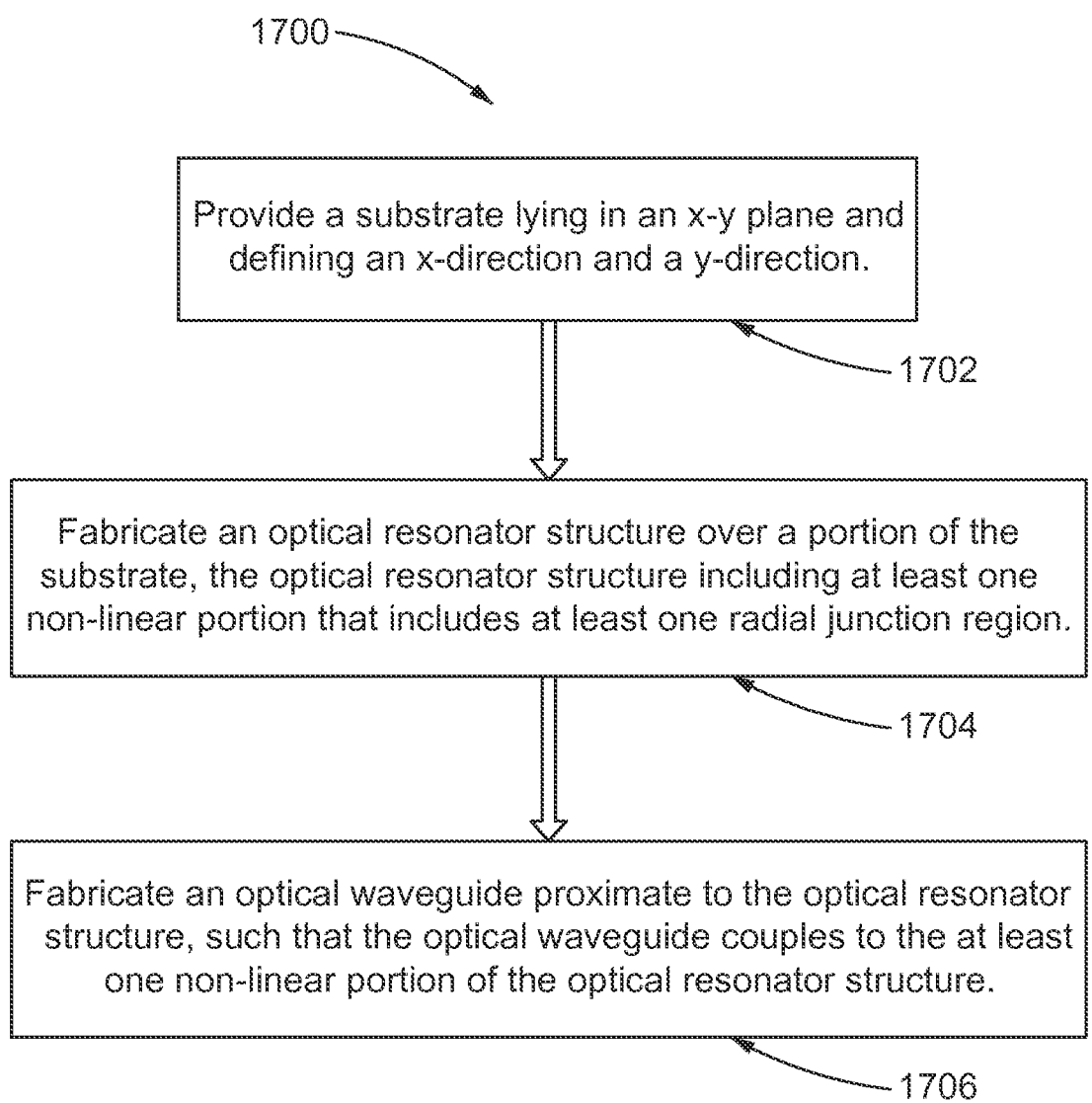
FIG. 17 shows procedures of an example method, according to the principles described herein.

Example methods are provided for fabricating example photonic devices according to the principles described herein, using a semiconductor fabrication tool. As shown in FIG. 17, an example method 1700 can include providing (1702) a substrate lying in an x-y plane and defining an x-direction and a y-direction, fabricating (1704) an optical resonator structure over a portion of the substrate, the optical resonator structure including at least one non-linear portion that includes at least one radial junction region. The method further includes fabricating (1706) an optical waveguide proximate to the optical resonator structure, such that the optical waveguide couples to the at least one non-linear portion of the optical resonator structure.

An example system, method or apparatus herein can be used to provide a device configuration module to generate a design for an example photonic device according to the principles described herein. Such an example device configuration module can include a processor and a memory storing processor executable instructions. Execution of the processor executable instructions causes the example device configuration module to perform any method described herein to determine a photonic device configuration. Execution of such an example method can include determining a configuration of an optical resonator structure to be fabricated, based on the desired photonic properties of an example photonic device. The example optical resonator structure includes at least one non-linear portion including at least one radial junction region. Simulations and computation of equivalent optical representations can be used to assess the performance of an example photonic device based on parameters such as but not limited to the type of materials that form the radial junction (including base materials, types of dopants, and concentration of dopants), the number and radial separation (including dimensions) of the radial junction region(s), the conformation of the optical resonator structure (including width of the resonator region), material composition and placement of electrical contacts, and conformation and dimensions of the waveguide coupler. As a non-limiting example, performance measures to be optimized for an example photonic device include the Quality factor. In an example, a device configuration module can be configured to execute processor-executable instructions to suggest variations in a design of a candidate optical resonator structure to generate a photonic device, based on the performance parameters computed from previous runs, to evaluate the performance characteristics of a candidate design, converging towards an optimal structure with each iteration. Instructions to be executed by a semiconductor fabrication can be generated based on the generated configuration of the photonic device using the example device configuration module. As a non-limiting example, an output of the device configuration module can be instructions that can be used by a computer aided design (CAD) tool, such as but not limited to the tool provided by Cadence Design Systems, Inc., San Jose, Calif. For example, based on the output from the device configuration module, a CAD tool can be implemented to determine parameters defining, e.g., the type of materials that form the radial junction, the number and radial separation of the radial junction region(s), the conformation of the optical resonator structure, material composition and placement of electrical contacts, and conformation and dimensions of the waveguide coupler, for use by the semiconductor fabrication tool to generate the example photonic device. In an example implementation, based on these determined parameters, and the instructions for the fabrication sequence in the fabrication, a semiconductor fabrication tool can be implemented to fabricate an example optical resonator structure, or an example photonic device including the example optical resonator structure.

According to the principles herein, at least one non-transitory computer-readable medium is provided having code representing processor-executable instructions encoded thereon, the processor-executable instructions including instructions that, when executed by one or more processing units, perform any example method described herein, including any method for generating a design of a candidate optical resonator structure, or an example photonic device including the example optical resonator structure.

According to the principles herein, at least one non-transitory computer-readable medium is provided having code representing processor-executable instructions encoded thereon, the processor-executable instructions including instructions that, when executed by one or more processing units, perform any example method described herein, including any instructions performed using a device configuration module according to the principles described herein.

Figure 18:
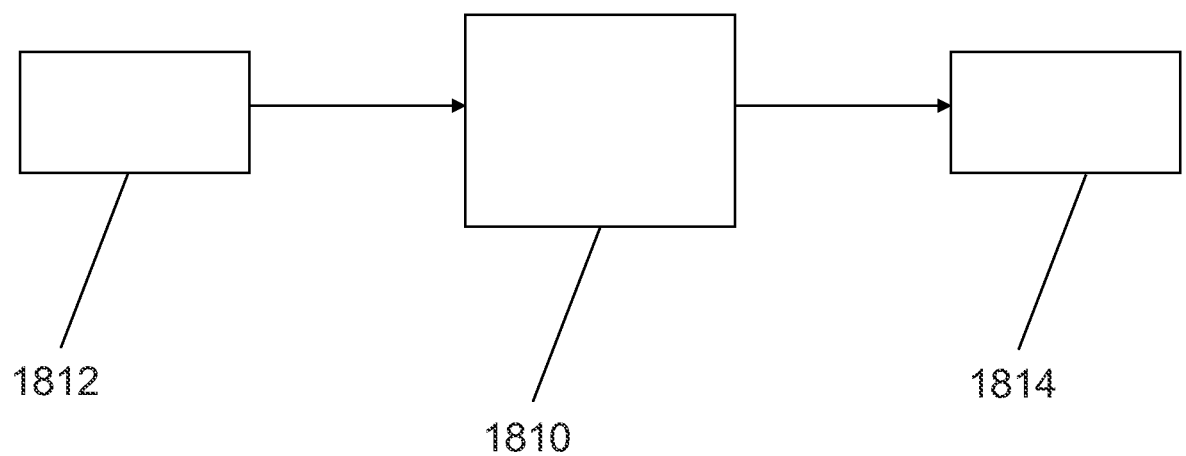
FIG. 18 shows a block diagram of an example device configuration system, according to the principles described herein.

FIG. 18 shows a block diagram of an example device configuration system 1810 that receives input information 1812 and generates an output 1814 of a device configuration module, as described herein. In particular, the device configuration system 1810 can be implemented to execute instructions associated with any of the example methods described herein. In some examples, the device configuration system 1810 provides the output 1814 by storing it to a data storage device (e.g., in a database, a server, or other memory), rendering it on a display (e.g., in a user interface generated by a software application program or App), or rendering it on a print medium (e.g., paper).

Figure 19:
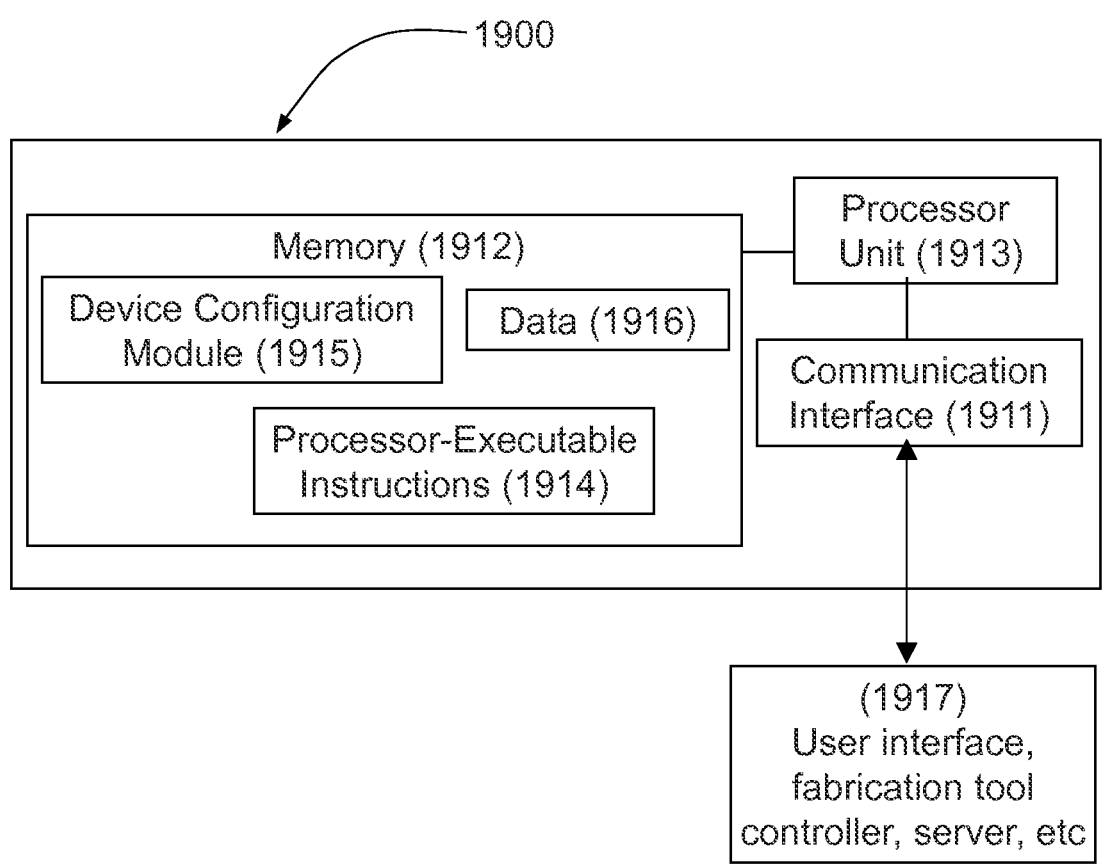
FIG. 19 shows a block diagram of an example system, according to the principles described herein.

FIG. 19 shows a block diagram of an example system including a device configuration module, according to the systems and methods described herein. A non-limiting example of the system 1900 according to the principles described herein is illustrated in FIG. 19. The system 1900 includes at least one communication interface 1911, at least one memory 1912, and at least one processing unit 1913. The at least one processing unit 1913 is communicatively coupled to the at least one communication interface 1911 and the at least one memory 1912. The at least one memory 1912 is configured to store processor-executable instructions 1914 and a device configuration module 1915. As described in greater detail herein, the device configuration module 1915 can be applied to determine, based on data 1916 representative of the DRC requirements of a semiconductor fabrication tool, an output of the device configuration module, as described herein. In a non-limiting example, the at least one processing unit 1913 executes the processor-executable instructions 1914 stored in the memory 1912 at least to provide the iterative computation described hereinabove. The at least one processing unit 1913 also executes processor-executable instructions 1914 to control the memory 1912 to store, or to control the communication interface 1911 to transmit 1917, an output of the device configuration module, as described herein, to, e.g., a user interface, a controller for a semiconductor fabrication tool, a database, or a server.

Figure 20:
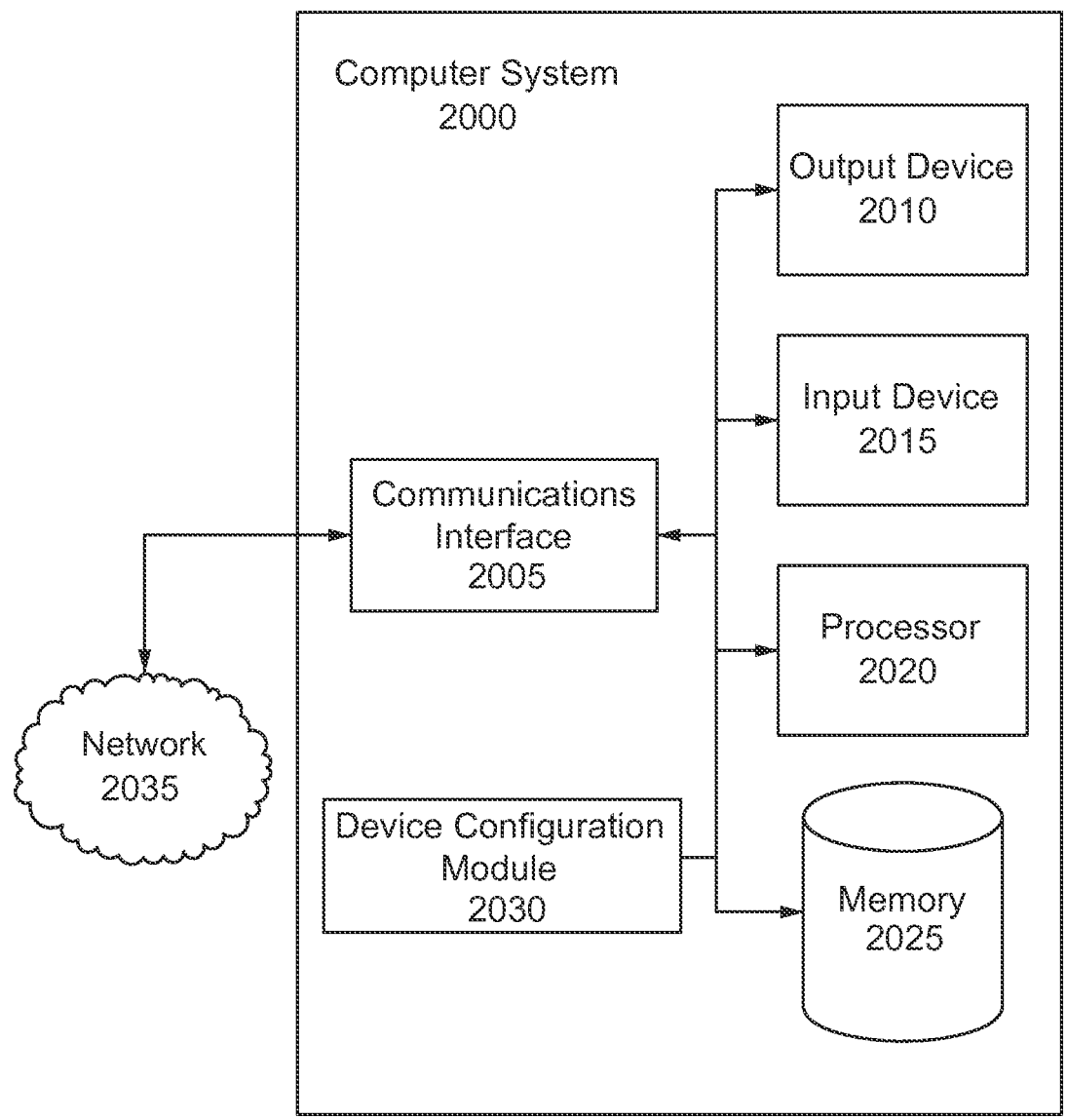
FIG. 20 shows the architecture of an example computer system, according to the principles described herein.

FIG. 20 shows an example architecture of an illustrative computer system 2000 that can be employed to implement any of the systems and methods described herein. The computer system 2000 of FIG. 20 includes one or more processors 2020 communicatively coupled to memory 2025, one or more communications interfaces 2005, and one or more output devices 2010 (e.g., one or more display units) and one or more input devices 2015.

In the computer system 2000 of FIG. 20, the memory 2025 may comprise any computer-readable storage media, and may store computer instructions such as processor-executable instructions for implementing the various functionalities described herein for respective systems, as well as any data relating thereto, generated thereby, or received via the communications interface(s) or input device(s). The processor(s) 2020 shown in FIG. 20 may be used to execute instructions stored in the memory 2025 and, in so doing, also may read from or write to the memory various information processed and or generated pursuant to execution of the instructions.

The example computer system 2000 also includes a device configuration module 2030. Device configuration module comprises processor-executable instructions for performing any of the methods described herein to provide, for example, an output of the device configuration module, as described herein. Processor 2020 can be used to execute the processor-executable instructions in connection with device configuration module 2030.

The processor 2020 of the computer system 2000 shown in FIG. 20 also may be communicatively coupled to or control the communications interface(s) 2005 to transmit or receive various information pursuant to execution of instructions. For example, the communications interface(s) 2005 may be coupled to a wired or wireless network, bus, or other communication means and may therefore allow the computer system 2000 to transmit information to and/or receive information from other devices (e.g., other computer systems). Communication interface(s) 2005 also may be in communication with an external network 2035. In some implementations, the communications interface(s) may be configured (e.g., via various hardware components or software components) to provide a website or applications program (an App) on an electronic device as an access portal to at least some aspects of the computer system 2000. Non-limiting examples of such electronic devices are tablets, slates, smartphones, electronic readers, or other similar electronic devices.

The output devices 2010 of the computer system 2000 shown in FIG. 20 may be provided, for example, to allow various information to be viewed or otherwise perceived in connection with execution of the instructions. The input device(s) 2015 may be provided, for example, to allow a user to make manual adjustments, make selections, enter data or various other information, or interact in any of a variety of manners with the processor during execution of the instructions of the device configuration module.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be examples and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that inventive embodiments may be practiced otherwise than as specifically described. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the invention may be implemented in any of numerous ways, including through implementations provided in FIGS. 1A to 20 attached hereto. For example, some embodiments may be implemented using hardware, software or a combination thereof.

When any aspect of an embodiment is implemented at least in part in software, the software code may be executed on any suitable processor or collection of processors, whether provided in a single device or computer or distributed among multiple devices/computers.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification, unless clearly indicated to the contrary, should be understood to mean "at least one."

The phrase "and/or," as used herein in the specification, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An optical device, comprising:

an optically resonant structure formed in a planar device layer of a semiconductor chip, the optically resonant structure including one or more semiconductor materials including silicon, the optically resonant structure having a ring shape defined by an outer wall and an inner wall, the outer wall and the inner wall positioned concentrically about a center of the ring shape;

a plurality of n-type regions formed within the optically resonant structure, each of the plurality of n-type regions occupying a corresponding volume within the optically resonant structure that is subtended by a first corresponding angle measured azimuthally about a vertical centerline of the ring shape of the optically resonant structure, the vertical centerline extending through the center of the ring shape and substantially perpendicular to at least one of the bottom and top surfaces of the planar device layer, the corresponding volume of each of the plurality of n-type regions positioned within a light propagation path of a resonant mode of the optically resonant structure;

a plurality of p-type regions formed within the optically resonant structure, each of the plurality of p-type regions occupying a corresponding volume within the optically resonant structure that is subtended by a second corresponding angle measured azimuthally about the vertical centerline of the ring shape of the optically resonant structure, each of the plurality of p-type regions located between and interfacing with a neighboring pair of n-type regions of the plurality of n-type regions so as to form a plurality of lateral semiconductor junctions across the light propagation path of the resonant mode of the optically resonant structure, each of the plurality of lateral semiconductor junctions existing within a corresponding substantially vertical plane extending radially outward from the vertical centerline of the ring shape of the optically resonant structure;

a first plurality of contacts electrically and respectively connected to the plurality of n-type regions, each of the first plurality of contacts electrically connected to a first electrical conduit, each of the first plurality of contacts positioned to contact a corresponding one of the plurality of n-type regions at a corresponding location away from the light propagation path of the resonant mode of the optically resonant structure; and a second plurality of contacts electrically and respectively connected to the plurality of p-type regions, each of the second plurality of contacts electrically connected to a second electrical conduit, each of the second plurality of contacts positioned to contact a corresponding one of the plurality of p-type regions at a corresponding location away from the light propagation path of the resonant mode of the optically resonant structure.

2. The optical device of claim 1, wherein each of the outer wall and the inner wall extends continuously from a top cladding to a bottom cladding.

3. The optical device of claim 1, wherein a height of either the outer wall or the inner wall defines a maximum height of the optically resonant structure.

4. The optical device of claim 1, wherein each of the outer wall and the inner wall extends continuously from a bottom surface of the planar device layer to a top surface of the planar device layer.

5. The optical device of claim 1, wherein each of the plurality of n-type regions extends radially from the inner wall to the outer wall, and wherein each of the plurality of p-type regions extends radially from the inner wall to the outer wall.

6. The optical modulator of claim 1, wherein the first plurality of contacts and the second plurality of contacts are disposed alongside the inner wall.

7. The optical device of claim 1, wherein the first plurality of contacts and the second plurality of the contacts are disposed in closer proximity to the inner wall than to the outer wall.

8. The optical device of claim 1, wherein each of the plurality of n-type regions extends over less than a radial distance as measured from the outer wall to the inner wall, and wherein each of the plurality of p-type regions extends over less than the radial distance as measured from the outer wall to the inner wall.

9. The optical device of claim 1, wherein each one of the plurality of n-type regions forms at least one lateral semiconductor junction of the plurality of lateral semiconductor junctions.

10. The optical device of claim 1, wherein each one of the plurality of p-type regions forms at least one lateral semiconductor junction of the plurality of lateral semiconductor junctions.

11. The optical device of claim 1, wherein each of the plurality of n-type regions extends radially outside of the outer wall, and wherein each of the plurality of p-type regions extends radially outside of the outer wall.

12. The optical device of claim 1, wherein each of the plurality of n-type regions extends to at least one of a bottom surface of the planar device layer and a top surface of the planar device layer.

13. The optical device of claim 1, wherein each of the plurality of n-type regions extends to both a bottom surface of the planar device layer and a top surface of the planar device layer.

14. The optical device of claim 1, wherein each of the plurality of lateral semiconductor junctions extends from a bottom surface of the planar device layer to a top surface of the planar device layer.

15. The optical device of claim 14, wherein each of the plurality of lateral semiconductor junctions extends from the inner wall to the outer wall.

16. The optical device of claim 1, wherein the optically resonant structure has a height that is less than or equal to 100 nm.

17. The optical device of claim 1, wherein the optically resonant structure includes at least one of a modulator and a detector.

18. An optical device, comprising:
an optically resonant structure formed in a planar device layer of a microchip, the optically resonant structure including one or more semiconductor materials including silicon, the optically resonant structure having a ring shape defined by an outer wall and an inner wall, the outer wall and the inner wall positioned concentrically about a center of the ring shape;
a plurality of n-type regions formed within the optically resonant structure, each of the plurality of n-type regions occupying a corresponding volume within the optically resonant structure that is subtended by a corresponding angle measured azimuthally about a vertical centerline of the ring shape of the optically resonant structure, the vertical centerline extending through the center of the ring shape and substantially perpendicular to at least one of the bottom and top surfaces of the planar device layer, the corresponding volume of each of the plurality of n-type regions positioned within a light propagation path of a resonant mode of the optically resonant structure;
a plurality of p-type regions formed within the optically resonant structure, each of the plurality of p-type regions occupying a corresponding volume within the optically resonant structure that is subtended by a corresponding angle measured azimuthally about the vertical centerline of the ring shape of the optically resonant structure, each of the plurality of p-type regions located between and interfacing with a neighboring pair of n-type regions of the plurality of n-type regions so as to form a plurality of lateral semiconductor junctions across the light propagation path of the resonant mode of the optically resonant structure, each of the plurality of lateral semiconductor junctions existing within a respective substantially vertical plane extending radially outward from the vertical centerline of the ring shape of the optically resonant structure; and
an optical waveguide bus having a curved portion optically coupled to the optically resonant structure, the optical waveguide bus being outside the outer wall of the optically resonant structure.

19. The optical device of claim 18, wherein the optical waveguide bus is configured to mainly excite a fundamental optical resonant mode of the optically resonant structure at an operating wavelength.

20. An optical device, comprising:
an optically resonant structure formed in a planar layer of a semiconductor chip, the optically resonant structure including one or more semiconductor materials including silicon, the optically resonant structure having a ring shape defined by an outer wall and an inner wall, the outer wall and the inner wall positioned concentrically about a center of the ring shape, wherein the optically resonant structure has a height that is less than or equal to 100 nm;
a plurality of n-type regions formed within the optically resonant structure, each of the plurality of n-type regions occupying a corresponding volume within the optically resonant structure that is subtended by a first angle measured azimuthally about a vertical centerline of the ring shape of the optically resonant structure, the vertical centerline extending through the center of the ring shape and substantially perpendicular to at least one of the bottom and top surfaces of the planar device layer, the corresponding volume of each of the plurality of n-type regions positioned within a light propagation path of a resonant mode of the optically resonant structure; and a plurality of p-type regions formed within the optically resonant structure, each of the plurality of p-type regions occupying a respective volume within the optically resonant structure that is subtended by a second angle measured azimuthally about the vertical centerline of the ring shape of the optically resonant structure, each of the plurality of p-type regions located between and interfacing with a neighboring pair of n-type regions of the plurality of n-type regions so as to form a plurality of lateral semiconductor junctions across the light propagation path of the resonant mode of the optically resonant structure, each of the plurality of lateral semiconductor junctions existing within a corresponding substantially vertical plane extending radially outward from the vertical centerline of the ring shape of the optically resonant structure.

21. The optical device of claim 20, further comprising:
a structure formed from a light absorbing material at an operating wavelength and defined within the outer wall of the optically resonant structure, wherein the light absorbing material includes germanium.

22. The optical device of claim 20, wherein each of the outer wall and the inner wall extends continuously from a top cladding to a bottom cladding.

23. The optical modulator device of claim 20, wherein a height of either the outer wall or the inner wall defines a maximum height of the optically resonant structure.

24. The optical device of claim 20, wherein each of the plurality of n-type regions extends radially from the inner wall to the outer wall, and wherein each of the plurality of p-type regions extends radially from the inner wall to the outer wall.

25. The optical device of claim 19, wherein the optical waveguide bus has a first angular propagation constant at an operating wavelength and the resonant mode of the optically resonant structure has a second angular propagation constant at the operating wavelength, wherein the first angular propagation constant substantially matches the second angular propagation constant.

26. The optical device of claim 18, wherein the optical waveguide bus is a first optical waveguide bus, the optical device further comprising a second optical waveguide bus optically coupled to the optically resonant structure.

27. The optical device of claim 18, wherein each of the outer wall and the inner wall extends continuously from a top cladding to a bottom cladding.

28. The optical device of claim 18, wherein a height of either the outer wall or the inner wall defines a maximum height of the optically resonant structure.

29. The optical device of claim 1, further comprising:
a transistor formed in the planar device layer of the semiconductor chip.

30. The optical device of claim 18, further comprising:
a transistor formed in the planar device layer of the semiconductor chip.

31. The optical device of claim 20, further comprising:
a transistor formed in the planar device layer of the semiconductor chip.

32. The optical device of claim 1, wherein:
the first corresponding angle is substantially the same for each of the plurality of n-type regions occupying the corresponding volume within the optically resonant structure;

the second corresponding angle is substantially the same for each of the plurality of p-type regions occupying the corresponding volume within the optically resonant structure; and the first corresponding angle and the second corresponding angle are substantially the same.

\* \* \* \* \*